(12) United States Patent  
Urata

(10) Patent No.: US 8,000,054 B2
(45) Date of Patent: Aug. 16, 2011

(54) CONTROL DEVICE, CONTROL METHOD, AND INFORMATION STORAGE APPARATUS

(75) Inventor: Yukio Urata, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 38 days.

(21) Appl. No.: 12/506,791

(22) Filed: Jul. 21, 2009

(65) Prior Publication Data

US 2010/0315737 A1 Dec. 16, 2010

(30) Foreign Application Priority Data

Sep. 30, 2008 (JP) .................................. 2008-254356

(51) Int. Cl.
*G11B 21/02* (2006.01)
*G11B 5/02* (2006.01)
*G11B 5/78* (2006.01)

(52) U.S. Cl. ................................ 360/75; 360/32; 360/25

(58) Field of Classification Search .......................... None
See application file for complete search history.

(56) References Cited

U.S. PATENT DOCUMENTS

| 7,430,090 | B2* | 9/2008 | Oyamada et al. | 360/75 |
| 7,492,543 | B2* | 2/2009 | Mitsunaga et al. | 360/75 |
| 7,787,207 | B2* | 8/2010 | Takahashi | 360/75 |
| 7,817,372 | B2* | 10/2010 | Takahashi | 360/75 |
| 2006/0139789 | A1 | 6/2006 | Yang | |
| 2008/0123511 | A1* | 5/2008 | Takahashi | 369/154 |

FOREIGN PATENT DOCUMENTS

| JP | A 2006-190454 | 7/2006 |
| JP | A 2007-310978 | 11/2007 |
| JP | A 2008-47233 | 2/2008 |
| JP | A 2008-112544 | 5/2008 |
| JP | 2008-204561 | 9/2008 |

OTHER PUBLICATIONS

Office Action issued by the Patent Office of Japan for Japanese Application No. 2008-254356 mailed Mar. 29, 2011, with English language translation.

* cited by examiner

*Primary Examiner* — K. Wong
(74) *Attorney, Agent, or Firm* — Greer, Burns & Crain, Ltd.

(57) ABSTRACT

A control device includes an acquisition section which acquires a reading signal from a head under plural heat amounts, an computation section which computes plural kinds of characteristic values representing characteristics of the reading signal for each of the plural generated heat amounts by using at least one kind of algorithm, a contact determination section which determines whether or not the head contacts the storage medium for each of the two or more kinds of characteristic values based on a change of the characteristic values for the generated heat amount, and an association determination section which determines an association of a distance between the head and the storage medium with the generated heat amount when determined that the head contacts the storage medium for any of the characteristic values as the generated heat amount when the head contacts the storage medium so that the is considered to be zero.

13 Claims, 54 Drawing Sheets

FIG. 10

| SECTOR | VGAS | Position | VGAR | VTM | Reserve | Reserve | Reserve | Reserve |
|---|---|---|---|---|---|---|---|---|
| 0 | 0000h | 0001h | 0002h | 0003h | 0004h | 0005h | 0006h | 0007h |
| 1 | 0008h | 0009h | 000Ah | 000Bh | 000Ch | 000Dh | 000Eh | 000Fh |
| 2 | 0010h | 0011h | 0012h | 0013h | 0014h | 0015h | 0016h | 0017h |
| 3 | 0018h | 0019h | 001Ah | 001Bh | 001Ch | 001Dh | 001Eh | 001Fh |
| 4 | 0020h | 0021h | 0022h | 0023h | 0024h | 0025h | 0026h | 0027h |
| 5 | 0028h | 0029h | 002Ah | 002Bh | 002Ch | 002Dh | 002Eh | 002Fh |
| 6 | 0030h | 0031h | 0032h | 0033h | 0034h | 0035h | 0036h | 0037h |
| 7 | 0038h | 0039h | 003Ah | 003Bh | 003Ch | 003Dh | 003Eh | 003Fh |
| 8 | 0040h | 0041h | 0042h | 0043h | 0044h | 0045h | 0046h | 0047h |
| ∼ | | | | ∼ | | | | |
| n−1 | 8n−8 | 8n−7 | 8n−6 | 8n−5 | 8n−4 | 8n−3 | 8n−2 | 8n−1 |
| n | 8n | 8n+1 | 8n+2 | 8n+3 | 8n+4 | 8n+5 | 8n+6 | 8n+7 |

FIG. 11

| HEATER VALUE | VGAS AVERAGE | VGAS DEVIA-TION | POS AVERAGE | POS DEVIA-TION | VGAR AVERAGE | VGAR DEVIA-TION | VTM AVERAGE | VTM DEVIA-TION | Reserve | Reserve |
|---|---|---|---|---|---|---|---|---|---|---|
| 0 | 0000h | 0001h | 0002h | 0003h | 0004h | 0005h | 0006h | 0007h | 0008h | 0009h |
| 1 | 000Ah | 000Bh | 000Ch | 000Dh | 000Eh | 000Fh | 0010h | 0011h | 0012h | 0013h |
| 2 | 0014h | 0015h | 0016h | 0017h | 0018h | 0019h | 001Ah | 001Bh | 001Ch | 001Dh |
| 3 | 001Eh | 001Fh | 0020h | 0021h | 0022h | 0023h | 0024h | 0025h | 0026h | 0027 |
| 4 | 0028h | 0029h | 002Ah | 002Bh | 002Ch | 002Dh | 002Eh | 002Fh | 0030h | 0031h |
| 5 | 0032h | 0033h | 0034h | 0035h | 0036h | 0037h | 0038h | 0039h | 003Ah | 003Bh |
| 6 | 003Ch | 003Dh | 003Eh | 003Fh | 0040h | 0041h | 0042h | 0043h | 0044h | 0045h |
| 7 | 0046h | 0047h | 0048h | 0049h | 004Ah | 004Bh | 004Ch | 004Dh | 004Eh | 004Fh |
| 8 | 0050h | 0051h | 0052h | 0053h | 0054h | 0055h | 0056h | 0057h | 0056h | 0057h |

AVERAGE VALUE OF POSITION-ACCURACY VALUES

STANDARD DEVIATION OF POSITION-ACCURACY VALUES

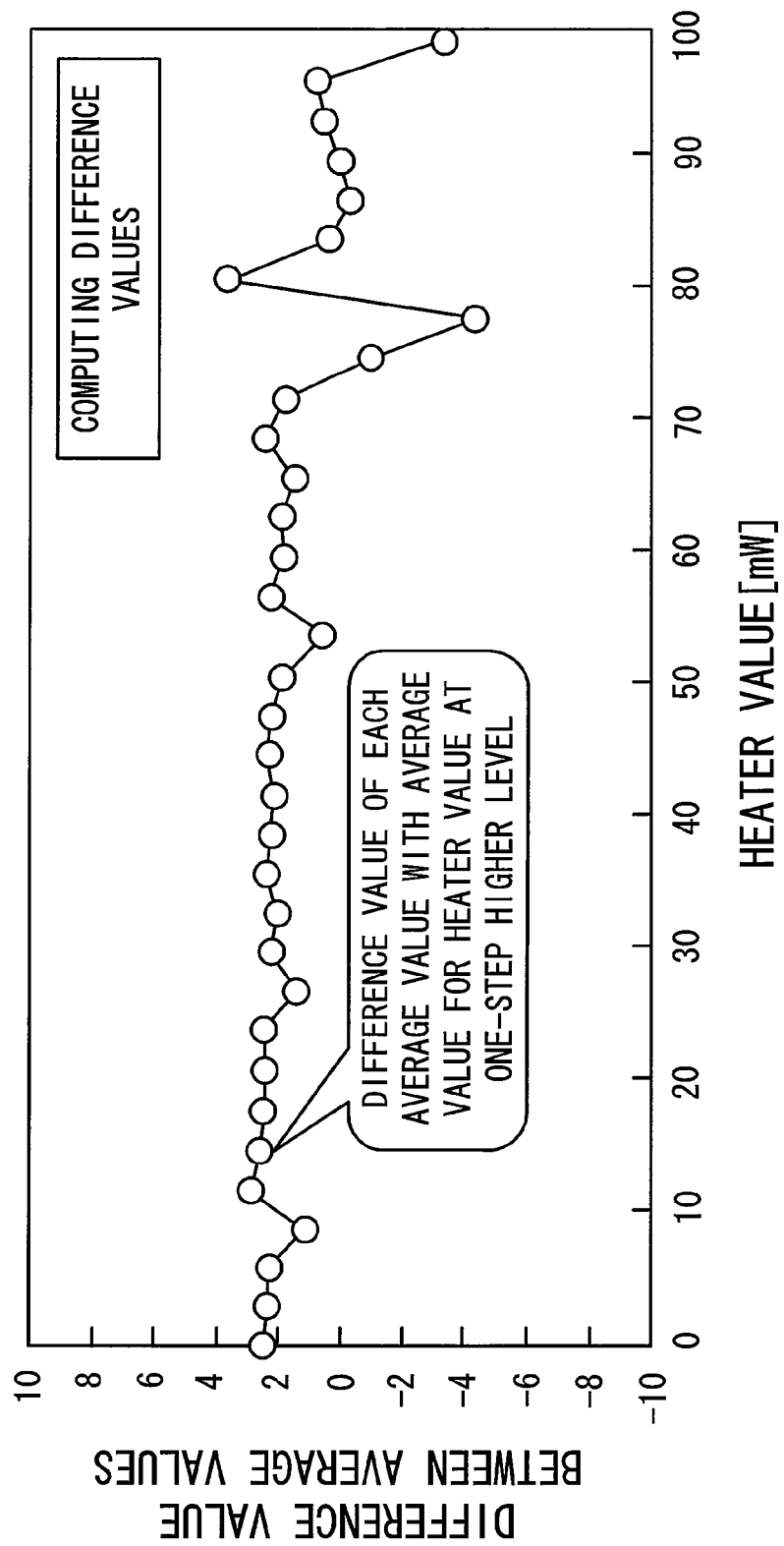

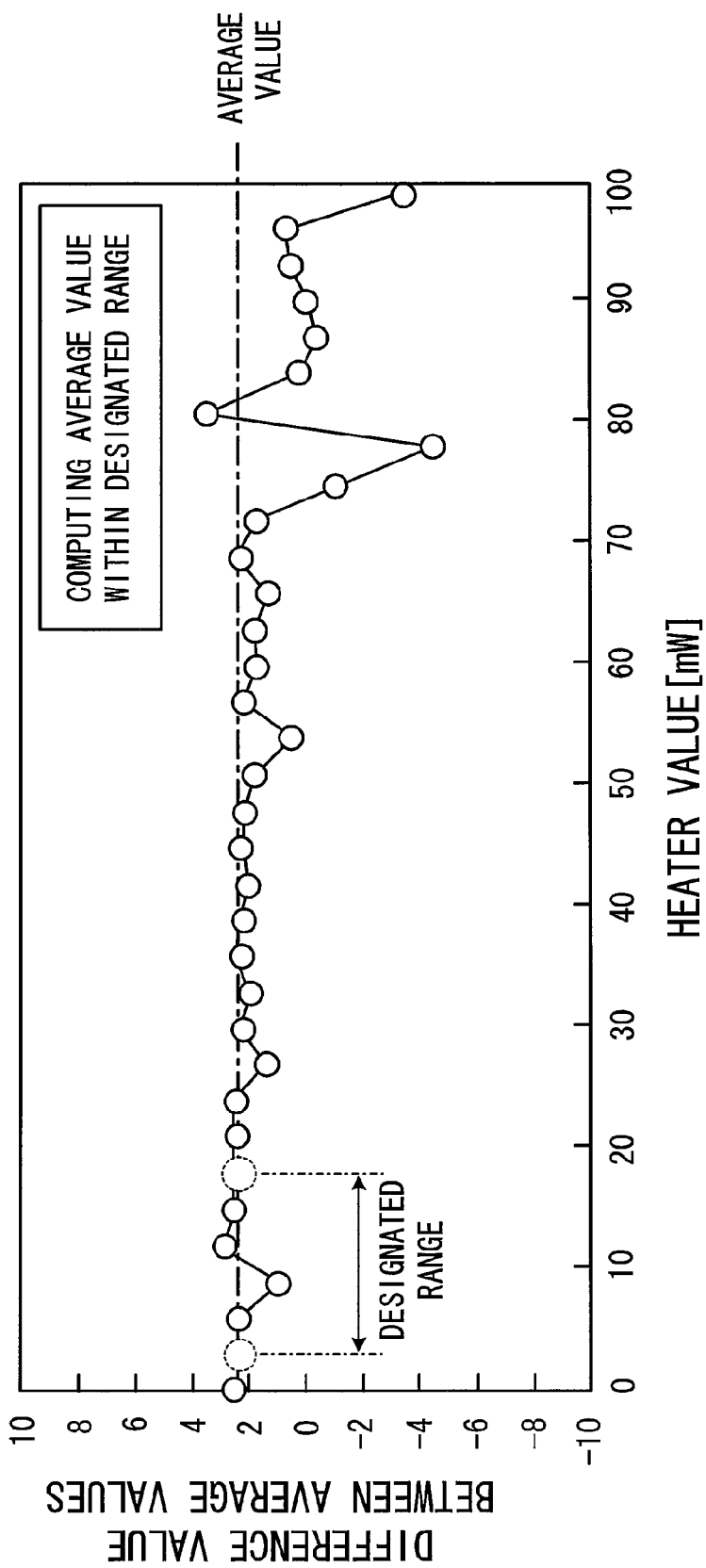

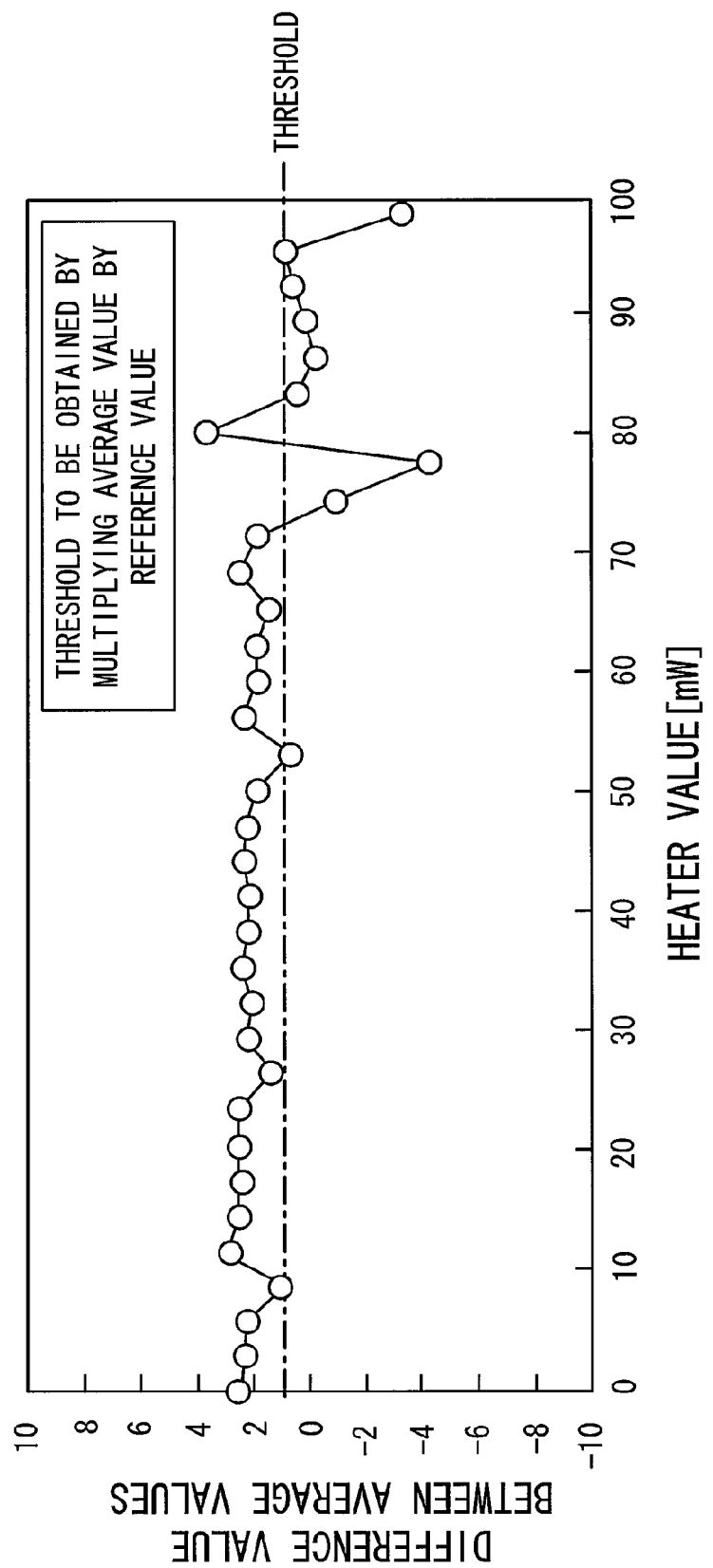

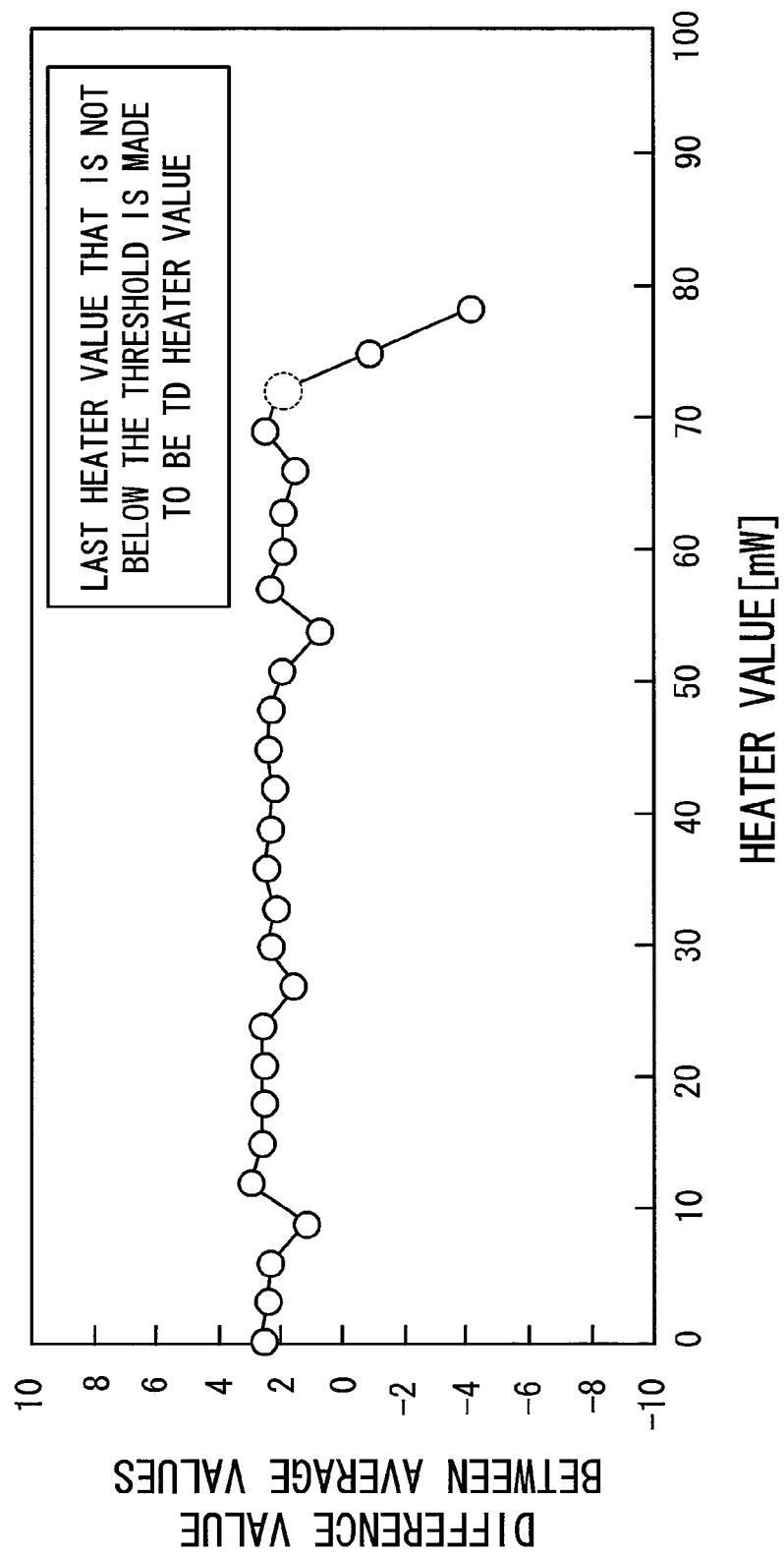

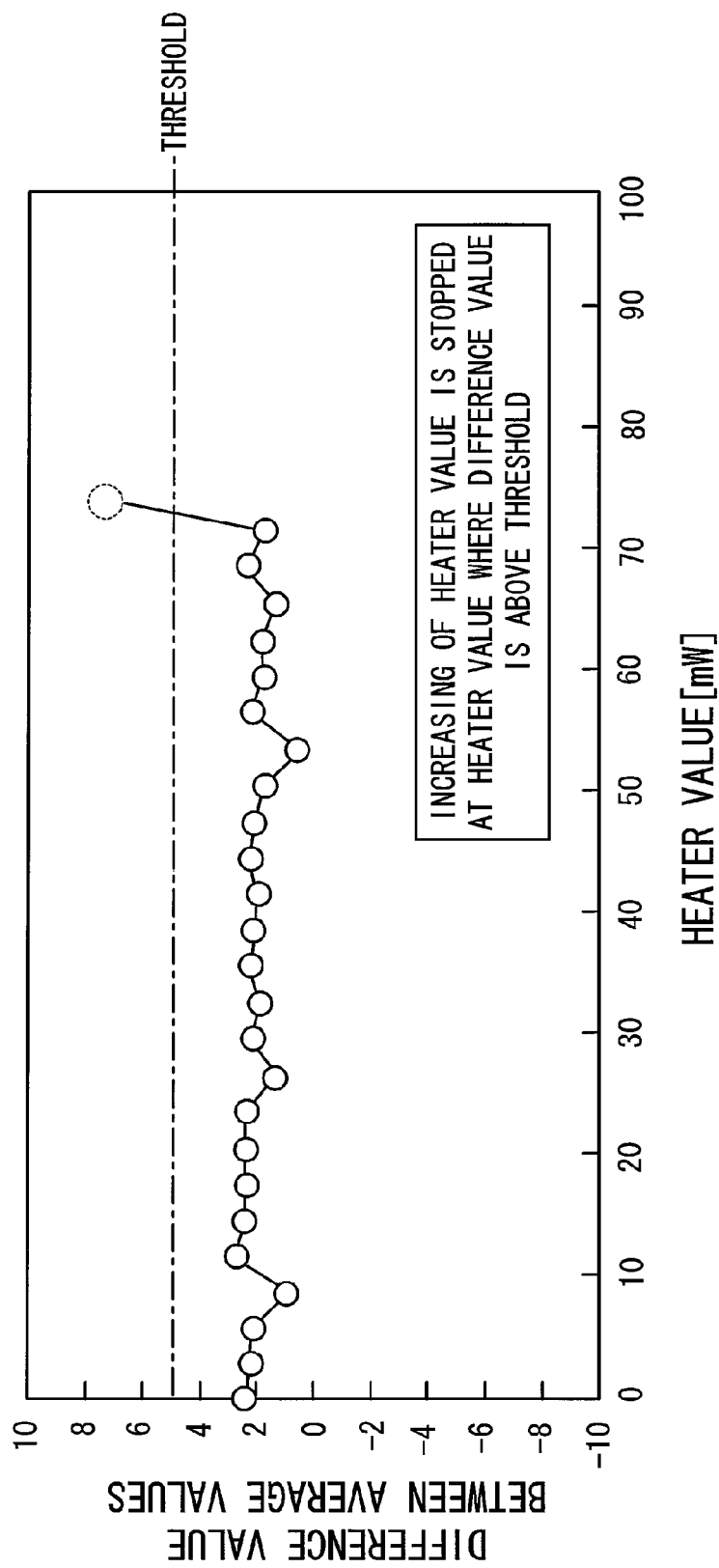

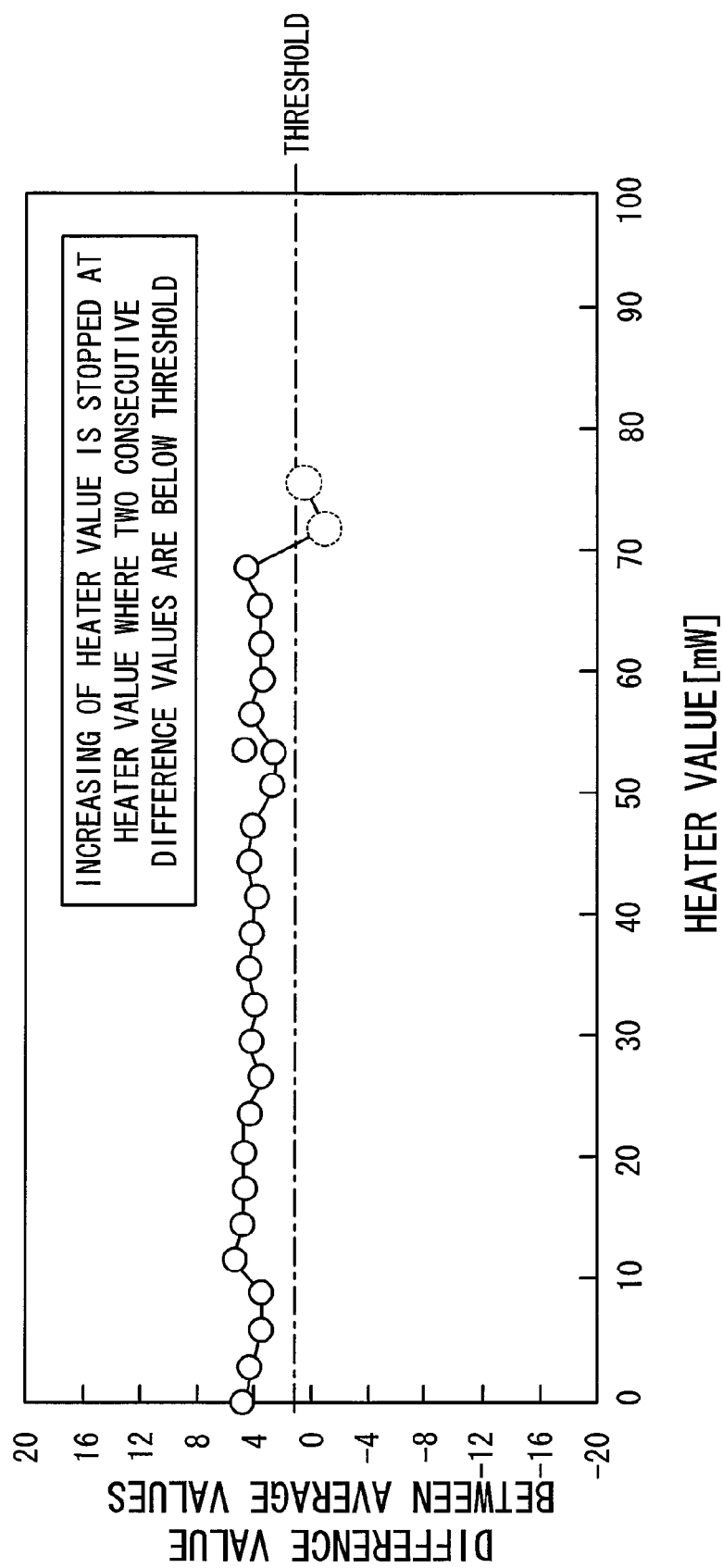

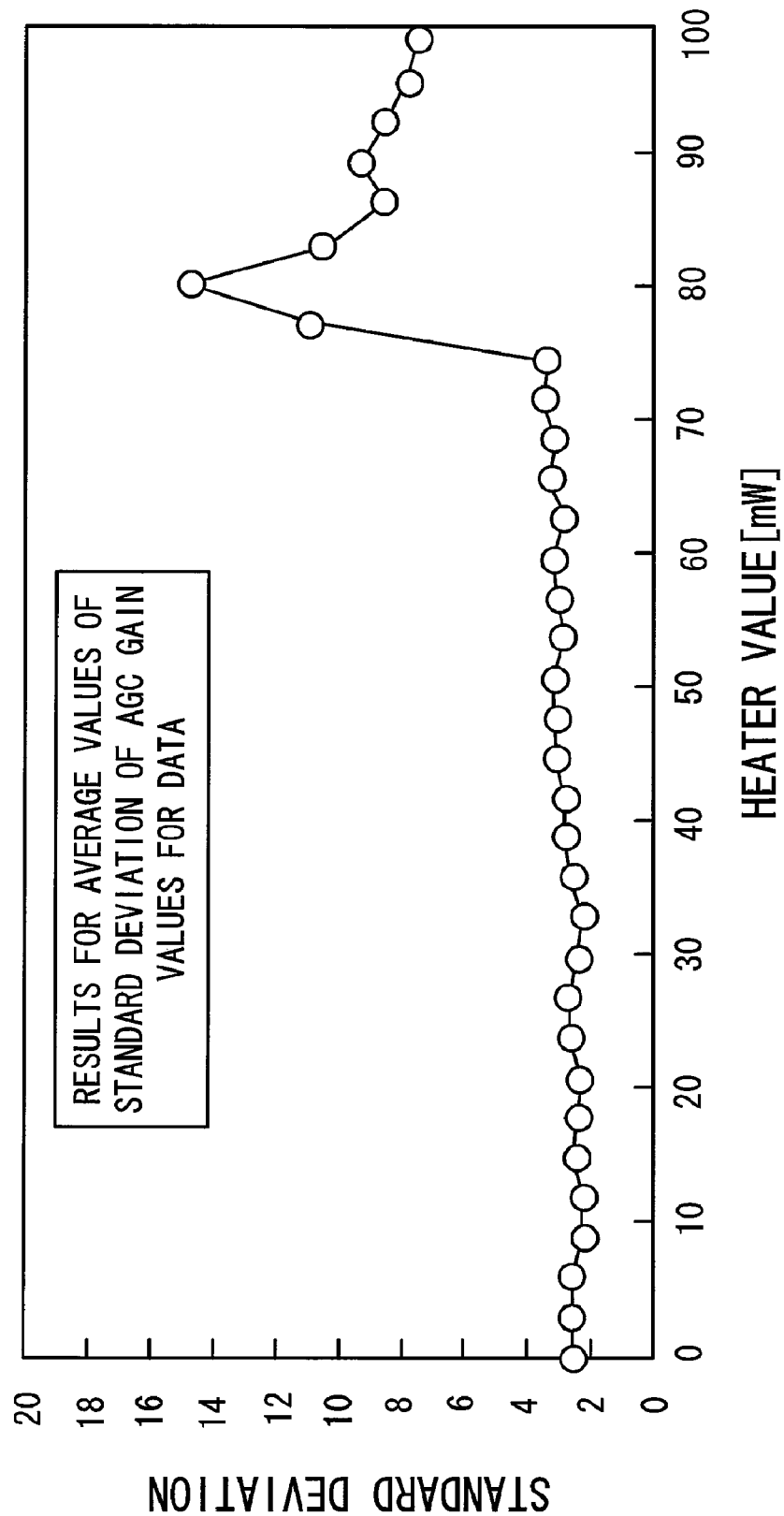

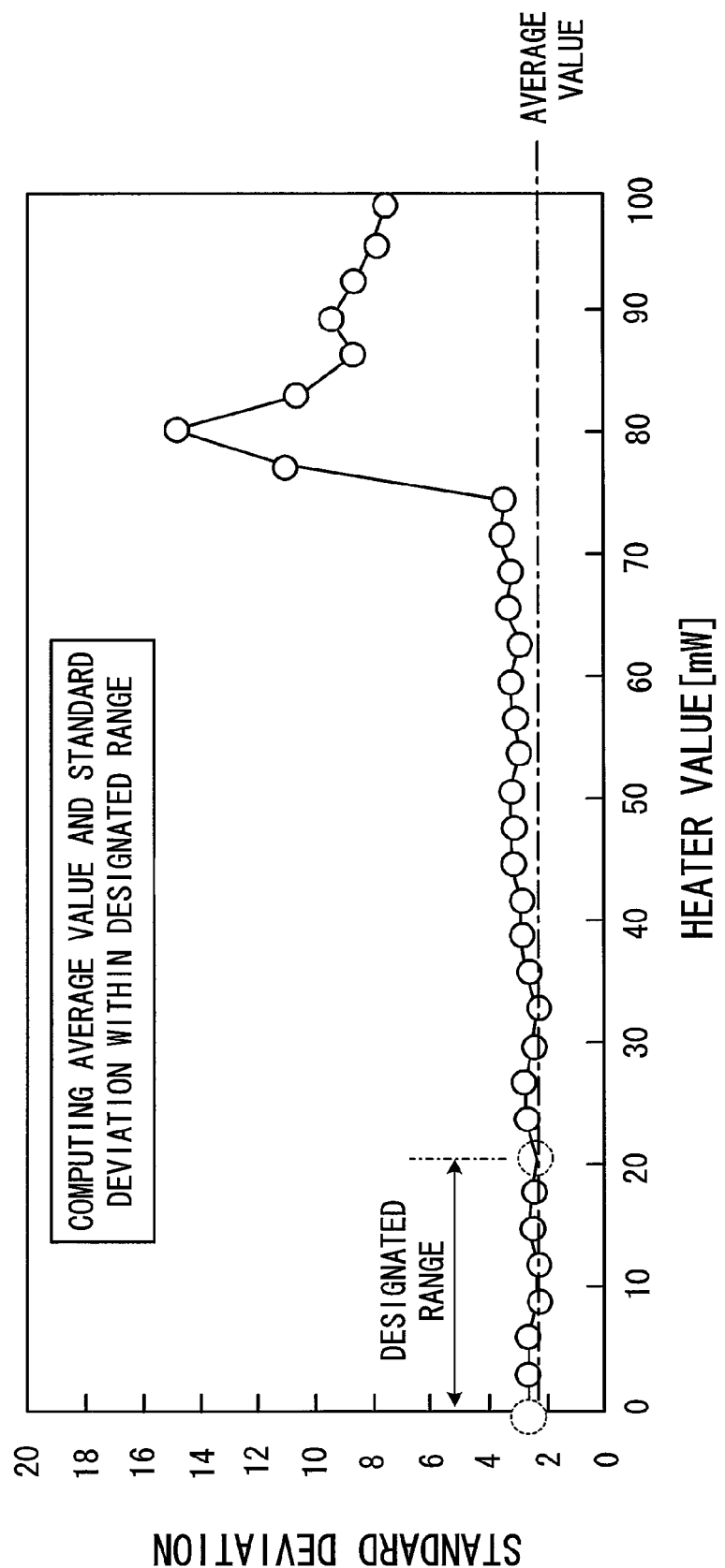

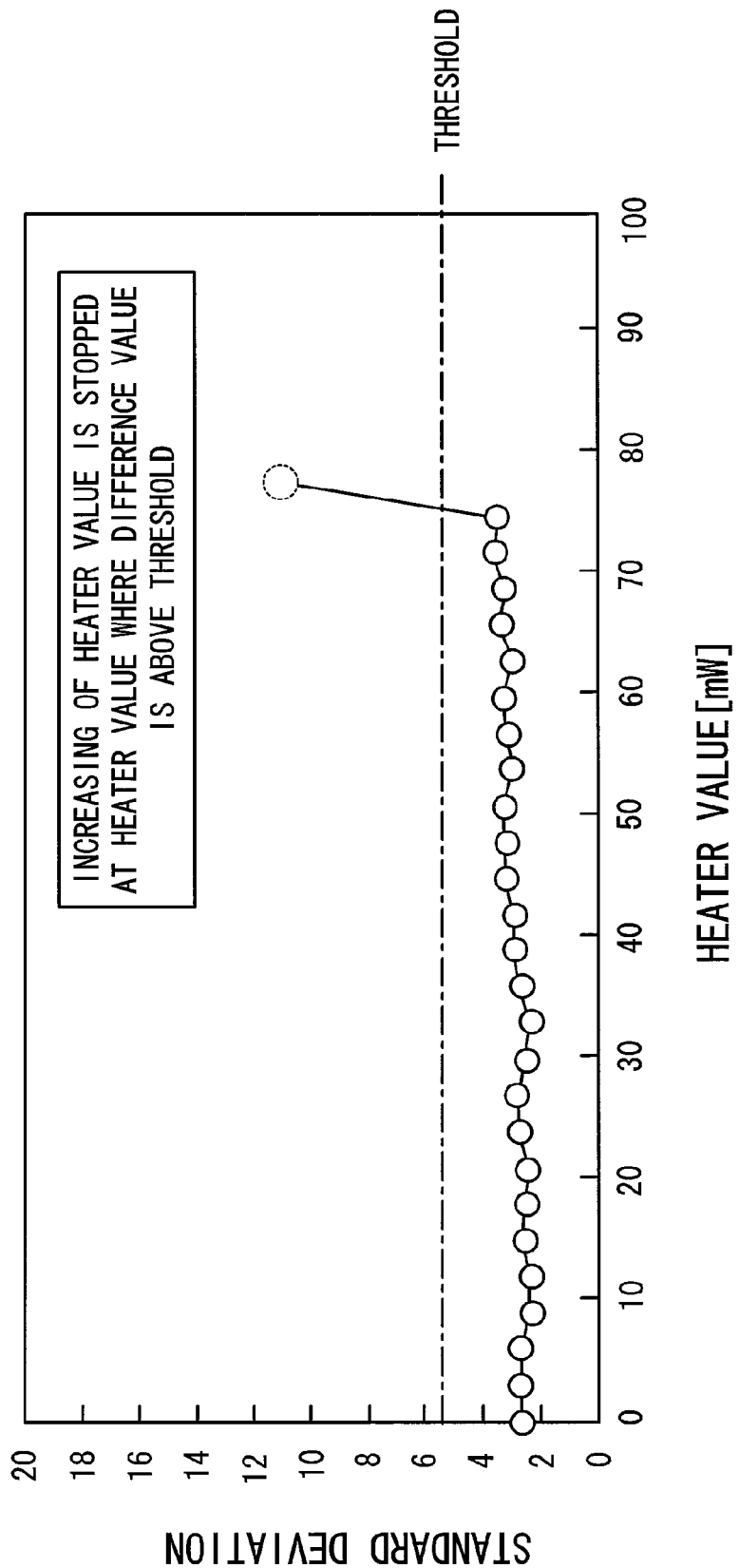

FIG. 22A

|  |  | Address | Data |
|---|---|---|---|
| DESIGNATED RANGE | Start | 0 | 01 |
|  | Stop | 1 | 0A |
| REFERENCE VALUE 0 | Low | 2 | 80 |
|  | High | 3 | 00 |
| REFERENCE VALUE 1 | Low | 4 | 00 |
|  | High | 5 | FE |
| REFERENCE VALUE 2 | Low | 6 | 80 |
|  | High | 7 | 03 |
| REFERENCE VALUE 3 | Low | 8 | 80 |
|  | High | 9 | 00 |
| REFERENCE VALUE 4 | Low | A | 00 |
|  | High | B | 06 |
| REFERENCE VALUE 5 | Low | C | 00 |
|  | High | D | 03 |
| REFERENCE VALUE 6 | Low | E | 00 |
|  | High | F | 02 |
| REFERENCE VALUE 7 | Low | 10 | 00 |
|  | High | 11 | 00 |
| REFERENCE VALUE 8 | Low | 12 | 00 |
|  | High | 13 | 00 |
| REFERENCE VALUE 9 | Low | 14 | 00 |
|  | High | 15 | 00 |
| REFERENCE VALUE 10 | Low | 16 | 00 |
|  | High | 17 | 00 |
| REFERENCE VALUE 11 | Low | 18 | 00 |
|  | High | 19 | 00 |

FIG. 22B

|  |  | Address | Data |
|---|---|---|---|
| TABLE 0 | Prm0 | 1A | 06 |
|  | Prm1 | 1B | 0C |
|  | Prm2 | 1C | 80 |
|  | Prm3 | 1D | 00 |
| TABLE 1 | Prm0 | 1E | 05 |
|  | Prm1 | 1F | 1C |
|  | Prm2 | 20 | 80 |
|  | Prm3 | 21 | 00 |
| TABLE 2 | Prm0 | 22 | 05 |
|  | Prm1 | 23 | 2C |
|  | Prm2 | 24 | 00 |
|  | Prm3 | 25 | 00 |
| TABLE 3 | Prm0 | 26 | 0A |
|  | Prm1 | 27 | 3C |
|  | Prm2 | 28 | 80 |
|  | Prm3 | 29 | 00 |
| TABLE 4 | Prm0 | 2A | 11 |
|  | Prm1 | 2B | D4 |
|  | Prm2 | 2C | 00 |
|  | Prm3 | 2D | 00 |
| TABLE 5 | Prm0 | 2E | 26 |
|  | Prm1 | 2F | 0C |
|  | Prm2 | 30 | 80 |
|  | Prm3 | 31 | 00 |
| TABLE 6 | Prm0 | 32 | 25 |
|  | Prm1 | 33 | 1C |
|  | Prm2 | 34 | 80 |
|  | Prm3 | 35 | 00 |
| TABLE 7 | Prm0 | 36 | 25 |
|  | Prm1 | 37 | 2C |
|  | Prm2 | 38 | 00 |
|  | Prm3 | 39 | 00 |
| TABLE 8 | Prm0 | 3A | 2A |
|  | Prm1 | 3B | 3C |
|  | Prm2 | 3C | 80 |
|  | Prm3 | 3D | 00 |
| TABLE 9 | Prm0 | 3E | 31 |
|  | Prm1 | 3F | D4 |
|  | Prm2 | 40 | 00 |
|  | Prm3 | 41 | 00 |
| TABLE 10 | Prm0 | 42 | 41 |
|  | Prm1 | 43 | 5C |
|  | Prm2 | 44 | 00 |
|  | Prm3 | 45 | 00 |
| TABLE 11 | Prm0 | 46 | 61 |
|  | Prm1 | 47 | 6C |
|  | Prm2 | 48 | 00 |
|  | Prm3 | 49 | 00 |

FIG. 23

| | Bit7 | Bit6 | Bit5 | Bit4 | Bit3 | Bit2 | Bit1 | Bit0 |
|---|---|---|---|---|---|---|---|---|
| Prm0 | DETERMINATION TARGET etc. | | | | DIFFERENCE INTERVAL | | CONSECUTIVE NUMBER | |
| Prm1 | REFERENCE VALUE FOR AVERAGE VALUE | | | | DESIGNATION OF REFERENCE VALUE FOR STANDARD DEVIATION | | | |
| Prm2 | DETERMINATION CODE | | | | | | | |
| Prm3 | Reserve | | | | | | | |

CONTROL DEVICE, CONTROL METHOD, AND INFORMATION STORAGE APPARATUS

CROSS-REFERENCE TO RELATED APPLICATION

This application is based upon and claims the benefit of priority of the prior Japanese Laid-open Patent No. 2008-254356, filed on Sep. 30, 2008, the entire contents of which are incorporated herein by reference.

FIELD

The embodiments discussed herein are related to a control device that controls a heater which thermally expands a head towards a surface of a storage medium to store information. The head reads information from the storage medium by approaching the surface of the storage medium, and thereby generates a reading signal. The embodiments are also related to a control method of controlling the heater and to an information storage apparatus that includes the control device.

BACKGROUND

In recent years, along with the progress in computer technology, there has been a rapid growth of techniques related to information storage apparatuses that are connected to a computer to perform the function of storing information. Among such information storage apparatuses, there is one that rotates a disk-shaped storage medium such as a magnetic disk and moves a head closely towards a surface of a storage medium, so as to record information on the storage medium and to reproduce information from the storage medium (hereafter the recording and reproducing operations will be collectively referred to as 'access'). A hard disk drive (HDD) is a typical example of such an information storage apparatus, in addition to a well-known magneto-optical (MO) drive.

Higher recording density of storage media has been advanced in the field of information storage apparatus in recent years, and there is a strong demand for information storage apparatuses capable of accurately accessing such storage media with high recoding density. In the case of an information storage apparatus that accesses a storage medium by moving a head closely towards a surface of the storage medium, the access accuracy becomes higher as the distance between the head and the storage medium at the time of access become smaller. For this reason, in response to higher recording density of storage media, attempts have been actively made to reduce the distance between the head and the storage media at the time of access in the field of information storage apparatus.

The distance between a head and a storage medium at the time of access may differ among information storage apparatuses of even an identical model due to variations in the head and storage medium among the apparatuses. The variation in the distance is subtle, but such subtle variation may be a problem. Specifically, the subtle variation leads to differences in operational performance among the information storage apparatuses which have very short distances between their heads and storage media at the time of access and which are capable of accurate access. In order to solve such a problem, the following method has been conventionally employed for information storage apparatuses. Specifically, in each information storage apparatus, a heater which thermally expands the head is provided in the head. The heat amount generated by the heater is controlled so that the distance between the head and the storage medium is kept constant to be suitable for accurate access. In this method, before an information storage apparatus is made available for users, i.e., before shipment, association of the distances between the head and the storage medium, with the amounts of heat generated by the heater (hereafter, the heat amount will be referred also to as a 'heater value') is obtained. When the information storage apparatus is actually used by a user to access the storage medium, the heat amount by the heater is adjusted on the basis of the association so that the head is kept in a proper distance away from the storage medium. The association is determined by the following two steps. Firstly, the head is thermally expanded until the head comes in contact with (Touch Down) the storage medium. At this time, the distance between the head and the storage medium is considered to be zero. The heater value to accomplish this touchdown is determined as the TD heater value. Secondly, using the TD heater value as a reference, the association of the distances between the head and the storage medium, with the heater values is obtained for a range of the heater values not higher than the TD heater value. Various methods have conventionally been known as methods of determining the TD heater value (see, for example, Japanese Patent Application Publications No. 2006-190454, No. 2007-310978, No. 2008-47233, and No. 2008-112544). Some of those conventional practices of determining the TD heater value will be described below.

FIG. 1 is a flowchart illustrating an exemplary method of determining the TD heater value on the basis of changes in an automatic gain control (AGC) gain value.

The method of determining the TD heater values illustrated in FIG. 1 has the following processes. Firstly, an initial setting process is executed for the heater control to determine the TD heater value (step S101). Specifically, in this initial setting process, the heater value is set at the initial value zero. Besides, an increment, an maximum value and the like used when the heater value is gradually increased as will be described later are determined. After the initial setting process, a determination is made as to whether or not a current heater value is lower than the maximum heater value (step S102). The maximum heater value is sufficiently high at this time. Accordingly, it is determined that the current heater value is lower than the maximum heater value in this process (step S102: YES). Subsequently, the head reads data from predetermined data sectors of the storage medium (step S103). Reproduction signals that represent the read data are generated in this reading process. Many information storage apparatuses have a function to automatically amplify the signal level of the reproduction signal to a predetermined signal level, and a gain value obtained at this time is referred to as AGC gain value. Obtaining this AGC gain value is equivalent to obtaining a signal level of the original reproduction signal before amplified. The higher the signal level of the original reproduction signal preceding the amplification is, the smaller the AGC gain value becomes. This information storage apparatus that employs this method of determining the TD heater value generates the reproduction signal by reading the data at step S103, acquires the AGC gain value (step S104), and stores the AGC gain value thus obtained. After the storing of the AGC gain value, the heater value is increased by a predetermined increment (step S105). Next, a determination is made as to whether or not the AGC gain value stored at the previous step S104 reaches a saturation state (reaches a certain, constant value) or not (step S106). As will be described later, the AGC gain value is never saturated while the heater value is low. So, the first time the determination of the step S106 is made, 'No' is selected at the step S106. Subsequently, as long as the heater value is still lower than the maximum heater value (step S102: Yes), the processes from the step S102 to the step S106 are repeatedly executed while the heater value is gradually increased by the predetermined increment, so that the heater value becomes gradually larger.

In general, an increase in the heater value shortens the distance between the head and the storage medium, and results in higher reading accuracy so that a signal level of the reproduction signal obtained by the reading operation from the storage medium becomes higher. For this reason, the higher the heater value becomes, the smaller the AGC gain value for the reproduction signal becomes. Once the head has been brought into contact with the storage medium, a state may be seen that even a further increase in the heater value does not change the signal level of the reproduction signal any longer. In this state, the AGC gain value no longer changes (Saturation state of AGC gain value).

FIG. 2 illustrates the changes of the AGC gain value for the increase of the heater value in the method of determining the TD heater value of FIG. 1.

FIG. 2 illustrates the AGC gain values of the reproduction signals obtained as the heater value is gradually increased from zero by the above-mentioned predetermined increment. As FIG. 2 illustrates, the AGC gain value decreases in a substantially monotonic manner until right before 100 mW. Then right before 100 mW, the change in the AGC gain value becomes smaller than before, that is, the AGC gain value has reached to a saturation state.

In the method of determining the TD heater value of FIG. 1, whether or not the head contacts the storage medium is determined using the above-mentioned characteristic changes of the AGC gain value. Specifically, every time the heater value is incremented by the predetermined amount, a determination is made at step S106 as to whether or not the AGC gain value has reached to a saturation state. In this event, if the increase of the heater value by the predetermined increment causes only a smaller magnitude of change in the AGC gain value than a predetermined threshold, it is determined that the AGC gain value has reached to a saturation state (step S106 in FIG. 1: Yes). Then, the TD heater value is determined with the heater value for the previous AGC gain value marked just before the AGC gain value with the smaller magnitude of change than the predetermined threshold (step S107 in FIG. 1). FIG. 2 shows the three rightmost AGC gain values plotted near the heater value of 100 mW, in which a difference smaller than the predetermined threshold exists between the first rightmost AGC gain value for the heater value of 100 mW and the second rightmost AGC gain value that is adjacent to the first rightmost AGC gain value; and a magnitude of a difference larger than the predetermined threshold exists between the second rightmost AGC gain value and the third rightmost AGC gain value. Here, in the method of determining the TD heater value of FIG. 1, it is determined that, of these three AGC gain values, the first rightmost AGC gain value and the second rightmost AGC gain value are AGC gain values, which have reached to a saturation state, and the heater value of the third rightmost AGC gain value is determined as the TD heater value. In the above description, the heater value of the AGC gain value right before the AGC gain value reaches a saturation state (one right before) is determined as the TD heater value, however, the heater value of two right before the AGC gain value reaches the saturation state may be determined as the TD heater value. Which way of determination is adopted is set in advance in a stage of the initial setting process at step S101 in FIG. 1.

In the above-described example, the TD heater value is determined based on the AGC gain values for the reproduction signals obtained by reading information from predetermined data sectors, but, alternatively, the TD heater value may be determined based on the AGC gain values of the reproduction signals obtained by reading information from predetermined servo sectors. Also in this case, the TD heater value is determined through following series of processes similar to those in FIG. 1.

Next, a method of determining the TD heater value different from the method of determining the TD heater value of FIG. 1 will be obtained.

FIG. 3 is a flowchart illustrating an exemplary method of determining the TD heater value through a change in the Viterbi trellis margin (VTM) value.

In the method of determining the TD heater values illustrated in FIG. 3, similar to the method of determining the TD heater values illustrated in FIG. 1, firstly, an initial setting process is executed for the heater control related to determining the TD heater value (step S201), the heater value is set at the initial value, zero. Besides, the increment by which the heater value is gradually increased little by little and the maximum value that the heater value is increased up to or the like are determined in this initial setting process. After the initial setting is performed, it is determined as to whether or not the current heater value is lower than the maximum heater value (step S202). The maximum heater value is sufficiently high, and at this stage, it is determined that the current heater value is lower than the maximum heater value (step S202: YES). Subsequently, the head reads data from a predetermined data sector of the storage medium (step S203). A reproduction signal representing data are for a reading target generated by this reading process.

The information storage apparatus that employs the method of determining the TD heater value illustrated in FIG. 3 has a function to analyze part of the reproduction signals to obtain, on the basis of the Viterbi algorithm, a maximum-likelihood demodulated value of the part of reproduction signals. In the information storage apparatus that employs the method of determining the TD heater value, uses this function to compute the VTM values, which are values representing the degrees of offset between the maximum-likelihood demodulated values and their actual demodulated values, and the VTM values thus obtained are stored (step S204). The more the reading errors take place when the data is read from the data sector, the larger the VTM values become. If the reading errors take place too frequently, the VTM values diverge.

After the VTM values is stored, the heater value is incremented by a predetermined increment (step S205). Then, it is determined as to whether or not the VTM values thus stored at the previous step S204 are diverging (step S206). As will be described in detail later, the VTM values are never diverging in a state where the heater value is still low. So, the first time the determination of the step S206 is made, 'No' is selected at the step S206. Subsequently, as long as the heater value is lower than the maximum heater value (step S202: Yes), the processes from the step S202 to the step S206 explained above are repeatedly executed while the heater value is increased by the predetermined increment, so that the heater value becomes gradually larger.

In general, as the heater value is increased so that the distance between the head and the storage medium is shortened, reading accuracy increases and less reading errors take place. However, when the head has been brought into contact with the storage medium, the head collides, irregularly and repeatedly, the unevenness formed on the surface of the storage medium, so that the occurrence of reading errors becomes more frequently and the VTM values increase rapidly (the VTM value divergence).

FIG. 4 illustrates the changes in the VTM value along with the increase in the heater value in the method of determining the TD heater value of FIG. 3.

FIG. 4 illustrates the VTM values of the reproduction signals obtained as the heater value is gradually increased from zero by the above-mentioned predetermined increment. As FIG. 4 illustrates, the VTM value decreases at a moderate pace until the heater value reaches a value that is slightly smaller than 100 mW. When the heater value nearly reaches approximately 100 mW, the VTM value increases rapidly, which depicts that the VTM value has reached to a divergence state.

In the method of determining the TD heater value of FIG. 3, whether or not the head contacts the storage medium is determined every time the heater value is increased by the predetermined amount using such characteristic in the step 206. Specifically, every time the heater value is incremented by the predetermined amount, a determination is made at step S206 as to whether or not the VTM value reaches to the divergence state. In this event, if a magnitude of change in the VTM value when the heater value is increased by the predetermined increment becomes greater than a predetermined threshold, it is determined that the VTM value reaches the diverging state (step S206 in FIG. 3: Yes). Then, a heater value just before VTM value increases rapidly is determined as the TD heater value (step S207 in FIG. 3). In FIG. 4, a magnitude of change between the rightmost VTM value when the heater value is 100 mW and the second VTM value from the right adjacent to the VTM value for the 100 mW heater value is greater than the predetermined threshold, and, it is determined that the second VTM value from the right is determined as the TD heater value. In the description above, the heater value just before the VTM value increases rapidly is determined as the TD heater value. However, a heater value for the second last VTM value preceding the first diverging AGC gain value may be determined as the TD heater value. Which method of determination is adopted is set in advance in the stage of the initial setting process at step S201 in FIG. 3.

As described above, collide withherto, various conventional methods of determining the TD heater value have already been known, and conventionally, the detection of the contact of the head with the storage medium and the determination of the TD heater value are performed based on only one of those already known determination methods. Note that, in general, according to environmental factors such as the shape of the surface of the storage medium, the temperature, and the humidity frequently bring contacting of the head and the storage medium in different manners. Accordingly, there are quite a few cases where the adopted one of the methods of determining the TD heater value may not clearly distinguish a contact state and a non-contact state. For example, there are cases where, even when the head contacts the storage medium, the head keeps a low friction state with the storage medium and is slowly pressed onto the storage medium along as in the heater value is increased. Such cases are known as those of soft landing. In the soft-landing case, even when the head is actually in contact with the storage medium, the increasing of the heater value by the predetermined increment frequently cause the VTM value to have only a moderate amount of change. So, according to the method of determining the TD heater value of FIG. 3, the determined TD heater value is sometimes a little larger than the actual TD heater value, or, in some cases, it is erroneously determined that the head is not in contact with the storage medium.

If the TD heater value is inaccurately determined as in the above-described cases, the association of the heater value with the distance between the head and the storage medium is also inaccurate. In some cases, such inaccurate association brings the head into frequent contacts with the storage medium at the time of access, and such frequent contacts may even physically damage the storage medium. For this reason, it is desirable that the determination of the TD heater value be so accurate that the contact between the head and the storage medium is correctly determined irrespective of the manner of the contact between the head and the storage medium.

In view of the above-described circumstances, the control device, the control method, and the information storage apparatus of this disclosure aims to identify the TD heater value accurately.

SUMMARY

According to one aspect of the invention, a control device that controls a heater which thermally expands a head towards a surface of a storage medium to store information, the head approaching the surface of the storage medium and reading the information from the storage medium to generate a reading signal, the control device comprising:

an acquisition section that acquires a reading signal from the head under a plurality of heat amounts generated by the heater;

a computation section that computes, from the reading signal obtained by the acquisition section, two or more kinds of characteristic values representing characteristics of the reading signal for each of the plurality of generated heat amounts by using at least one kind of algorithm;

a contact determination section that determines whether or not the head contacts the storage medium, with respect to each of the two or more kinds of characteristic values computed by the computation section, on the basis of a change of the characteristic values for the heat amount generated by the heater; and an association determination section that determines an association of the distance between the head and the storage medium with the heat amount generated by the heater, using the heat amount generated when the contact determination section determines that the head contacts the storage medium with respect to any of the characteristic values is used as the heat amount generated by the heater when the head contacts the storage medium so that the distance between the head and the storage medium is considered to be zero.

According to one aspect of the invention, a method of controlling a heater that thermally expands a head towards a surface of a storage medium to store information, the head approaching the surface of the storage medium and reading the information from the storage medium to generate a reading signal, the method includes:

acquiring a reading signal from the head under a plurality of heat amounts generated by the heater;

computing, from the reading signal obtained by the acquisition section, two or more kinds of characteristic values representing characteristics of the reading signal for each of the plurality of generated heat amounts by using at least one kind of algorithm;

contact-determining whether or not the head contacts the storage medium, with respect to each of the two or more kinds of characteristic values computed by the computation section, on the basis of a change of the characteristic values for the heat amount generated by the heater; and association-determining an association of the distance between the head and the storage medium with the heat amount generated by the heater, using the heat amount generated when the contact determination section determines that the head contacts the storage medium with respect to any of the characteristic values is used as the heat amount generated by the heater when the head contacts the storage medium so that the distance between the head and the storage medium is considered to be zero.

According to one aspect of the invention, an information storage apparatus includes:

a storage medium that stores information;

a head that includes an approach face which approaches a surface of the storage medium, that also includes a built-in heater which thermally expands the approach face towards the surface of the storage medium, and that reads information from the storage medium to generate a reading signal; and a control device that controls the heater, wherein
the control device includes:
an acquisition section that acquires a reading signal from the head under a plurality of amounts of heat generated by the heater;
a computation section that computes, from the reading signal obtained by the acquisition section, two or more kinds of characteristic values that represent some characteristics of the reading signal, the characteristic values being computed for each of the plurality of different amounts of generated heat by at least one kind of algorithm;
a contact determination section that determines whether or not the head contacts the storage medium on the basis of how much each of the two or more kinds of characteristic values computed by the computation section changes with a change in the heat amount generated by the heater; and
an association determination section that identifies association of the distance between the head and the storage medium with the heat amount generated by the heater while the heat amount generated at the time when the contact determination section determines that the head contacts the storage medium on the basis of any of the characteristic values is considered as the heat amount generated by the heater at the time when the head contacts the storage medium and thus the distance between the head and the storage medium is considered to be zero.

As has been described so far, according to the aspects of the control device, the control method, and the information storage apparatus, the TD hater value is determined accurately.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a table illustrating an example of addresses for storing the AGC gain values of the reproduction signals of both the position information and the data, the position accuracy values, and the VTM values all of which are stored in memory 73;

FIG. 11 is a table illustrating exemplary addresses for storing the average values and the standard deviations of the AGC gain values of the reproduction signals for the position information and for the data, those of the position accuracy values, and those of the VTM values all of which are stored in memory 73;

FIGS. 16A to 16F illustrate diagrams for explaining the first determination method based on the changing in the average value of the AGC gain values of the reproduction signals for data;

FIGS. 18A to 18F include charts for explaining the third determination method based on the changing in the average value of the AGC gain value of the reproduction signals for data;

FIGS. 19A to 19F include charts for explaining the fourth determination method based on the changing in the average value of the AGC gain value of the reproduction signals for data;

FIGS. 20A to 20E include charts for explaining the determination method based on the changing in the standard deviation of the AGC gain values of the reproduction signal for data;

FIGS. 22A and 22B illustrate exemplary plural tables;

FIG. 23 illustrates what are included in each table;

DESCRIPTION OF EMBODIMENTS

Preferred embodiments of the invention will be explained with reference to accompanying drawings.

Figure 5:
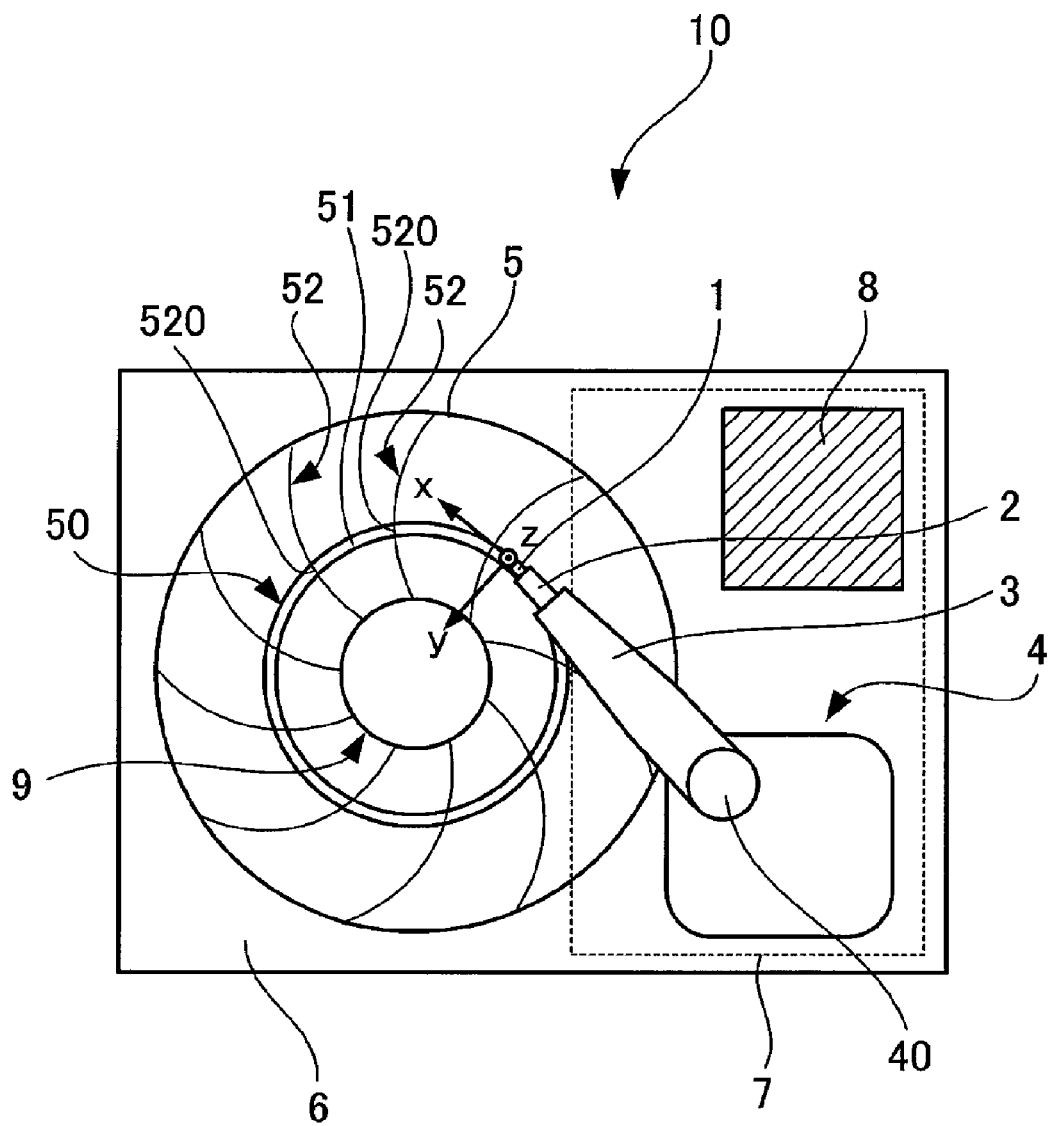
FIG. 5 illustrates a hard disk drive (HDD) 10, which is an embodiment of the information storage apparatus.

FIG. 5 illustrates a hard disk drive (HDD) 10, which is an embodiment of the information storage apparatus.

The HDD 10 illustrated in FIG. 5 includes a voice coil and a voice-coil motor 4. The voice coil (not illustrated), which is a movable coil, and a permanent magnet (not illustrated) that produces a certain constant magnetic field to be applied to the voice coil are built in the voice-coil motor 4. In the voice-coil motor 4, a current flowing through the voice coil moves the voice coil. The movement of the voice coil generates a rotary drive force with a pivot shaft 40 being the center of the rotary drive force. The rotary drive force of the voice-coil motor 4 rotates an arm 3 about the pivot shaft 40. A slider 2 is attached to the leading end of the arm 3 with a supporting member known as a gimbal, and a head 1 is attached to the leading end of the slider 2.

The head 1 plays a role of reading information from a magnetic disk 5 and a role of writing information to the magnetic disk 5. To perform these reading and writing information, the head 1 includes an approach face that faces the magnetic disk 5. When information is read or written, the voice-coil motor 4 drives the arm 3 to rotate about the pivot shaft 40. The rotary drive of the arm 3 moves the head 1 in the radial direction of the magnetic disk 5, and thus the head 1 is positioned at the appropriate target head position with respect to the radial direction of the magnetic disk 5 (desired head position) for reading or writing information. The head 1 that has been positioned at the desired position is kept floating in a minute distance above the surface of the magnetic disk 5, while the approach face is facing a surface of the disk-shaped magnetic disk 5. In FIG. 5, the head 1 is depicted within an xyz orthogonal coordinate system by using the position of the head 1 as the origin, the direction towards the center of the magnetic disk 5 as the y-axis direction, and the direction of the normal line perpendicular to the sheet of FIG. 5 as the z-axis direction.

Plural belt-shaped tracks circling around the center of the disk-shaped magnetic disk 5 are formed on the surface of the magnetic disk 5. These tracks are arranged in the radial direction of the magnetic disk 5. FIG. 5 illustrates one of these plural tracks, and the illustrated track is denoted by reference numeral 50.

Plural servo regions 52 are formed on the surface of the disk-shaped magnetic disk 5. Each servo region 52 extends between the rotating-center side of the magnetic disk 5 and the outer-circumference side of the magnetic disk 5. Information used for positioning the head 1 is stored in the servo regions 52. Specifically, information on positions in the radial direction as well as in the circumferential direction is stored therein. For example, what is stored in a servo sector 520 depicted in FIG. 5 as the intersection of the track 50 with the servo region 52 is such address information that how many tracks 50 are located at the disk-center side of the track 50 in question and how many servo sectors 520 precede the servo sector 520 in question within the track 50 in question. Also stored in the servo sector 520 is the information (fine position information) equivalent to the information on the scale of the distance in the radial direction of the magnetic disk 5 measured from the reference point, that is, from the center position of the servo sector 520 in question. While the head 1 reads information stored in the servo sector 520, this fine position information makes it possible to provide information on how far the actual reading position of the head 1 is offset, in the radial direction of the magnetic disk 5, from the center position of the servo sector 520. These address information and fine position information are included in the above-mentioned position information. Note that, as illustrated in FIG. 5, each of the plural servo regions 52 has a gently-curved arc shape. This curved shape fits the trajectory of the position of the head 1 while the head 1 is being moved above the magnetic disk 5 by the rotary drive of the voice-coil motor 4.

Data sectors 51 are formed as regions each located between two adjacent servo sectors 520. The information handled by the user (hereafter, simply referred to as 'data') is written into or read from the data sectors 51. Magnetizations are arranged on the surfaces of the servo sectors 520 and of the data sectors 51 so as to be directed either in the positive or negative direction of the z-axis in FIG. 5. Each of the two directions—positive and negative—represents one of the binary values of '0' and '1' to represents the information for 1 bit. Each data sector 51 is identified from the other data sectors 51 by means of the position information included in the servo sectors 520 that are adjacent to the data sector 51 in question.

The head 1 includes two elements: a recording element (not illustrated in FIG. 5) that is used for writing information onto the magnetic disk 5; and a reproducing element (not illustrated in FIG. 5) that is used for reading information from the magnetic disk 5. The reproducing element includes a magnetoresistance-effect film that changes the value of its electrical resistance in accordance with the direction of the magnetic field applied to the film. While the data or the position information is reproduced, the reproducing element detects a change in a value of a current flowing through the magnetoresistance-effect film in accordance with the direction of the magnetic field caused by the magnetic media. Through this detection, the reproducing element retrieves the information represented by the directions of the magnetization of the magnetic media. The signal representing the changes of the current is the reproduction signal representing the information retrieved, and the reproduction signal is outputted to a head amplifier 8. The recording element, on the other hand, includes a coil and a magnetic pole that together serve as an electromagnet. While the data is recorded on the magnetic disk 5, the head 1 approaches the magnetic disk 5 and electric recording signals representing data in the bit value are inputted, through the head amplifier 8, into the recording element provided in the head 1. The recording element causes a current to flow through the coil in directions according to the bit values of the recording signal. The current causes the coil to generate a magnetic field. The magnetic field thus generated passes through the magnetic pole and then is applied to the magnetizations on the surface of the magnetic disk 5. Accordingly, the directions of magnetizations of the magnetic media are arranged according to the bit values of the recording signal. In this way, the data recorded in the recording signal are recorded on the magnetic disk 5 in the form of directions of the magnetization of the magnetic media.

The rotary drive force of a spindle motor 9 spins the magnetic disk 5 within the plane of FIG. 5. The spinning of the magnetic disk 5 allows the head 1 to approach consecutively the servo sectors 520 arranged in the circumferential direction and to execute the reading of the position information stored in the servo sectors 520. On the basis of these reading results, the head 1 driven to rotate by the voice-coil motor 4 is positioned at a position, of a desired one of the data sectors 51 with respect to the radial direction of the magnetic disk 5. After the head 1 is positioned, either the reproducing or recording of the data is executed at the time when the spinning of the magnetic disk 5 causes the head 1 to approach the desired data sector 51.

A base 6 houses and those components directly related to the storing and reproducing of the information—specifically, the voice-coil motor 4, the arm 3, the slider 2, the head 1, the head amplifier 8, and the like as well as the magnetic disk 5. FIG. 5 illustrates the inside of the base 6. A controller board 7 that includes a control circuit to control both the driving of the voice-coil motor 4 and the accessing of the head 1 is provided on the back side of the base 6. The controller board 7 is depicted by a dotted line in FIG. 5. Note that the HDD 10 is provided with a casing that is not illustrated in FIG. 5. The components provided on the front side of the base 6 and the controller board 7 provided on the backside of the base 6 are altogether housed in this unillustrated casing. The components on the front side are electrically connected to the controller board 7 with an unillustrated connecting mechanism, the controller board 7 processes the recording signals to be inputted into the head 1 and the reproduction signals generated by the head 1.

Subsequently, the controller board 7 will be described.

Figure 6:
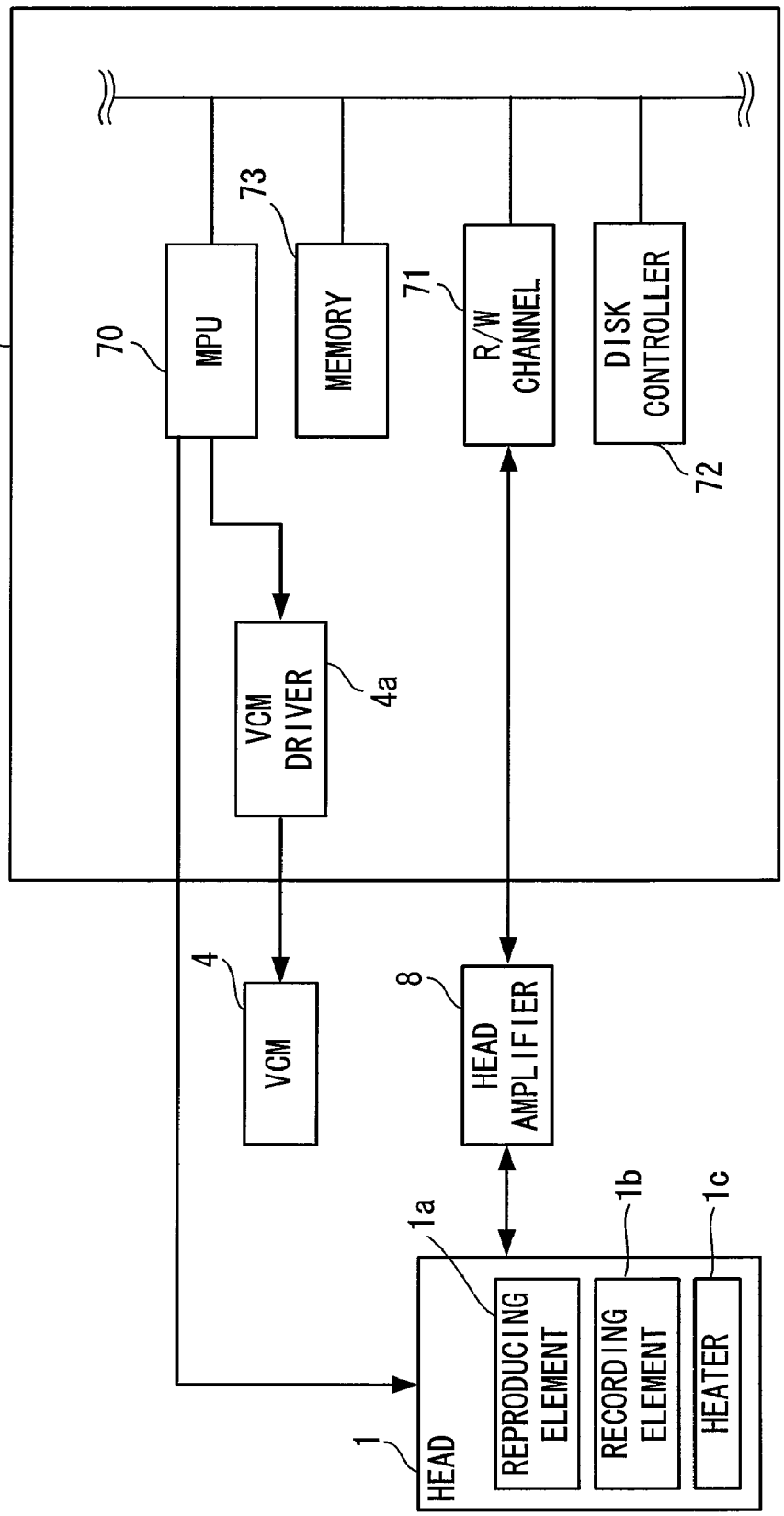
FIG. 6 illustrates some of the components provided on the controller board 7.

FIG. 6 illustrates some of the components provided on the controller board 7.

The controller board 7 includes a micro processing unit (MPU) 70. The MPU 70 controls the voice-coil motor (VCM) 4 via a voice-coil motor (VCM) driver 4a, and controls a heater 1c which is provided in the head 1 and which thermally expands an approach face of the heater 1c towards the magnetic disk 5. In addition, the control of this heater 1c will be described in detail later. The controller board 7 also includes a disk controller 72 and a memory 73. The disk controller 72 controls the recording data on the magnetic disk 5 by the head 1 reproducing data from the magnetic disk 5 by the head 1. The memory 73 stores information. In addition, the controller board includes an R/W channel 71 that executes signal processing on: the reproduction signal sent from a reproducing element 1a via the head amplifier 8; and the recording signal to be sent to a recording element 1b via the head amplifier 8.

When data are recorded on the magnetic disk 5, a recording signal is inputted into the R/W channel 71 via the disk controller 72 from an external device such as a computer connected to this HDD 10, and then various kinds of signal processing such as analog-to-digital conversion are executed at the R/W channel 71. Details of the signal processing will be described later. The resultant recording signal that has been subjected to the signal processing is amplified by the head amplifier 8, and is then inputted into the recording element 1b provided in the head 1. Subsequently, the recording of the data on the magnetic disk 5 is executed in as described above.

When either data are reproduced or position information is reproduced, a reproduction signal is generated by the reproducing element 1a of the head 1 as described above. The reproduction signal is amplified by the head amplifier 8, and then is inputted into the R/W channel 71, where the inputted reproduction signal is subjected to various kinds of signal processing. After the reproduction signal of the data is subjected to the signal processing at R/W channel 71, the resultant reproduction signal of the data is sent to the disk controller 72, and then is sent from the disk controller 72 to an external device (e.g., a computer or the like) connected to this HDD 10. After the reproduction signal of the position information is subjected to the signal processing at R/W channel 71, the resultant reproduction signal of the position information is inputted into the MPU 70. Upon receiving, from disk controller 72, an instruction to execute the control for positioning the head 1, the MPU 70 executes the control for positioning the head 1 by controlling the voice-coil motor (VCM) 4, by means of the voice-coil motor (VCM) driver 4a, on the basis of the inputted reproduction signal of the position information.

In the HDD 10 of this embodiment, the distance between the head 1 and the magnetic disk 5 is kept constantly within a certain range that is suitable for the accurate access through controlling the heater 1c that thermally expands the head 1 towards the magnetic disk 5. The HDD 10 has a function of obtaining an association between the distance from the head 1 to the magnetic disk 5 and the heat amount generated by the heater 1c (hereafter, the heat amount thus generated will be simply referred to as 'heater value'). The association is obtained before a user causes the head 1 to access the data on the magnetic disk 5. When the information storage apparatus is actually used by the user to access the data, the control of the heater 1c is executed on the basis of this association. The association is determined by the following steps. Firstly, the head 1 is thermally expanded until the head 1 is brought into contact with (Touch Down) the magnetic disk 5. At this time, the distance between the head 1 and the magnetic disk 5 is considered to be zero. The heater value to accomplish this Touch Down is determined as the TD heater value (hereafter, TD heater value). Secondly, using the TD heater value as a reference, the distance between the head 1 and the magnetic disk 5 is associated with the heater value with respect to a region where the heater value is not higher than the TD heater value.

A method of determining the TD heater value in this embodiment will be described below. In this case of determining the TD heater value, the R/W channel 71 of FIG. 6 plays an important role. While the R/W channel 71 has a function of processing the reproduction signal, this function is used in this determination of the TD heater value. So, the descriptions of the method of determining the TD heater value start with detailed descriptions of the function that the R/W channel 71 has to process the reproduction signal.

Figure 7:
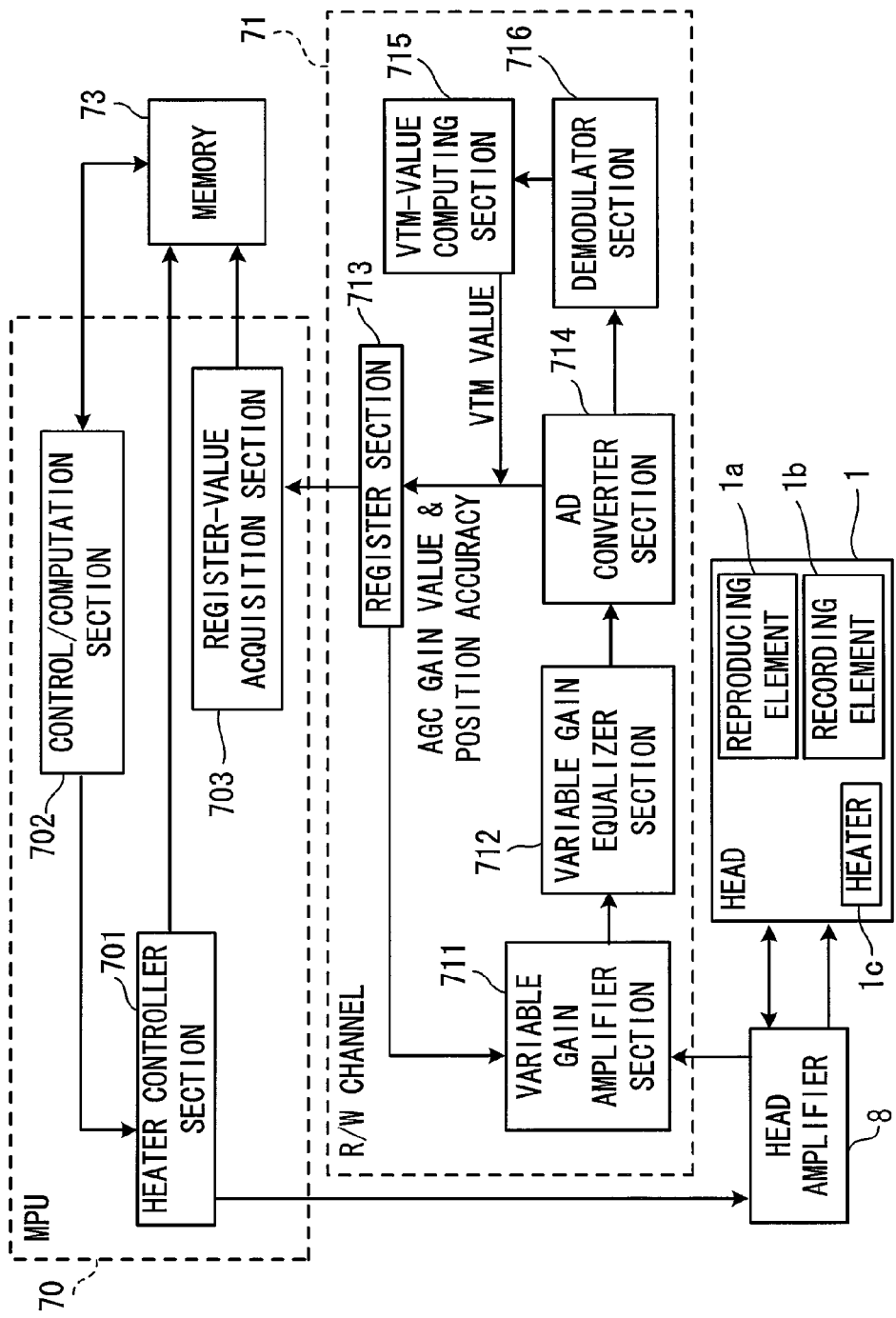
FIG. 7 is a functional block diagram illustrating functions of the R/W channel 71 at the time of signal processing executed on the reproduction signal.

FIG. 7 is a functional block diagram illustrating functions of the R/W channel 71 at the time of signal processing executed on the reproduction signal.

The R/W channel 71 includes a variable gain amplifier section 711, a variable equalizer section 712, a register section 713, an AD converter section 714, a VTM-value computing section 715, and a demodulator section 716.

The reproduction signals for the position information obtained by the reading element 1a of the head 1 while reading in the servo sectors 520 and the reproduction signals of the data obtained by the reading element 1a of the head 1 while reading in the data sectors 51 are amplified by the head amplifier 8, and then the amplified reproduction signals are inputted into the variable gain amplifier section 711 consecutively in the order of being read. The inputted reproduction signals are subjected to an amplifying process under the gain values set in the variable gain amplifier section 711. Note that the set value for this gain value is variable, which will be described later, and is changed sequentially in accordance with the signal levels of the input reproduction signals so that the signal level of the amplified reproduction signals may be kept at a predetermined signal level. The variable equalizer section 712 adjusts the frequency characteristics of reproduction signals thus amplified by the variable gain amplifier section 711. An example of such adjustment is to remove the high-frequency noise component. The AD converter section 714 executes the conversion from analog signals to digital signals, that is, the analog reproduction signals that have been subjected to the frequency-characteristic adjustment in the variable equalizer section 712 are converted to digital signals by the AD converter section 714. In addition, on the basis of the signal levels of the reproduction signals having been subjected to the frequency-characteristic adjustment in the variable equalizer section 712, the AD converter section 714 acquires a gain value that makes the gain value in the variable-gain amplifier section 711 appropriate for executing the amplification processing up to the predetermined signal level. The gain value thus obtained is passed to the register section 713 and is then recorded. The variable gain amplifier section 711 reads the gain value recorded in the register section 713, and replaces the gain value that is currently set with the gain value thus read. In summary, in this R/W channel 71, an automatic gain control (AGC) loop that controls the gain value is formed by the variable gain amplifier section 711, the variable equalizer section 712, the AD converter section 714, and the register section 713. The AGC loop changes the gain value, as needed, so that the gain value may be appropriate for allowing the signal level of the reproduction signal to be the predetermined signal level. Hereafter, the gain value obtained by the AD converter section 714 will be referred to as the AGC gain value. In addition, if the reproduction signal in question is a reproduction signal for position information, the AD converter section 714 takes out, from this reproduction signal, a position accuracy value representing how far the actual reading position of the head 1 is offset, in the radial direction of the magnetic disk 5, from the center position of the servo sector 520. The position accuracy value thus extracted is also passed to the register 713, and is then recorded in the register section 713. Note that this position accuracy value is obtained by causing the head 1 to read the above-described fine position information in the servo sector 520 illustrated in FIG. 5. The larger the position accuracy value is, the larger the actual reading position of the head 1 is offset, in the radial direction of the magnetic disk 5, from the center position of the servo sector 520 in question.

The position information or the data that has been converted to digital signal by the AD converter section 714 is passed to the demodulator section 716, where the position information or the data is demodulated so as to generate a demodulated value of the position or the data. The demodulated value is passed from the demodulator section 716 to the register section 713 via the VTM-value computing section 715 and is then recorded in the register section 713. The VTM-value computing section 715 has a function of analyzing part of the reproduction signal and obtaining the most-likelihood modulated value of the reproduction signal on the basis of the Viterbi algorithm, and computes the VTM (Viterbi Trellis Margin) value representing the degree of difference between the most-likelihood demodulated value thus obtained and the actual demodulated value. The computing of the VTM value is performed on the reproduction signal for the data when the R/W channel 71 is set at the VTM-value computing mode. When the operation mode of the R/W channel 71 is set at the VTM-value computing mode, both the demodulated value obtained by the demodulator section 716 and the VTM value computed by the VTM-value computing section 715 are passed to the register section 713, and then recorded in the register section 713. In contrast, when the operation mode of the R/W channel 71 is not set at the VTM-value computing mode, the demodulated value obtained by the demodulation section 716 passes through the VTM-value computing section 715, and is passed to the register section 713, where the demodulated value is recorded.

As will be described in detail later, in the HDD 10 of this embodiment, the AGC gain value, the position accuracy value, the VTM value of the position information, and the VTM value for the data are recorded in the register section 713, and the TD heater value is determined on the basis of the AGC gain value, the position accuracy value, and the VTM values recorded in the register section 713.

FIG. 7 also includes functional blocks illustrating functions of the MPU 70 at the time of determining the TD heater value. As FIG. 7 illustrates, the MPU 70 includes a heater controller section 701, a register-value acquisition section 703, and a control/computation section 702.

The heater controller section 701 controls, by means of the head amplifier 8, the electric power to be supplied to the heater 1c of the head 1. The value of this electric power corresponds to the above-described heater value, and thus the heater controller section 701 is in charge of the control of the heater value. From the register section 713, the register-value acquisition section 703 acquires the AGC gain value of the reproduction signals for data, the AGC gain value of the reproduction signal for the position information, the position accuracy value, and the VTM value, all of which are recorded in the register section 713 of the R/W channel 71. The two kinds of AGC gain values, the position accuracy value, and the VTM value thus obtained are stored in the memory 73. The control/computation section 702 plays a role of controlling the heater controller section 701. The control/computation section 702 also plays a role of computing the average value and the standard deviation of the AGC gain values stored in the memory 72, those of the position accuracy values, the VTM values for the servo sectors 520 and for the data sectors 51. The average values and the values of the standard deviation thus computed are stored in the memory 73. Tough not illustrated in FIG. 7, the MPU 70 has a function of generating: a read gate signal to determine the timing for processing the reproduction signal for the data in the R/W channel 71; and a servo gate signal to determine the timing for processing the reproduction signal for the position information in R/W channel 71.

The controller board 7 of FIG. 6 including the R/W channel 71 and the MPU 70 is an embodiment of the control device whose basic form has been described above. In addition, the heater controller section 701, the register-value acquisition section 703, the variable gain amplifier section 711, the variable equalizer section 712 of FIG. 7 collectively combined together correspond to an example of the acquisition section in the basic form described above. In addition, the AD converter section 714, the demodulator section 716, the register section 713, and the VTM-value computing section 715 collectively combined together correspond to an example of the computation section in the basic form. Moreover, the memory 73 and the control/computation section 702 collectively combined correspond to an example of the contact determination section in the basic form, and the control/computation section 702 alone corresponds to an example of the association determination section in the basic form described above.

Subsequently, a detailed description will be given as to a series of processes of the method of determining the TD heater value to be executed by the HDD 10 of this embodiment. In the HDD 10 of this embodiment, the contact between the head 1 and the magnetic disk 5 is detected by four detecting methods. These four methods are methods of detecting the contact between head 1 and the magnetic disk 5 by checking the changes with respect to four kinds of values to the increase in the heater value. The four different kinds of values are: the AGC gain value for the data; the AGC gain value for the position information; the position accuracy value; and the VTM value.

Figure 8:
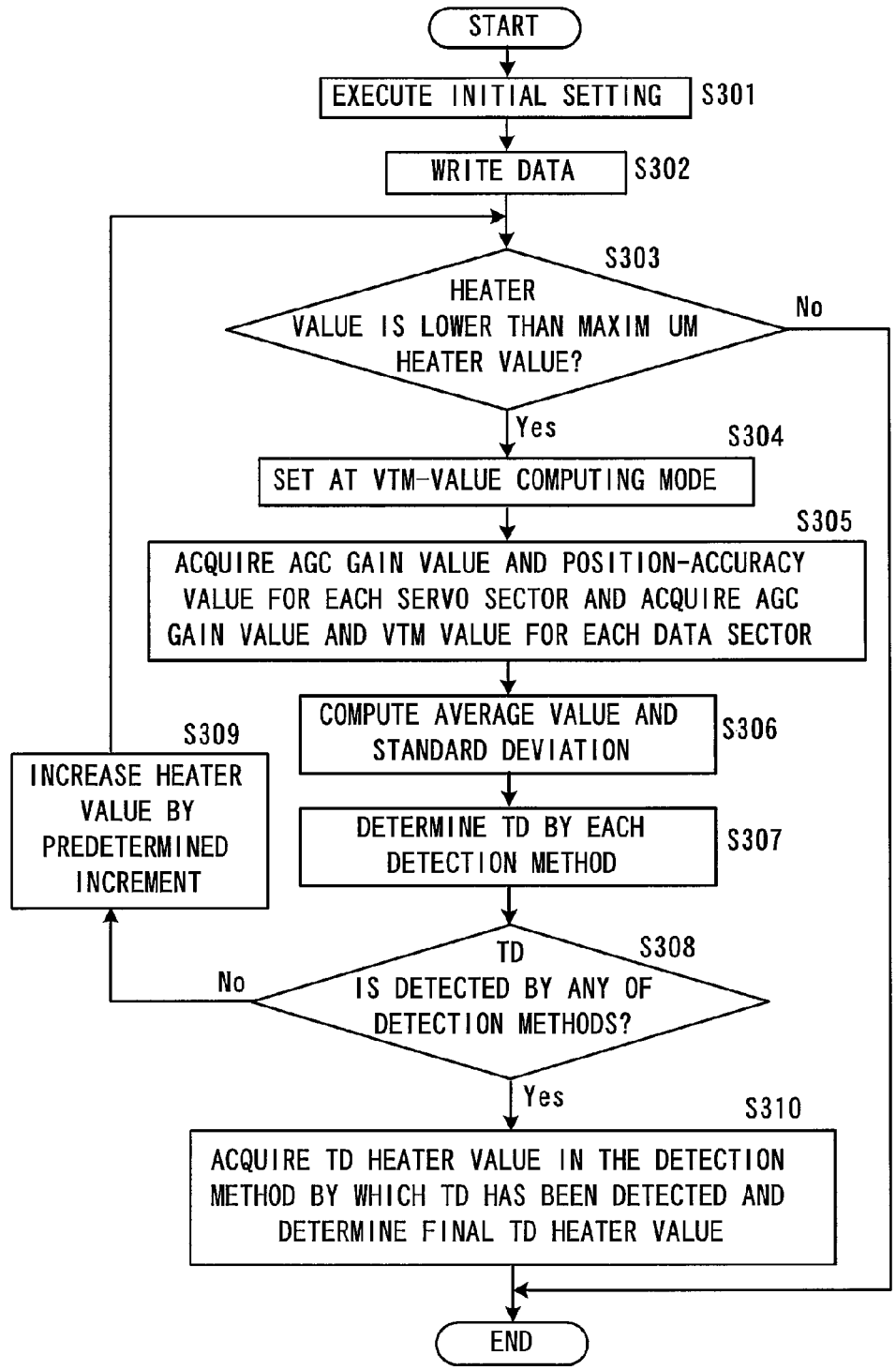
FIG. 8 is a flowchart illustrating the series of processes of the method of determining the TD heater value of this embodiment.

FIG. 8 is a flowchart illustrating the series of processes of the method of determining the TD heater value of this embodiment.

In the HDD of this embodiment, firstly, an initial setting process is executed for the heater control to identify the TD heater value (step S301). Specifically, in this initial setting process, the heater value is set at the initial value, zero. Besides, as will be described later, the increment by which the heater value is gradually increased little by little and the maximum value that the heater value is increased up to or the like are determined in this initial setting process. What follows the initial setting process is a process of writing identical data in all the data sectors 520 of a predetermined track 50 (step S302) of the magnetic disk. Then, whether or not the current heater value is lower than the maximum heater value is determined (step S303). The maximum heater value is sufficiently high at this time. Accordingly, it is determined that the current heater value is lower than the maximum heater value in this stage (step S303: YES). Subsequently, the MPU 70 sets the R/W channel 71 at the VTM-value computing mode (step S304). The subsequent process is one of causing the head 1 to start reading data from the data sectors 51 and the servo sectors 520 of the predetermined track 50, and thus the AGC gain value and the position accuracy value for each of the servo sectors 520 as well as the AGC gain value and the VTM value for each of the data sectors 51 are obtained (step S305). A detailed description will be given belois to how these values are obtained.

Figure 9:
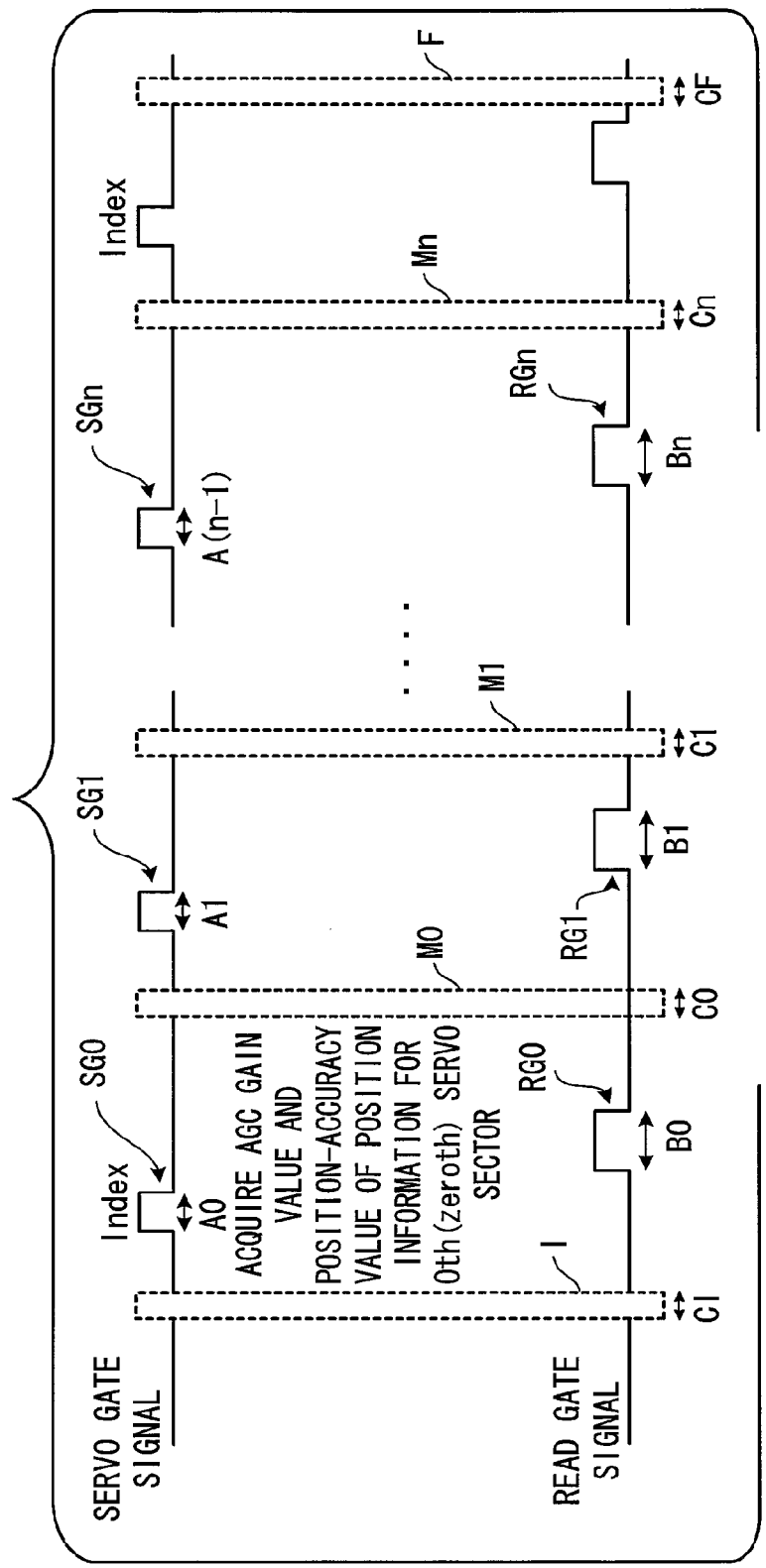
FIG. 9 is a timing chart illustrating a series of processes for acquiring the AGC gain value and the position accuracy value for each of the servo sectors 520 and for acquiring the AGC gain value and the VTM value for each of the data sectors 51.

FIG. 9 is a timing chart illustrating a series of processes for acquiring the AGC gain value and the position accuracy value for each of the servo sectors 520 and for acquiring the AGC gain value and the VTM value for each of the data sectors 51.

In FIG. 9, the AGC gain value and the position accuracy value for the position information of the 0th servo sector are obtained in the period A0, those of the 1st servo sector are obtained in the period A1, ..., and those of the (n−1) th servo sector are obtained in the period A (n−1). The AGC gain value and the VTM value for the data of the 0th data sector are obtained in the period B0, those of the 1st data sector are obtained in the period B1, ..., and those of the (n−1)th data sector are obtained in the period B (n−1). The setting at the VTM-value computing mode is performed in the period CI. The setting at the VTM-value computing mode is cancelled in the period CF. The obtained values for the 0th data sector and for the 0th servo sector are stored in the memory and then the register is initialized in the period C0, those for the 1st data sector and for the 1st servo sector are stored in the memory and the register is initialized in the period C1, ..., and those for the (n−1) th data sector and for the (n−1) th servo sector are stored in the memory and the register is initialized in the period C (n−1). The series of these processes will be described in detail below.

The servo gate signal and the read gate signal both of which are generated by the MPU 70 are illustrated on the same time axis in FIG. 9. The processing of the reproduction signal for the position information obtained from the servo sectors 520 is executed in the periods when the gate of the servo gate signal is at the high level. On the other hand, the processing of the reproduction signals for the data obtained from the data sectors 51 is executed in the periods when the gate of the read gate signal is at the high level. FIG. 9 describes also the specific contents of the processing executed by the R/W channel 71 in the periods when the gate of each of gate signals is at high level and the specific contents of the operations executed by the R/W channel 71 either before and after the period when the gate of each of the gate signals is at the high level. In FIG. 9, a period I is a preparatory period, in which the operation mode of the R/W channel 71 is set at the VTM-value computing mode as described above.

Identification data is recorded in a predetermined one of all the servo sectors 520 of the predetermined track 50. The determination data serves as a marker (Index) used for distinguishing the predetermined servo sector 520 from the other servo sectors 520. This determination data causes the MPU 70 of FIG. 7 to recognize the predetermined servo sector 520 as the leading (0th) servo sector 520 of all the servo sectors 520 of the predetermined track 50.

In FIG. 9, the reproduction signal of the position information for the 0th servo sector 520 is processed in a high-level period of the 0th gate of the servo gate signal—the period being referred to as the 0th servo-gate high-level period SG0. In this 0th servo-gate high-level period SG0, the AD converter section 714 acquires the AGC gain value and the position accuracy value for the reproduction signal of the position information recorded in the 0th servo sector 520, and the obtained AGC gain value and position accuracy value are recorded in the register section 713 of FIG. 7. Immediately after the termination of the 0th servo-gate high-level period SG0, the 0th gate of the read gate signal rises up to the higher level. The reproduction signal of the data for the 0th data sector 51 is processed in a high-level period of the 0th gate of the read gate signal—the period being referred to as the 0th read-gate high-level period RG0. The 0th data sector 51 is a data sector which is adjacent to the 0th servo sector 520, and is a next data sector that the head 1 approaches after the head 1 leaves the 0th servo sector 520. In this 0th read-gate high-level period RG0, the AD converter section 714 acquires the AGC gain value and the VTM value with respect to the reproduction signal of the data recorded in the 0th data sector 51. The obtained AGC gain value and VTM value are then recorded in the register section 713 of FIG. 7. The termination of the 0th servo-gate high-level period SG0 is followed by a period referred to as the 0th middle period M0. The AGC gain value of the reproduction signal for the position information, the AGC gain value of the reproduction signal for the data, the position accuracy value, and the VTM value, all of which are recorded in the register section 713 at the beginning of the 0th middle period M0, are stored in the memory 73 by the register-value acquisition section 703 in the MPU 70 of FIG. 7. Once the storing in the memory 73 has been finished, the register section 713 is initialized, so that the values that have been recorded in the register section 713 are deleted.

The termination of the 0th middle period M0 is followed by a high-level period of the 1st gate of the servo gate signal—the period being referred to as the 1st servo-gate high-level period SG1. The reproduction signal of the position information for the 1st servo sector 520 is processed in the 1st servo-gate high-level period SG1. In this 1st servo-gate high-level period SG1, the AD converter section 714 acquires the AGC gain value and the position accuracy value for the reproduction signal of the position information recorded in the 1st servo sector 520, and the obtained AGC gain value and position accuracy value are recorded in the register section 713. The termination of the 1st servo-gate high-level period SG1 is followed by a high-level period of the 1st gate of the read gate signal—the period being referred to as the 1st read-gate high-level period RG1. The reproduction signal of the data for the 1st data sector 51 is processed in the 1st read-gate high-level period RG1. In this 1st read-gate high-level period RG1, the AD converter section 714 acquires the AGC gain value and the VTM value for the reproduction signal of the data recorded in the 1st data sector 51, and the obtained AGC gain value and VTM value are recorded in the register section 713. The termination of the 1st servo-gate high-level period SG1 is followed by a period referred to as the 1st middle period M1. The AGC gain value of the reproduction signal for the position information, the AGC gain value of the reproduction signal for the data, the position accuracy value, and the VTM value, all of which are recorded in the register section 713 at the beginning of the 1st middle period M1, are stored in the memory 73 by the register-value acquisition section 703 in the MPU 70 of FIG. 7. Once the storing in the memory 73 has been finished, the register section 713 is initialized, so that the values that have been recorded in the register section 713 are deleted.

In this way, every time the gate of the servo gate signal or the gate of the read gate signal rises up to the higher level, the process of obtaining the AGC gain value of the reproduction signal for the position information, the AGC gain value of the reproduction signal for the data, the position accuracy value, and the VTM value together with the process of storing the obtained values in the memory 73 are repeatedly executed. Every single track 50 in the magnetic disk 5 includes (n+1) servo sectors 520—from the 0th to the (n−1)th servo sectors 520—and (n+1) data sectors 51—from the 0th to the (n−1)th data sectors 51. Accordingly, finally, the AGC gain value and the position accuracy value for the reproduction signal of the position information for the nth servo sector 520 are recorded in the register section 713 in a high-level period of the nth gate of the servo gate signal—the period being referred to as the nth servo-gate high-level period SGn. In addition, the AGC gain value and the VTM value for the reproduction signal of the data for the nth data sector 51, which is the last one of all the data sectors 51 in the predetermined track 50, are recorded in the register section 713 in a high-level period of the nth gate of the read gate signal—the period being referred to as the nth read-gate high-level period RGn. Moreover, all the values recorded in the register section 713 in the nth middle period Mn are stored in the memory 73.

After that, the head 1 approaches the above-mentioned predetermined servo sector 520 with the determination data recorded therein, and reads the determination data. The reading of the determination data causes the MPU 70 to recognize the termination of the reading for one complete round. Then, in the finishing period F of FIG. 9, the MPU 70 cancels the VTM-value computing mode that has been set as the operation mode of the R/W channel 71.

FIG. 10 is a table illustrating an example of addresses for storing the AGC gain values of the reproduction signals of both the position information and the data, the position accuracy values, and the VTM values all of which are stored in memory 73.

In FIG. 10, the addresses for storing the AGC gain values of the reproduction signals for the 0th to the nth servo sectors 520—there are (n+1) servo sectors 520 in total—are listed respectively in the cells of the column entitled "VGAS." The addresses for storing the position accuracy values for the (n+1) servo sectors 520 are listed respectively in the cells of the column entitled "Position." The addresses for storing the AGC gain values of the reproduction signals for the 0th to the nth data sectors 51—there are (n+1) data sectors 51 in total—are listed respectively in the cells of the column entitled "VGAR." The addresses for storing the VTM values for the (n+1) data sectors 51 are listed respectively in the cells of the column entitled "VTM." The numbers in the cells are four-digit numbers expressed by the hexadecimal notation, and represent respectively the storage addresses (storage locations) in the memory 73. Note that the suffix 'h' added to the end of the number put in each cell is a symbol indicating that the number is expressed by the hexadecimal notation. The cells of the columns entitled "Reserve" are reserved cells to be used if there are other values to be obtained than the AGC gain values, the position accuracy values, and the VTM values.

The following descriptions will be given by referring again to FIG. 8.

Once the acquisition of the AGC gain values, the position accuracy values, the VTM values for the servo sectors 520 and the data sectors 51 of one complete round of the track 50—there are (n+1) servo sectors 520 and (n+1) data sectors in total—has been completed, the control/computation section 702 provided in the MPU 70 of FIG. 7 computes the average value and the standard deviation for all the (n+1) servo sectors 520 on the basis of the AGC gain values and the position accuracy values for the (n+1) servo sectors 520. The average value and the standard deviation thus obtained are stored in the memory 73. In addition, the control/computation section 702 computes the average value and the standard deviation for all the (n+1) data sectors 51 on the basis of the AGC gain values and the VTM values for the (n+1) data sectors 51. The average value and the standard deviation thus obtained are stored in the memory 73 (step S306 in FIG. 8).

The average values and the standard deviations that have been stored in the memory 73 are used for detecting the contact between the head 1 and magnetic disk 5 with respect to each of the four different kinds of detection methods, which will be described in detail later (step S307). Then, a determination is made as to whether or not the contact between the head 1 and the magnetic disk 5 is detected by any of the detection methods (step S308). While the heater value is still small, the head 1 stays a sufficient distance away from the surface of the magnetic disk 5, so that no contact between the head 1 and the magnetic disk 5 is detected by any of the detection methods. Accordingly, the first time the determination of the step S307 is made, "No" is selected at the step S308.

Subsequently, the control/computation section 702 of FIG. 7 instructs the heater controller section 701 to increase the heater value by a predetermined increment (step S309). Using this new heater value, the above-described series of processes from the step S303 to the step S309 are executed again. The average values and the standard deviations of the two kinds of AGC gain values, those of the position accuracy values, and those of the VTM values are stored in the memory 73. As long as the heater value is lower than the maximum heater value (step S303: Yes), and as long as the head 1 stays a certain distance away from the magnetic disk 5 (step S308: No), the series of processes from the step S303 to the step S309 are repeatedly executed with the heater value being increased by the predetermined increment. With the gradual increasing of the heater value, the thermal expansion of the head 1 gradually shortens the distance between the head 1 and the magnetic disk 5. During this repeated execution of the series of processes, the average values and the standard deviations for the AGC gain values, those for the position accuracy value, and those for the VTM value for each heater value are stored in the memory 73.

FIG. 11 is a table illustrating exemplary addresses for storing the average values and the standard deviations of the AGC gain values of the reproduction signals for the position information and for the data, those of the position accuracy values, and those of the VTM values all of which are stored in memory 73.

As described above, the heater value is gradually increased from zero by a predetermined increment. To list the addresses for storing the average values and the standard deviations of the AGC gain values of the reproduction signals for the position information and for the data, those of the position accuracy values, and those of the VTM values all of which are stored in memory 73, FIG. 11 lists those addresses for each increased heater value. In FIG. 11, the addresses for storing the average values and the standard deviations of the AGC gain values of the reproduction signals of the position information from the servo sectors 520 are listed respectively in the cells of the columns entitled "VGAS Average" and "VGAS Deviation." The addresses for storing the average values and the standard deviations of the position accuracy values for the servo sectors 520 are listed respectively in the cells of the columns entitled "Position Average" and "Position Deviation." The addresses for storing the average values and the standard deviations of the AGC gain values of the reproduction signals of the data from the data sectors 51 are listed respectively in the cells of the columns entitled "VGAR Average" and "VGAR Deviation." The addresses for storing the average values and the standard deviations of the VTM values are listed respectively in the cells of the columns entitled "VTM Average" and "VTM Deviation." The numbers in the cells are four-digit numbers expressed by the hexadecimal notation, and represent respectively the storage addresses (storage locations) in the memory 73. Note that the suffix 'h' added to the end of the number put in each cell is a symbol indicating that the number is expressed by the hexadecimal notation. The cells of the columns entitled "Reserve" are reserved cells to be used if there are other values to be obtained than the average values and the standard deviations of the two different kinds of AGC gain values, those of the position accuracy values, and those of the VTM values.

FIG. 12 is a graph illustrating an example in which the average value and the standard deviation of the AGC gain values of the reproduction signals for the data change as the heater value increase. FIG. 13 is a graph illustrating an example in which the average value and the standard deviation of the AGC gain values of the reproduction signals for the position information change as the heater value increase. FIG. 14 is a graph illustrating an example in which the average value and in the standard deviation of the VTM values change as the heater value increase. FIG. 15 is a graph illustrating an example in which the heater value causes the average value and in the standard deviation of the position accuracy values change as the heater value increase.

Figure 12A:
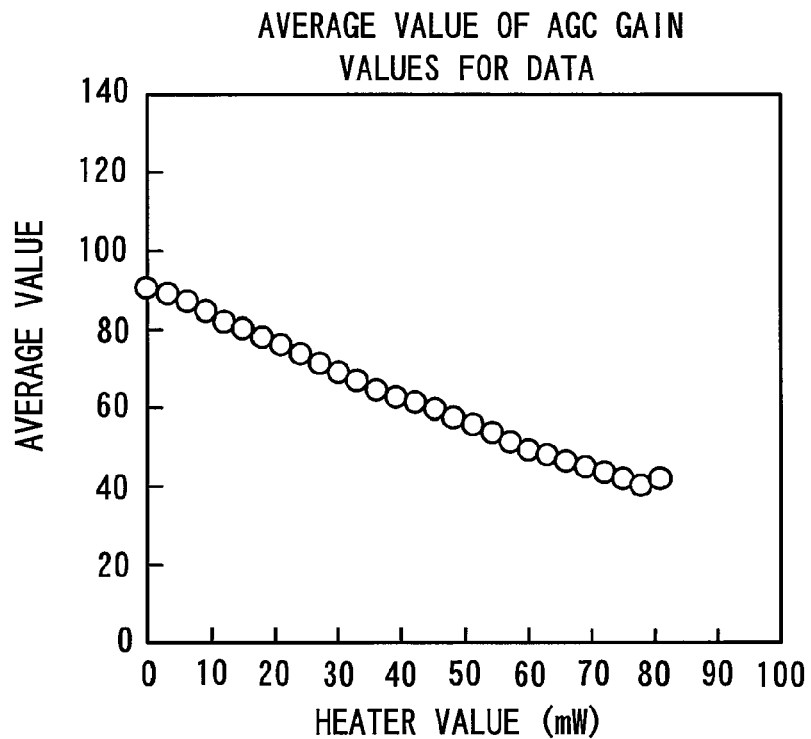
FIGS. 12A and 12B are graphs illustrating an example in which the average value and the standard deviation of the AGC gain values of the reproduction signals for the data change as the heater value increase.
Figure 13A:
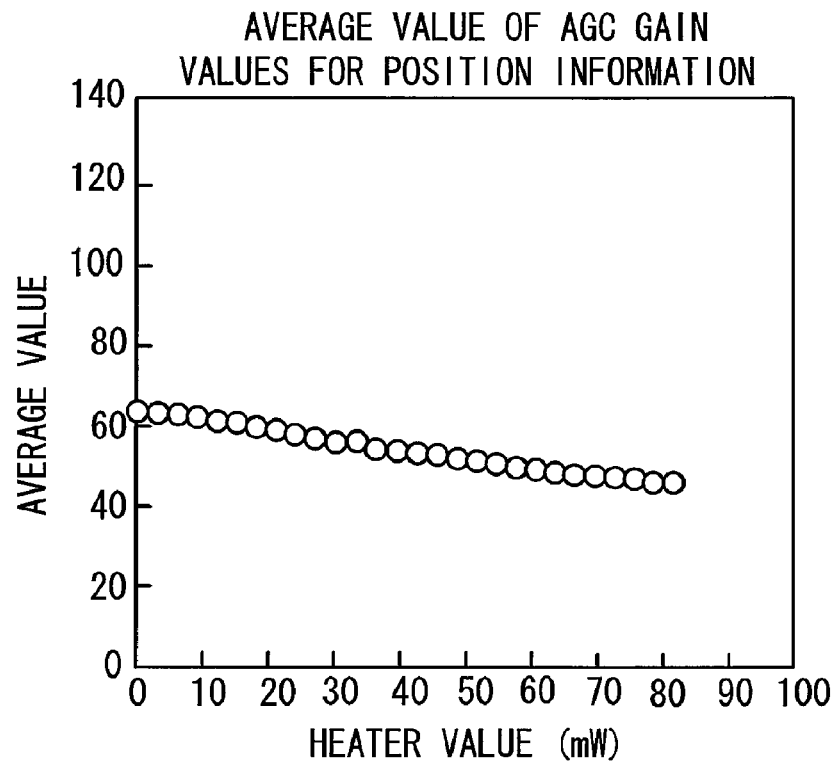
FIGS. 13A and 13B are graphs illustrating an example in which the average value and the standard deviation of the AGC gain values of the reproduction signals for the position information change as the heater value increase.

FIG. 12A illustrates the changes in the average value of the AGC gain values of the reproduction signals for the data FIG. 13A illustrates the changes in the average value of the AGC gain values of the reproduction signals for the position information. As long as the head 1 stays away from the surface of the magnetic disk 5, the heater value increases so that the distance between the head 1 and the magnetic disk 5 becomes shorter, a shorter distance between the head 1 and the magnetic disk 5 in turn enhances the reading accuracy, so that a signal level of the reproduction signal obtained by the reading from the magnetic disk 5 becomes higher. For this reason, while the heater value is small and the head 1 stays away from the surface of the magnetic disk 5, the average value of the AGC gain values decreases as the heater value increases from zero, as illustrated in FIG. 12A and Part FIG. 13A.

Figure 12B:
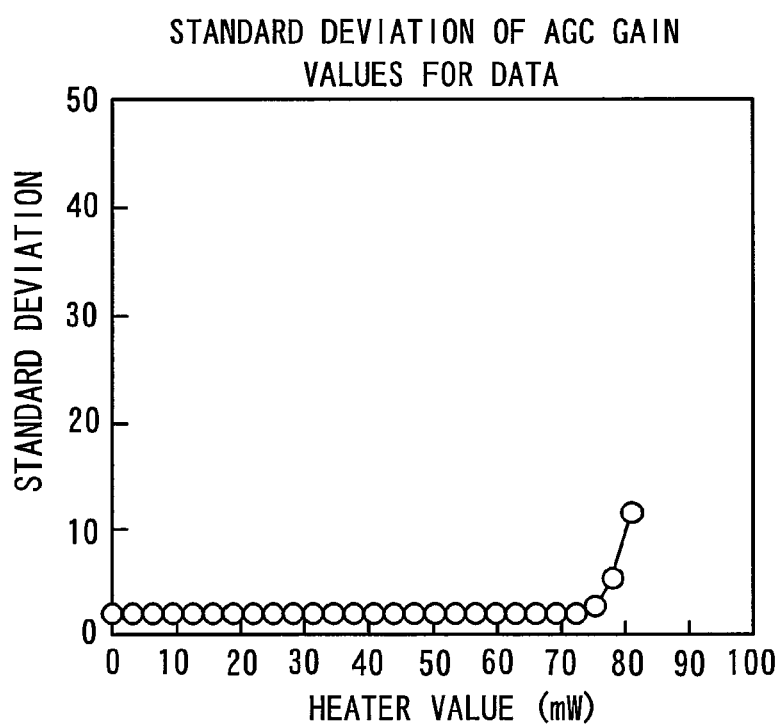
Figure 13B:
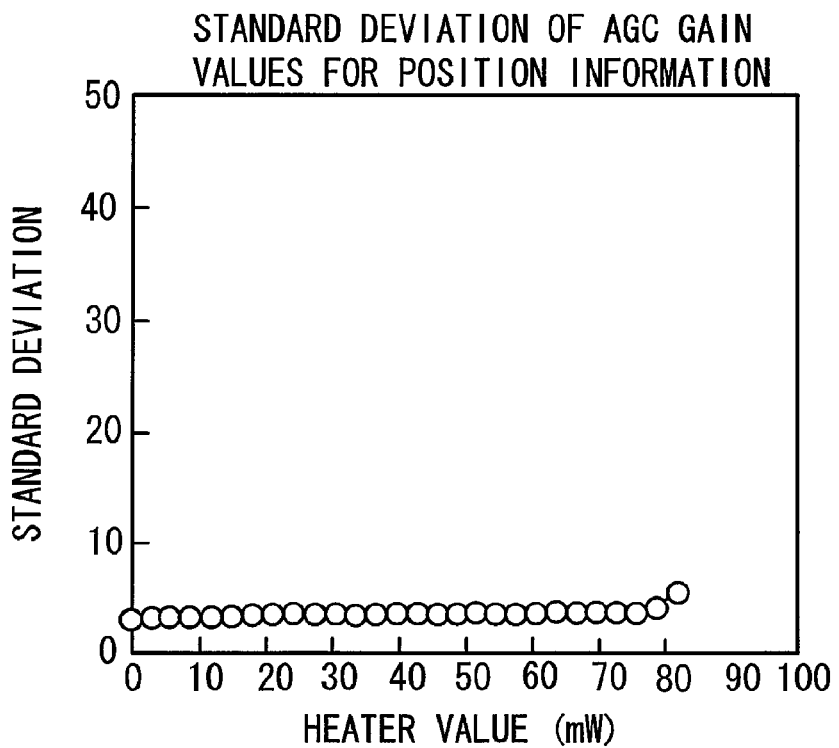

FIG. 12B illustrates the changes of the standard deviation of the AGC gain values of the reproduction signals for the data whereas FIG. 13B illustrates the changes in the standard deviation of the AGC gain values of the reproduction signals for the position information. While the head 1 stays a certain, constant distance away from the surface of the magnetic disk 5, the signal levels of the individual reproduction signals obtained by the reading of the servo sectors 520 and of the data sectors 51 are not very different from one another among these sectors 520 and 51. Accordingly, the standard deviation of the AGC gain values is small. For this reason, while the heater value is small and the head 1 stays away from the surface of the magnetic disk 5, the standard deviation of the AGC gain values is kept almost constant and small in spite of the increase in the heater value from zero. Such a changing pattern is observable in each of FIG. 12B and FIG. 13B.

Figure 14A:
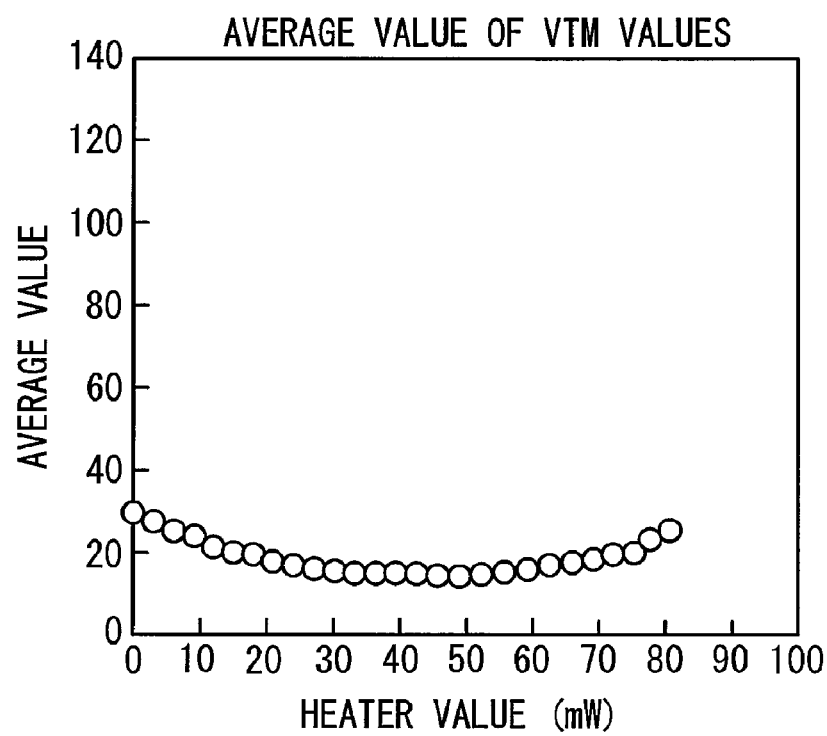
FIGS. 14A and 14B are graphs illustrating an example in which the average value and in the standard deviation of the VTM values change as the heater value increase.

FIG. 14A illustrates how the average value of the VTM values changes along with the increase in the heater value. As long as the head 1 stays away from the surface of the magnetic disk 5, an increase in the heater value shortens the distance between the head 1 and the magnetic disk 5, and a shorter distance between the head 1 and the magnetic disk 5 in turn enhances the reading accuracy, resulting in less frequent reading errors and thus in a decrease in the VTM value. For this reason, while the heater value is small and the head 1 stays away from the surface of the magnetic disk 5, the average value of the VTM values decreases little by little along with the increase in the heater value from zero. Such a changing pattern is observable in FIG. 14A.

Figure 14B:
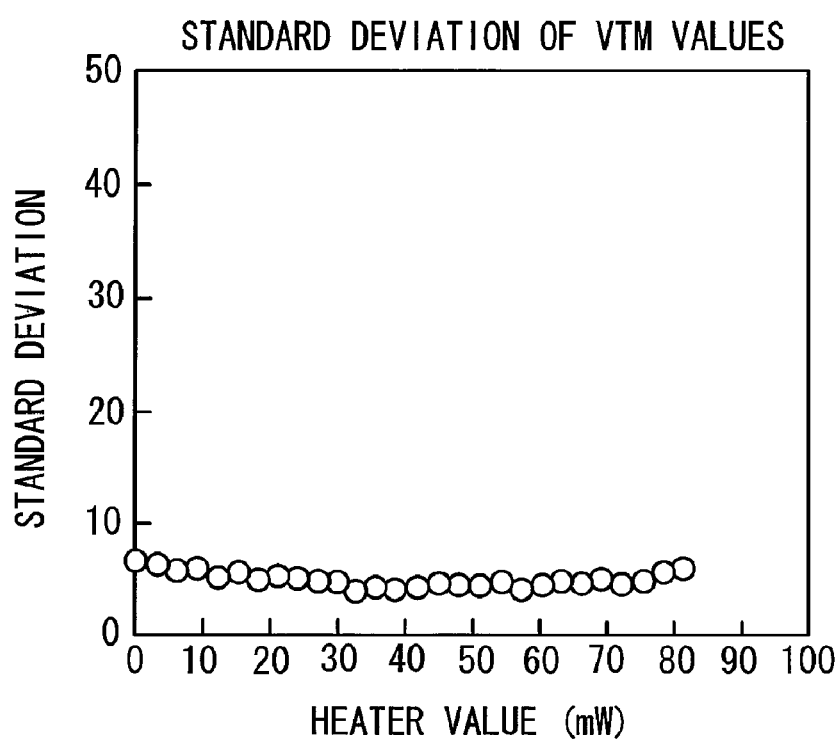

FIG. 14B illustrates how the standard deviation of the VTM values changes along with the increase in the heater value. While the head 1 stays a certain, constant distance away from the surface of the magnetic disk 5, the VTM values obtained by the reading of the data sectors 51 are not very different from one another among these data sectors 51. Accordingly, the standard deviation of the VTM values is small. For this reason, while the heater value is small and the head 1 stays away from the surface of the magnetic disk 5, the standard deviation of the VTM values changes little and is kept small in spite of the increase in the heater value from zero. Such a changing pattern is observable in FIG. 14B.

Figure 15A:
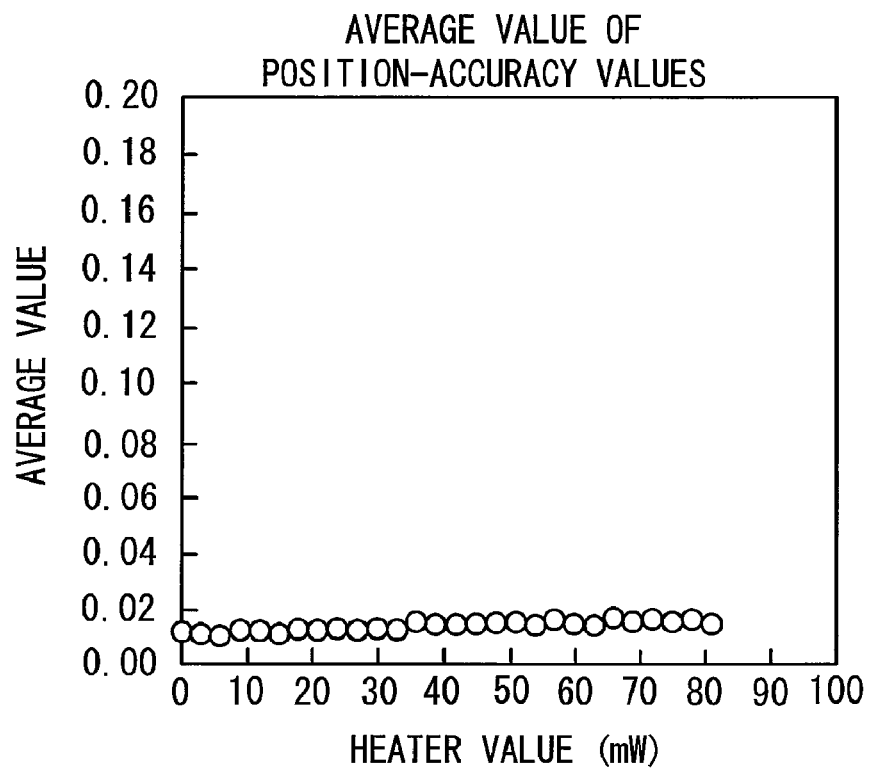
FIGS. 15A and 15B are graphs illustrating an example in which the heater value causes the average value and in the standard deviation of the position accuracy values change as the heater value increase.

FIG. 15A illustrates how the average value of the position accuracy values changes along with the increase in the heater value. In the HDD 10 of this embodiment, as far as the head 1 stays away from the surface of the magnetic disk 5, the head 1 is positioned, with quite high accuracy, at a desired position in the radial direction of the magnetic disk 5. For this reason, while the heater value is small and the head 1 stays away from the surface of the magnetic disk 5, the average value of the position accuracy values changes little and is kept small in spite of the increase in the heater value from zero. Such a changing pattern is observable in FIG. 15A.

Figure 15B:
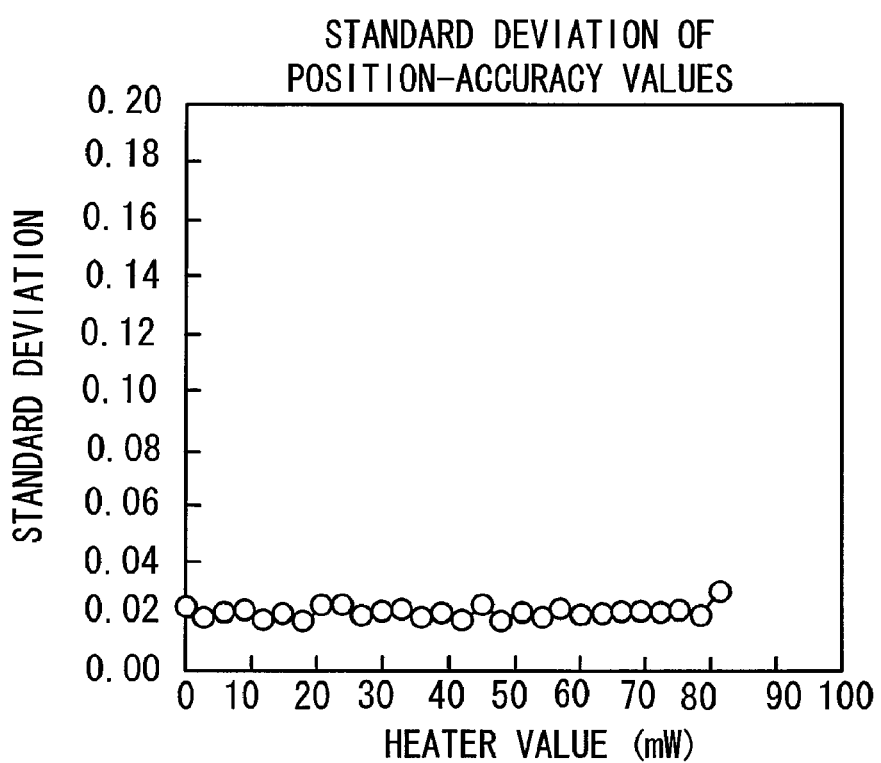

FIG. 15B illustrates how the standard deviation of the position accuracy values changes along with the increase in the heater value. While the head 1 stays a certain, constant distance away from the surface of the magnetic disk 5, the position accuracy values obtained by the reading of the servo sectors 520 are not very different from one another among these servo sectors 520. Accordingly, the standard deviation of the position accuracy values is small. For this reason, while the heater value is small and the head 1 stays away from the surface of the magnetic disk 5, the standard deviation of the position accuracy values changes little and is kept small in spite of the increase in the heater value from zero. Such a changing pattern is observable in FIG. 15B.

The detailed descriptions given above concern the behaviors of the average values and those of the standard deviations of the four different kinds of values—the AGC gain value of the reproduction signal for the position information, the AGC gain value of the reproduction signal for the data, the position accuracy value, and the VTM value—while the heater value is still small and the head 1 stays away from the surface of the magnetic disk 5. As the processes from the step S303 to the step S309 are repeated time and time again with the heater value being gradually increased by the predetermined increment, the head 1 eventually starts to be in contact with the surface of the magnetic disk 5. Once the head 1 has started to be in contact with the surface of the magnetic disk 5, the average values and the standard deviations for the four different kinds of values start to behave differently from their respective behaviors of the case where the heater value is still small and the head 1 stays away from the surface of the magnetic disk 5.

For example, for the average values of the AGC gain values of the reproduction signals for data and for the position information, once the head 1 has started to contact the magnetic disk 5, the contact between the head 1 and the magnetic disk 5 prevents the increase in the heater value from changing the signal level of the reproduction signal. Thus becomes observable is a state in which each of the average values of the AGC gain values of the reproduction signals for data and for the position information is not changing (i.e., the saturation state of the average value of the AGC gain value). In some cases, the head 1 repeatedly collides with the uneven surface of the magnetic disk 5, so that changes in the average value of the AGC gain values may be observed. For example, the average value of the AGC gain values hardly changes when the heater value reaches approximately 80 mW in FIG. 13A whereas the average value of the AGC gain values increases a little when the heater value reaches approximately 80 mW in FIG. 12A.

In addition, once the head 1 has started to be in contact with the uneven surface of the magnetic disk 5, the AGC gain values sometimes differ from one another among sectors, so that the standard deviation of the AGC gain values sometimes becomes larger. For example, a rapid rise of the standard deviation of the AGC gain values is observed when the heater value is equal to or higher than 75 mW in FIG. 12B whereas a moderate rise of the standard deviation of the AGC gain values is observed when the heater value is equal to or higher than 80 mW in FIG. 13B.

In addition, once the head 1 has started to contact the magnetic disk 5, the average value of the VTM values becomes more likely to increase rapidly due to the more frequent occurrence of reading errors. Once the head 1 has started to collide with the uneven surface of the magnetic disk 5, the VTM values become likely to differ from one another among the data sectors 51, so that the standard deviation of the VTM values sometimes increases rapidly.

Moreover, once the head 1 has started to be in contact with the magnetic disk 5, the head 1 starts to collide with the uneven surface of the magnetic disk 5, so that the reading position of the head 1 becomes more likely to be significantly offset, in the radial direction of the magnetic disk 5, from the center position of each servo sector 520. What becomes sometimes observable accordingly is a phenomenon in which the position accuracy value (i.e., the value representing the distance between the reading position and the center position) becomes larger. In addition, once the head 1 has started to collide with the uneven surface of the magnetic disk 5, the position accuracy values are more likely to differ from one another among the servo sectors 520, so that the standard deviation of the position accuracy values sometimes increases rapidly.

The likelihood of the occurrence the above-described characteristic ways of changing depends significantly on how the head 1 contacts the magnetic disk 5. Accordingly, the differences in such environmental factors as the shape of the surface of the magnetic disk, the temperature, and the humidity are likely to result in different ways of changing. For this reason, different TD heater values are likely to be determined respectively by the four different detection-target variables.

So, if the determination of the TD heater value is based on only one of those characteristic ways of changing, the determined TD heater value may be a little larger than the actual heater value, or, in some cases, it may be erroneously determined that the head 1 is not in contact with the magnetic disk 5.

For example, in FIG. 13B and in FIG. 15B, a heater value that is equal to or larger than 80 mW increases the standard deviation a little, but for a heater value in a range from 75 mW to 80 mW, no change in the standard deviation is observable. In contrast, in FIG. 12B, a heater value that is equal to and larger than 75 mW causes a change in the standard deviation. Accordingly, the TD heater value that is determined on the basis of either FIG. 13B alone or FIG. 153 alone may be larger than the actual TD heater value. In addition, no noticeable change are seen in the average value of FIG. 14A, in the standard deviation of FIG. 19B, or in the average value of FIG. 15A. Accordingly, if whether or not the head 1 contacts the magnetic disk 5 is determined on the basis of FIG. 14A alone, FIG. 14B alone, or FIG. 15A alone, it may be incorrectly determined that the head 1 is not in contact with the magnetic disk 5.

As describe above, if the method of determining the TD heater value through the detection of the contact between the head 1 and the magnetic disk 5 is based on only either one of the four different kinds of values alone, the accuracy of the heater value becomes low depending on a manner of contact between the head 1 and the magnetic disk 5. Consequently, the association of the heater value with the distance between the head 1 and the magnetic disk 5 lacks precision. For this reason, the adoption of such a method may bring the head 1 into frequent contact with the magnetic disk 5 at the time of access, and may thus cause a physical damage of the magnetic disk 5.

In the HDD 10 of this embodiment, plural tables are stored in the memory 73 of FIG. 7. Each of the tables includes the contents of the methods of determining the contact between the head 1 and the magnetic disk 5 together with the information on which one of the four different kinds of values is the target of the determination and the information on which one of the average value of and the standard deviation of the determination target is used in the determination of the contact. Each of the determination methods of their respective tables is used in detecting the above-described characteristic way of changing that is observable at the time of the contact between the head 1 and the magnetic disk 5 in either the average value of or the standard deviation of the determination target designated by the table. Note that each of the four different kinds of values is included, as the determination target, in at least one of the plural tables, so that all of the four different kinds of values are used for determining the contact.

In addition, among the plural tables, for an same determination target, there exist a table in which the determination method with respect to the average is defined and a table in which the determination method with respect to the standard deviation is defined. For at least one of the four different kinds of determination-target values, both the determination based on the average value and the determination based on the standard deviation are performed.

Moreover, among the plural tables, there exists tables in which, for a same determination target, different determination contents are defined in each table, respectively. For at least one of the four different kinds of determination-target values, different determination methods with respect to the average value are performed.

In the HDD 10 of this embodiment, every time the heater value is increased by the predetermined increment, determination of the contact is made by the control/computation section 702 of FIG. 7 following the instructions in each of these plural tables (step S308 in FIG. 8). If it is determined that there exists a contact (step S308 in FIG. 8: Yes), the TD heater value is determined every time it is determined that the contact occurs. Note that, as will be described later, ways of determining the TD heater value are different in general respectively in each table. Accordingly, the same heater value at the time of determination that the contact occurs, if combined with the determination ways of different tables, may result in different TD heater values.

In addition, the control/computation section 702 of FIG. 7 obtains the lowest one of the TD heater values thus determined. When the heater value is associated with the distance between the head 1 and the magnetic disk 5, the lowest TD heater value is used as the reference heater value (hereafter, referred to as the final TD heater value) at which the distance between the head 1 and the magnetic disk 5 is considered to be zero (step S310 in FIG. 8). The control/computation section 702 determines the association on the basis of the final heater value.

As described above, in this embodiment, the TD heater values are obtained on the basis of either the average value for or the standard deviation for the four different kinds of values respectively. The lowest one of the TD heater values thus obtained is adopted as the final TD heater value. For this reason, in this embodiment, the accuracy of the reference TD heater value for determining the association is much higher accuracy than the method in which the reference TD heater value is determined on the basis of only either one of the four different kinds of values alone. Accordingly, the distance between the head 1 and the magnetic disk 5 is associated with the heater value more accurately. The accurate association prevents the head 1 from being unnecessarily brought into contact with the magnetic disk 5 while the head 1 is accessing the magnetic disk 5. Consequently, the magnetic disk 5 is protected from the damage that would otherwise be caused by such an unnecessary contact.

Note that, in this embodiment, as described in the description of FIG. 9, while the head 1 is rotated just one complete round of the track 50 relative to the magnetic disk 5, all the necessary information may be obtained from all the servo sectors 520 and from all the data sectors 51. Accordingly, even though all the methods of determining the TD heater value using the four different kinds of determination-target values are executed, it takes only a short time for execution.

In addition, in the HDD 10 of this embodiment, as described above, for at least one of the four different kinds of determination-target values, both the average value for and the standard deviation are used in the determination of the contact. Accordingly, the final TD heater value is more accurate.

Moreover, in the HDD 10 of this embodiment, for at least one of the four different kinds of determination-target values, two different determination methods with respect to the average value are adopted. Also for this reason, the accuracy of the final TD heater value is further improved.

Furthermore, in the HDD 10 of this embodiment, if at least one TD heater value is determined through the changing in the average values for and the standard deviation of the four different kinds of determination-target values, 'Yes' is selected at the step S308 in FIG. 8, and the heater value is not any longer increased by the predetermined increment. Accordingly, the advancing of the contact between the head 1 and the magnetic disk 5 is limited to a minimum level.

Detailed descriptions will be given belois to the methods of determination based on the tables mentioned above in the HDD 10 of this embodiment. The following five exemplary methods of determining the contact between the head 1 and the magnetic disk 5 are based respectively on five specific exemplary tables in which the determination-target value includes the AGC gain value of the reproduction signal for data. Four of these five determination methods are based on the changing in the average value of the AGC gain value whereas the one rest of the five methods is based on the changing in the standard deviation of the AGC gain value.

First of all, a first one of the four determination methods based on the changing in the average value will be described below.

FIGS. 16A to 16F illustrate diagrams for explaining the first determination method based on the changing in the average value of the AGC gain values of the reproduction signals for data.

Figure 16A:
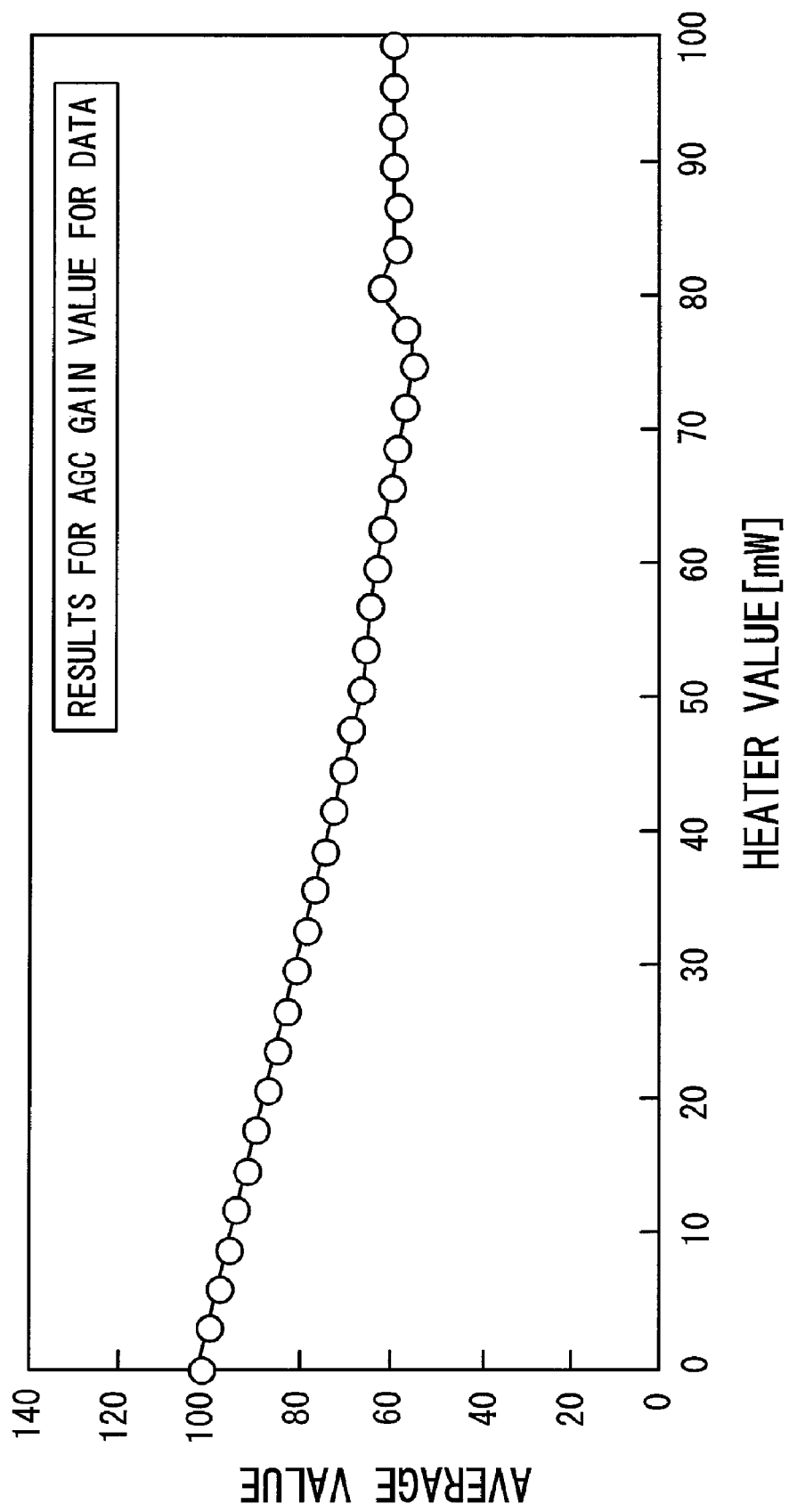

FIG. 16A illustrates exemplary changing in the average value of the AGC gain values of the reproduction signals for data to the increase in the heater value. Note that the average values of the AGC gain values given in FIG. 16A correspond to the range of heater values from 0 mW to 100 mW, but this is only for explanatory purpose. As will be described later, the increase of the heater value is actually stopped once it is determined that the head 1 contacts the magnetic disk 5. Accordingly, the AGC values for the heater values larger than the heater value at the time of the determination for the occurrence of the contact are not acquired.

In the first determination method, for each of the average values of the AGC gain values, a difference value between the average value of the AGC gain values at each heater value and the average value of the AGC gain values at the subsequent heater value, that is, the heater value at the one-step higher level are determined. To put it differently, the difference is obtained every two average values in which the difference between their respective heater values is equal to one of the predetermined increment that is an increase width of the heater value.

FIG. 16B illustrates the changing in the difference value between the average values of the AGC gain values to the increase in the heater value. FIG. 16B illustrates, the difference value changes only moderately while the heater value is small, and, specifically, each of the difference values is around two in this example. Note that the increment of the heater value corresponds to the predetermined amount at step S309 of FIG. 8 and is a certain, constant amount. For this reason, the difference value at each heater value is substantially equal to the gradient of the AGC gain values at each of the heater values.

Subsequently, the average value is determined for the difference values with respect to the heater values within a heater-value range that has been designated in advance by the user.

FIG. 16C illustrates a designated range that is the heater value range designated in advance by the user. FIG. 16C also illustrates the average value of the difference values at their respective heater values within the designated heater-value range. FIG. 16C, the designated range is indicated as a range between two heater values of the two a dotted-line circles in the drawing. FIG. 16C illustrates, the designated range is a range that is designated within an area with relatively-small heater values. For this reason, while the heater value is within this designated range, the head 1 is considered to be sufficiently away from the magnetic disk 5. Accordingly, the average value of the difference values for the heater values within this designated range corresponds to the gradient of the average value of the AGC gain values in a state where the head 1 is not in contact with the magnetic disk 5.

As will be described in more detail later, a threshold is used for determining whether or not the head 1 contacts the magnetic disk 5 according to this first determination method. The threshold is obtained by multiplying the average value of the difference values by a predetermined reference value that has been determined in advance in accordance with the first determination method. This predetermined reference value is a value for determining a ratio of the threshold to the gradient of the AGC gain values in a state where the contact between the head 1 and the magnetic disk 5 does not take place. There is a reason why the threshold itself is not directly defined, but the ratio of the threshold is defined instead. The reason is that in general, even HDDs of the same model sometimes differ from one another in the gradient of the AGC gain value with respect to the increase in the heater value. Such differences derive from the different characteristics of the individual heads and from the different characteristics of the individual magnetic disks.

FIG. 16C illustrates the threshold that is used for determining whether or not the head 1 contacts the magnetic disk 5. In this first determination method, the ratio of the threshold is defined as a value that is smaller than 1. At most of the heater values, the threshold is below their respective difference values.

According to this first determination method, every time the average value of the AGC gain values is obtained, a determination is made as to whether or not there are two consecutive difference values below the threshold. If there appears two consecutive difference values that are below the threshold, it is determined that the head 1 contacts the magnetic disk 5. Then, further increasing of the heater value is stopped.

Figure 16E:
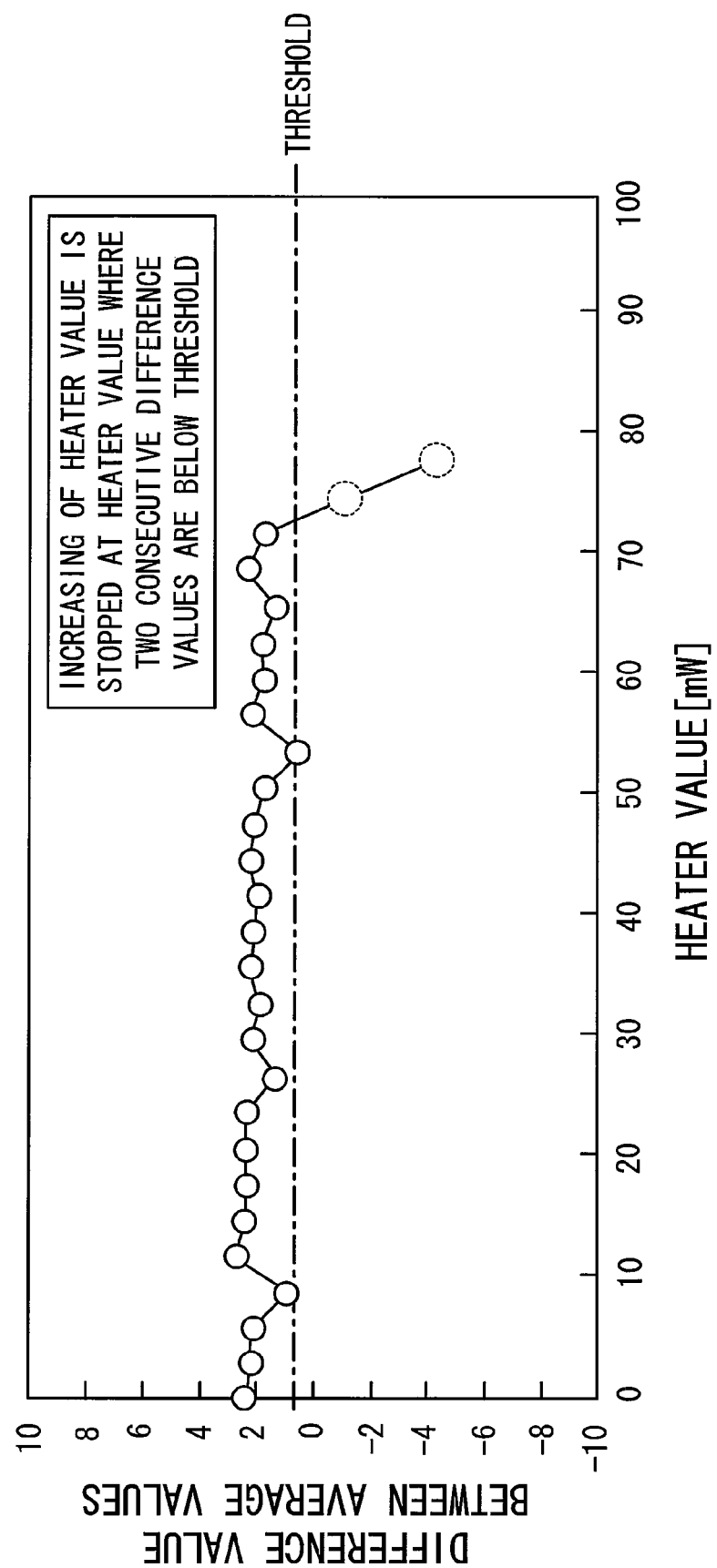

FIG. 16E illustrates the state where there appear two consecutive difference values below the threshold and thus the heater value stops increasing. In FIG. 16D, the two consecutive difference values indicated by the dotted-line circles are below the threshold. At this stage, it is determined that the head 1 contacts the magnetic disk 5, and further increasing of the heater value is stopped. In FIG. 16E, those heater values larger than the heater value indicated by the right-hand one of the two dotted-line circles are not illustrated to indicate that further increasing of the heater value is stopped.

Then, according to this first determination method, the heater value for the last one of the difference values not below the threshold is determined as the TD heater value.

FIG. 16F illustrates the last one of the difference values not below the threshold. In FIG. 16F, the difference value positioned at the immediately left-hand side of the two consecutive difference values below the threshold is indicated by the dotted-line circle. The difference value indicated by the dotted-line circle is the last difference value that is not below the threshold, and the heater value for this last difference value is determined as the TD heater value.

The table corresponding to the above-described first determination method includes the following pieces of information: the information about the fact that the determination-target value used for determining whether or not the head 1 contacts the magnetic disk 5 is the ACG gain value of the reproduction signal for data, and the determination is made using the average value of the AGC gain values; the information about the fact that, as a component to obtain the difference value for each average value, the difference value between the average value of the AGC gain values for each heater value and that for the subsequent heater value, that is, for the heater value at the one-step higher level is used; the information on the predetermined reference value; and the information about the fact that, if two consecutive difference values are below the threshold, it is determined that the head 1 contacts the magnetic disk 5.

Next, a second one of the four determination methods based on the changing in the average value will be described below.

FIGS. 17A to 17F include charts for explaining the second determination method based on the changing in the average value of the AGC gain values of the reproduction signals for data.

Figure 17A:
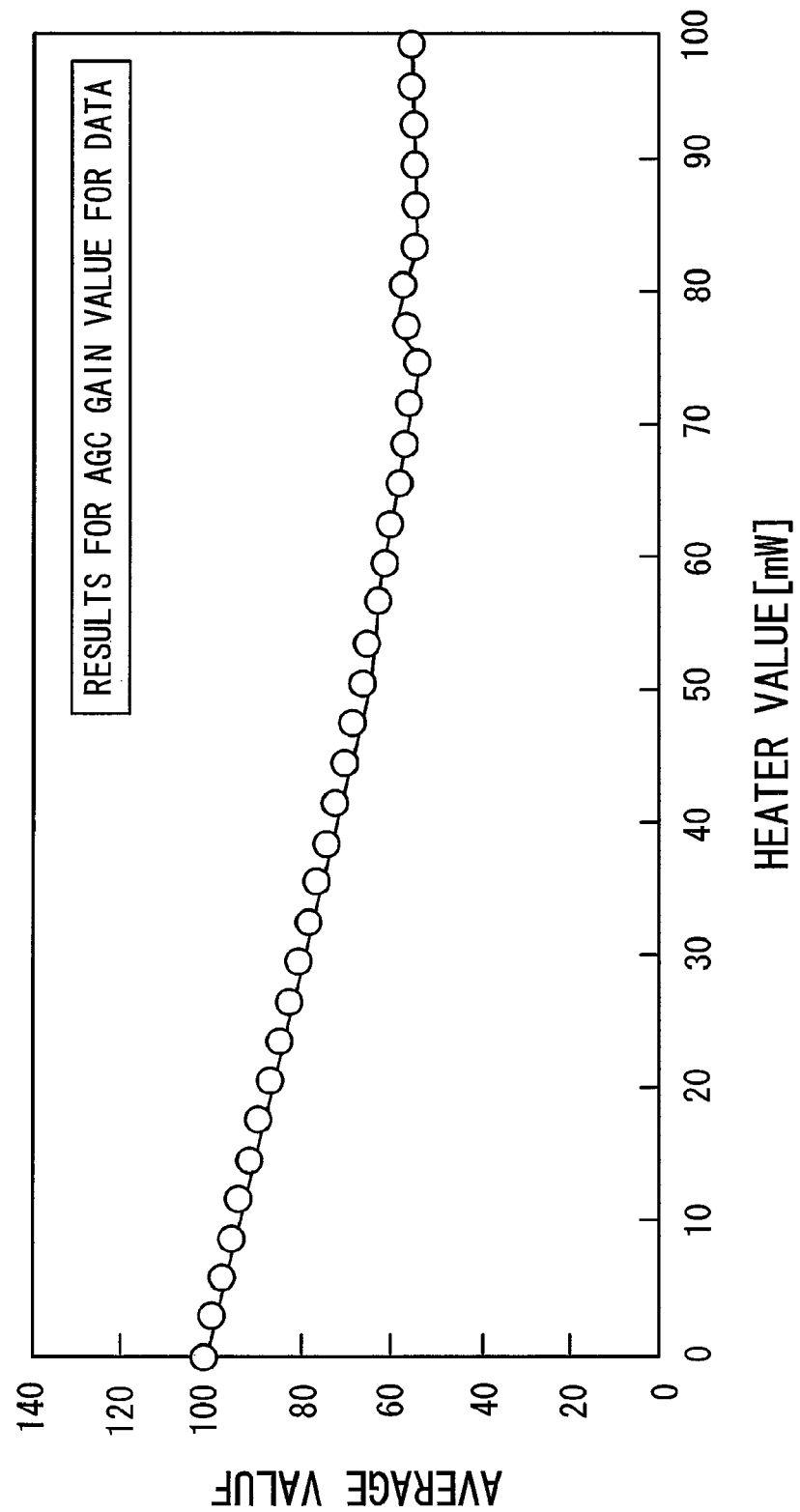
FIGS. 17A to 17F include charts for explaining the second determination method based on the changing in the average value of the AGC gain values of the reproduction signals for data.

FIG. 17A illustrates exemplary changing in the average value of the AGC gain values of the reproduction signals for data to the increase in the heater value. Note that the average values of the AGC gain values given in FIG. 17A also are also illustrated in the range of heater values from 0 mW to 100 mW, but this is only for explanatory purpose. As will be described later, increasing of the heater value is actually stopped once it is determined that the head 1 contacts the magnetic disk 5. Accordingly, the AGC values for the heater values larger than the heater value at the time of the determination for the occurrence of the contact will not be obtained in the first place.

Also in the second determination method, for each of the average values of the difference value between the average value of the AGC gain values at each heater value and the average value of the AGC gain values at the subsequent heater value are determined, that is, the heater value at the one-step higher level. To put it differently, the difference is obtained every two average values in which the difference between their respective heater values is equal to one time of the predetermined increment of the heater value.

Figure 17B:
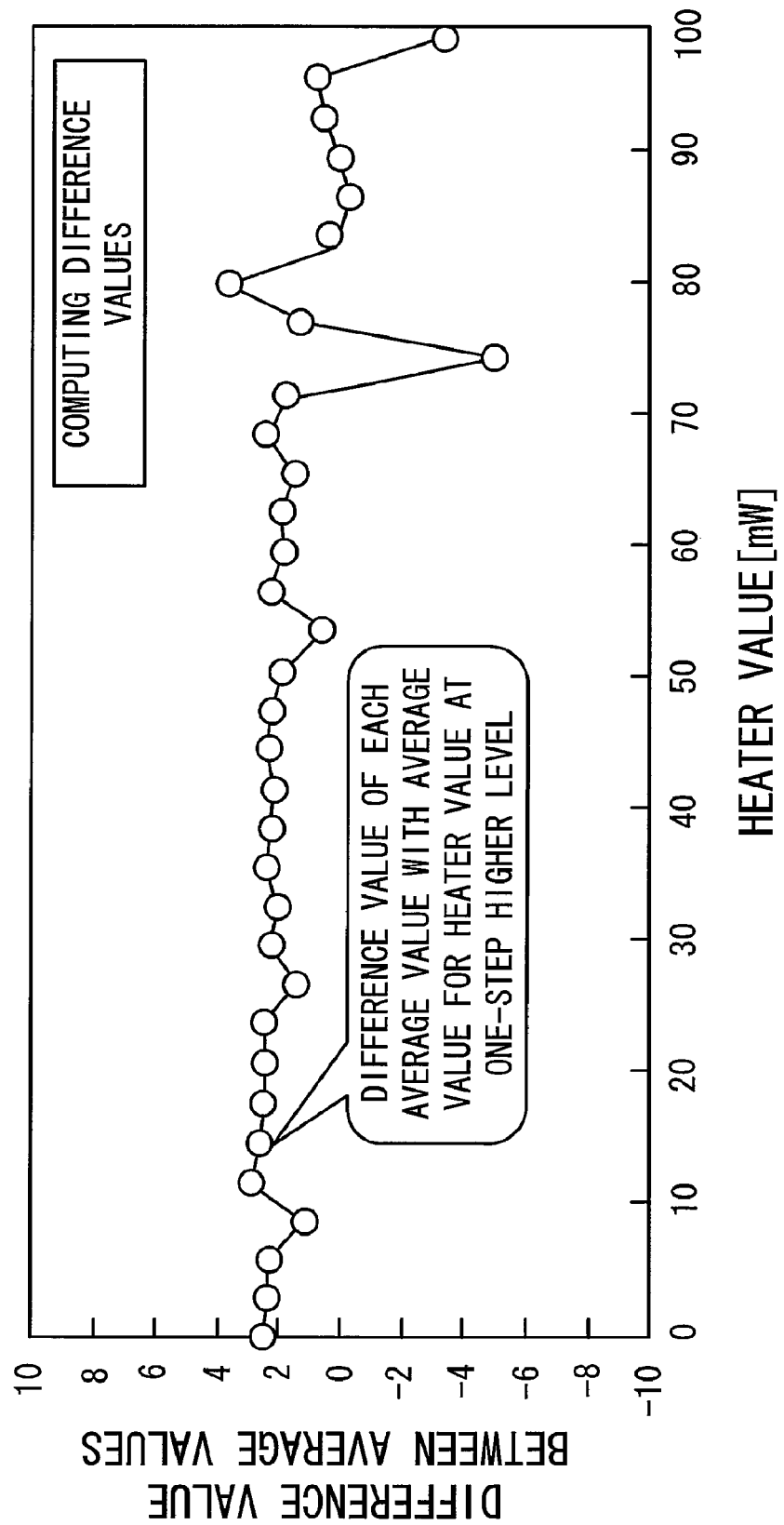

FIG. 17B illustrates the changing in the difference value between the average values of the AGC gain values to the increase in the heater value. As FIG. 17B illustrates, the difference value changes only moderately when the heater value is small, and, specifically, each of the difference values is around two in this example.

Subsequently, the average value is determined for the difference values with respect to the heater values within a heater-value range that has been designated in advance by the user.

Figure 17C:
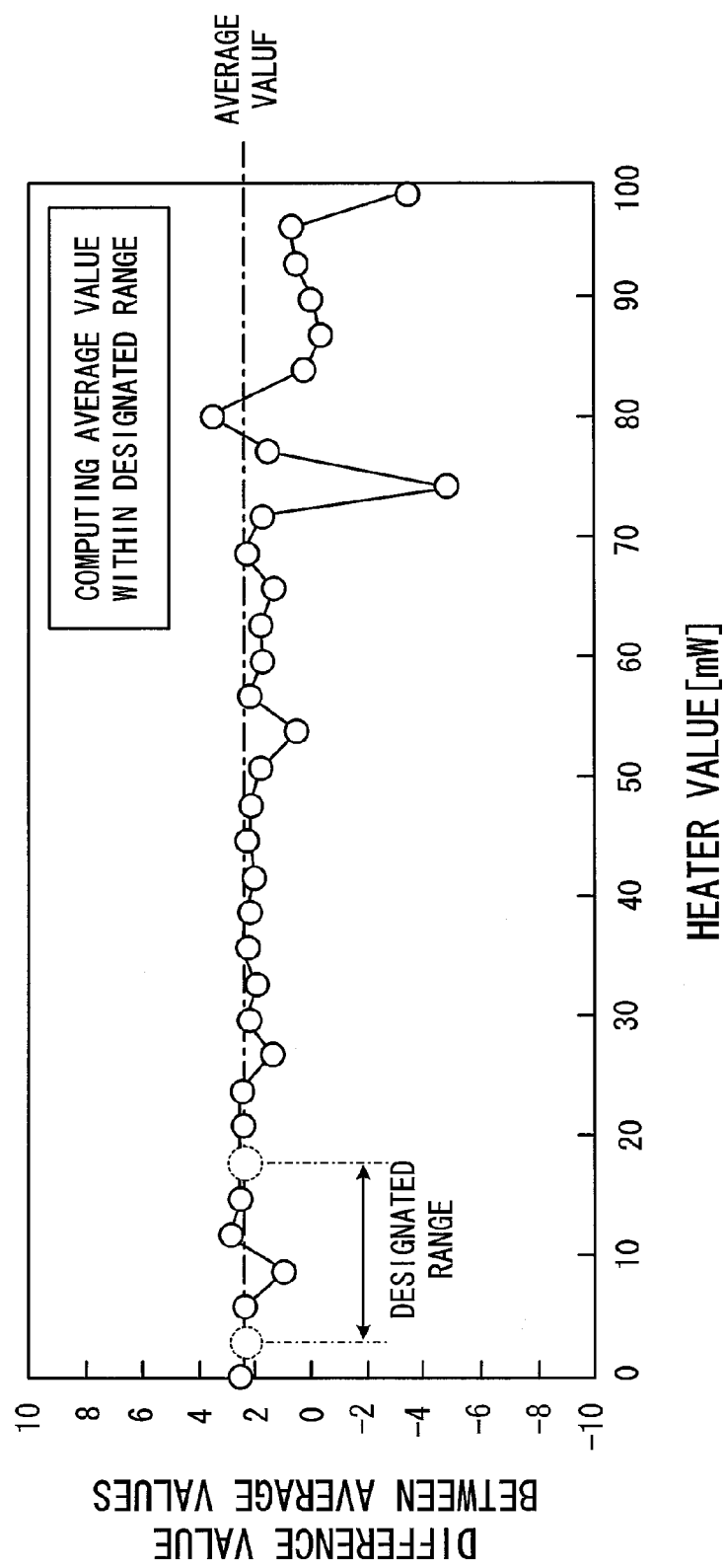

FIG. 17C illustrates a designated range that is a range of heater values that has been designated in advance by the user. FIG. 17C also illustrates the average value of the difference values within the designated heater-value range. In FIG. 17C, the designated range is indicated as a range between two heater values of the two dotted-line circles. As FIG. 17C illustrates, the designated range is a range that is designated within an area with relatively-small heater values. For this reason, while the heater value is within this designated range, the head 1 is sufficiently away from the magnetic disk 5.

A threshold is used for determining whether or not the head 1 contacts the magnetic disk 5 according to this second determination method. The threshold is obtained by multiplying the average value of the difference values by a predetermined reference value that has been determined in advance in accordance with the second determination method. Note that the predetermined reference value in this second determination method is a negative value.

Figure 17D:
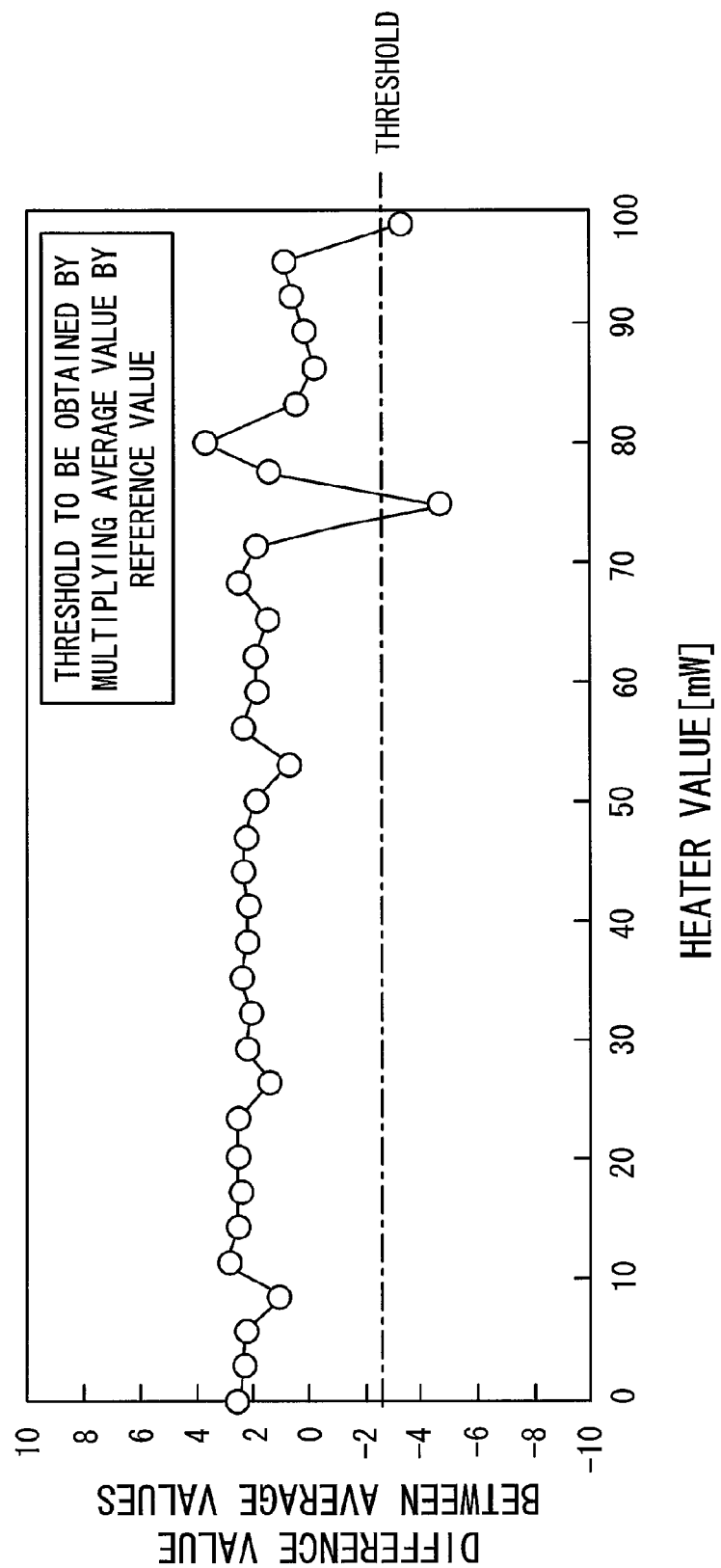

FIG. 17D illustrates the threshold that is used for determining whether or not the head 1 contacts the magnetic disk 5. In this second determination method, the above-mentioned ratio of the threshold is defined as a value that is smaller than 1. At most of the heater values, the threshold is below their respective difference values.

According to this second determination method, every time the average value of the AGC gain values is obtained, a determination is made as to whether or not there is one difference value that is below the threshold. If there is a difference value that is below the threshold, it is determined that the head 1 contacts the magnetic disk 5. Then, further increasing of the heater value is stopped.

Figure 17E:
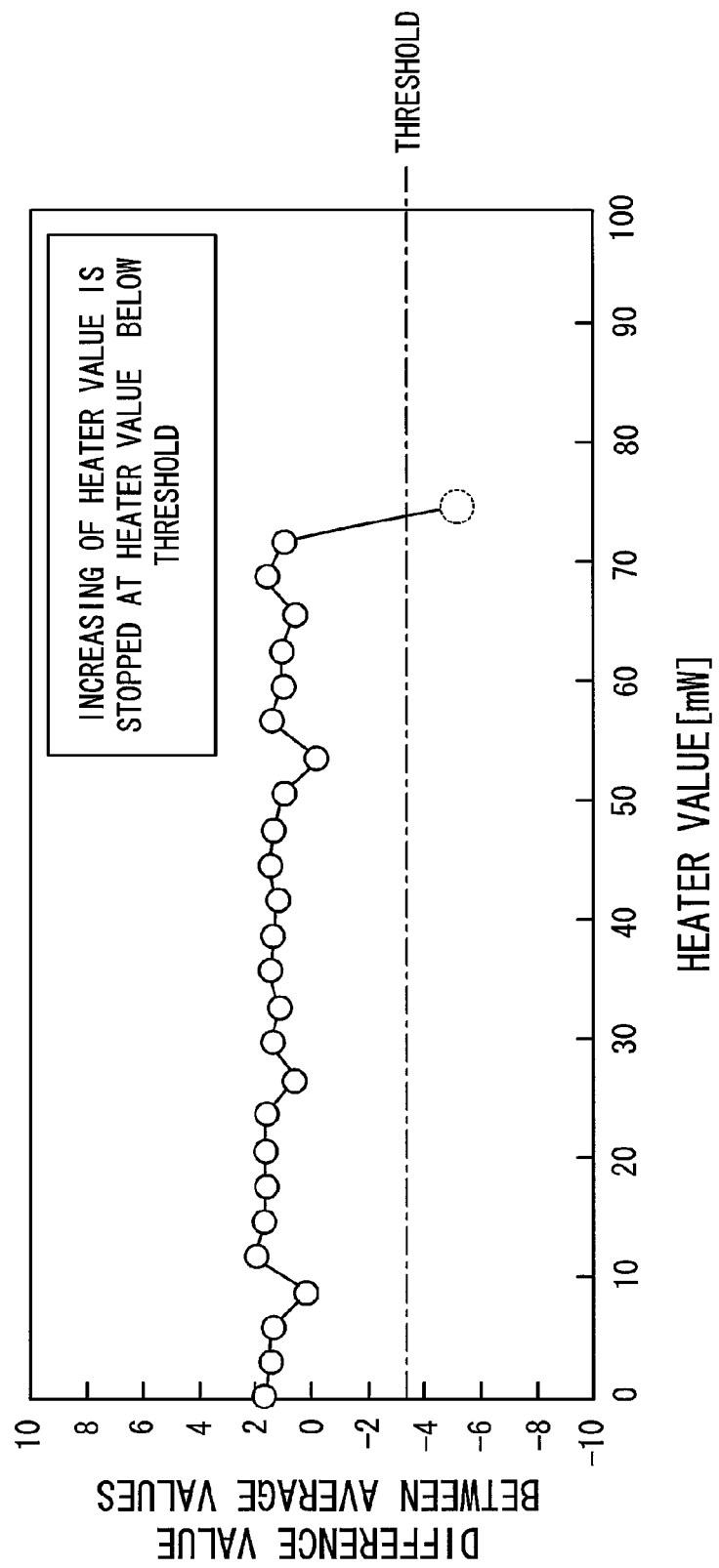

FIG. 17E illustrates the state where there appears a difference value that is below the threshold and thus increasing of the heater value is stopped. In FIG. 17D, the difference value indicated by the dotted-line circle is below the threshold. At this stage, it is determined that the head 1 contacts the magnetic disk 5, and the heater value stops increasing further. In FIG. 17E, those heater values larger than the heater value indicated by the dotted-line circle are not illustrated to indicate that further increasing of the heater value is stopped.

Then, according to this second determination method, the heater value for the last one of the difference values not below the threshold is determined as the TD heater value.

Figure 17F:
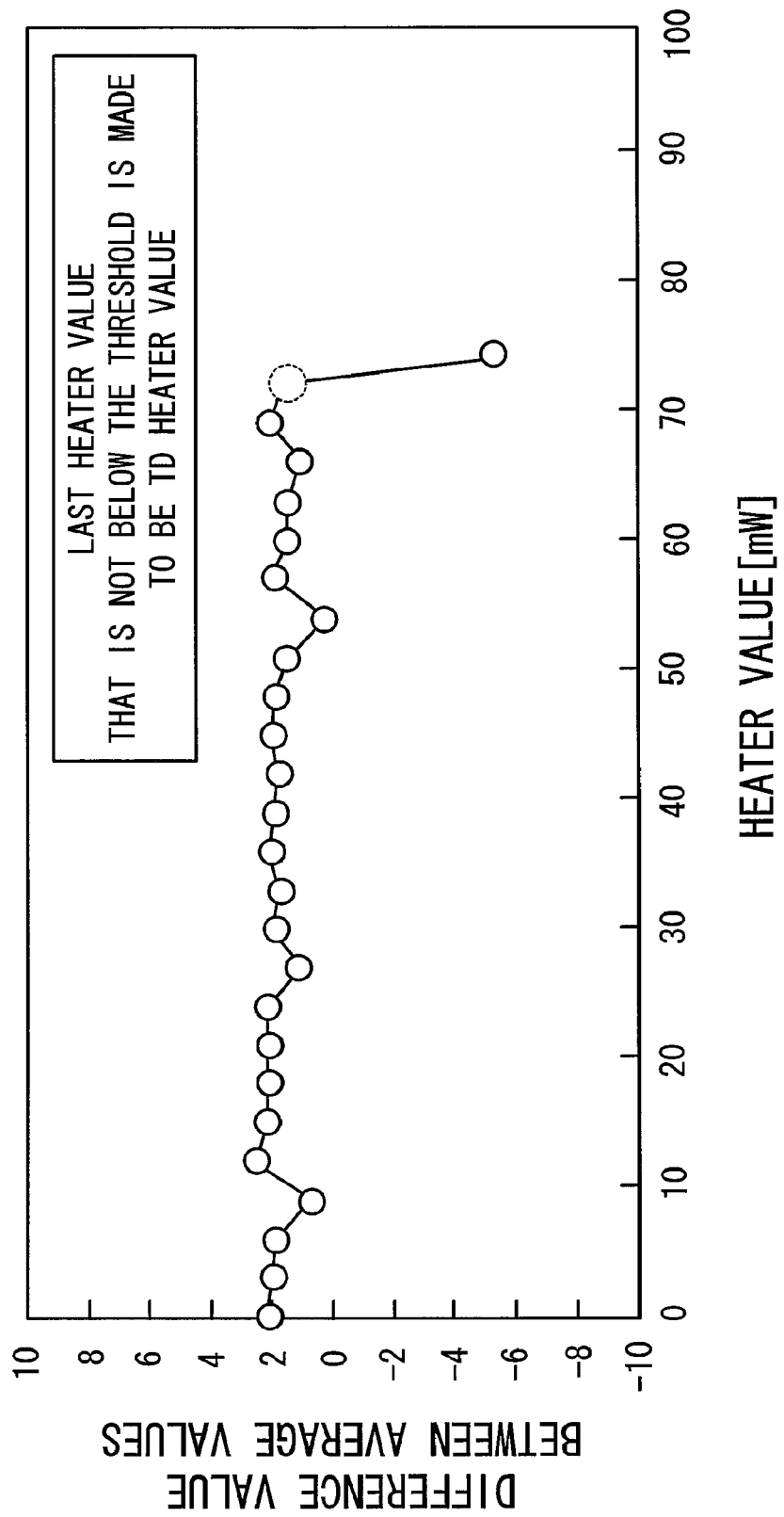

FIG. 17F illustrates the last one of the difference values not below the threshold. In FIG. 17F, the difference value positioned at the immediately left-hand side of the difference value that is below the threshold is indicated by the dotted-line circle. The difference value indicated by the dotted-line circle is the last difference value that is not below the threshold, and the heater value for this last difference value is determined as the TD heater value.

The table corresponding to the above-described second determination method includes the following pieces of information: the information about the fact that the determination-target value used for determining whether or not the head 1 contacts the magnetic disk 5 is the ACG gain value of the reproduction signal for data, and the determination is made using the average value of the AGC gain values; the information about the fact that, as a counterpart to obtain the difference value, the average value of the AGC gain values for the subsequent heater value is used, that is, for the heater value at the one-step higher level; the information on the predetermined reference value; and the information about the fact that, if a single difference value is below the threshold, it is determined that the head 1 contacts the magnetic disk 5.

Next, a third one of the four determination methods based on the changing in the average value will be described below.

FIGS. 18A to 18F include charts for explaining the third determination method based on the changing in the average value of the AGC gain value of the reproduction signals for data.

Figure 18A:
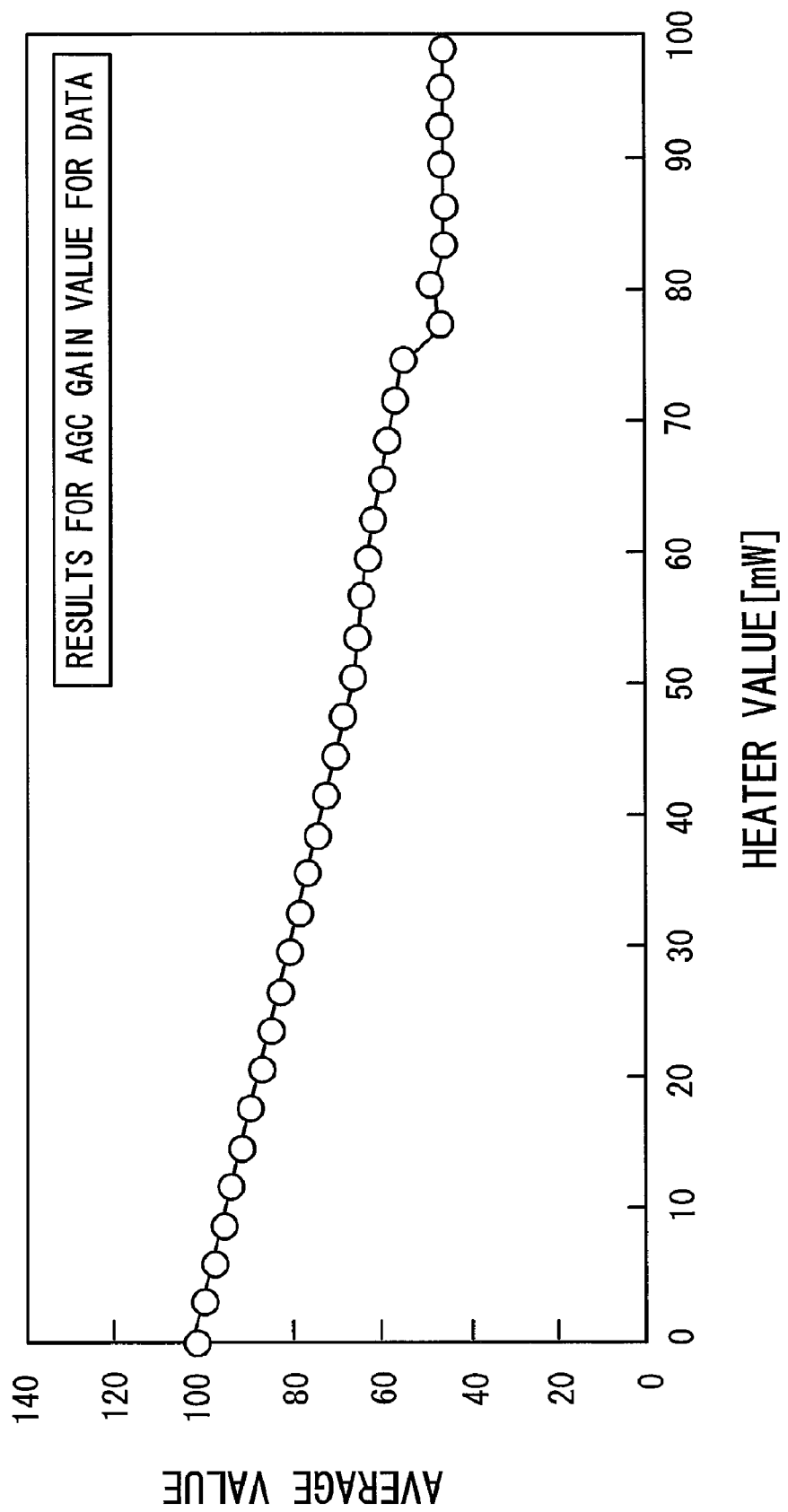

FIG. 18A illustrates exemplary changing in the average value of the AGC gain values of the reproduction signals for data to the increase in the heater value. Note that the average values of the AGC gain values given in FIG. 18A also correspond to the range of heater values from 0 mW to 100 mW, but this is only for explanatory purpose. As will be described later, increasing of the heater value is actually stopped once it is determined that the head 1 contacts the magnetic disk 5. Accordingly, the AGC values for the heater values larger than the heater value at the time of the determination for the occurrence of the contact will not be obtained.

The third determination method also starts with determination of the difference value between the average value of the AGC gain values at each heater value and the average value of the AGC gain values at the subsequent heater value, that is, the heater value at the one-step higher level for each of the average values of the AGC gain values. To put it differently, the difference is obtained every two average values in which the difference between the two heater values being equal to the predetermined increment of the heater value.

Figure 18B:
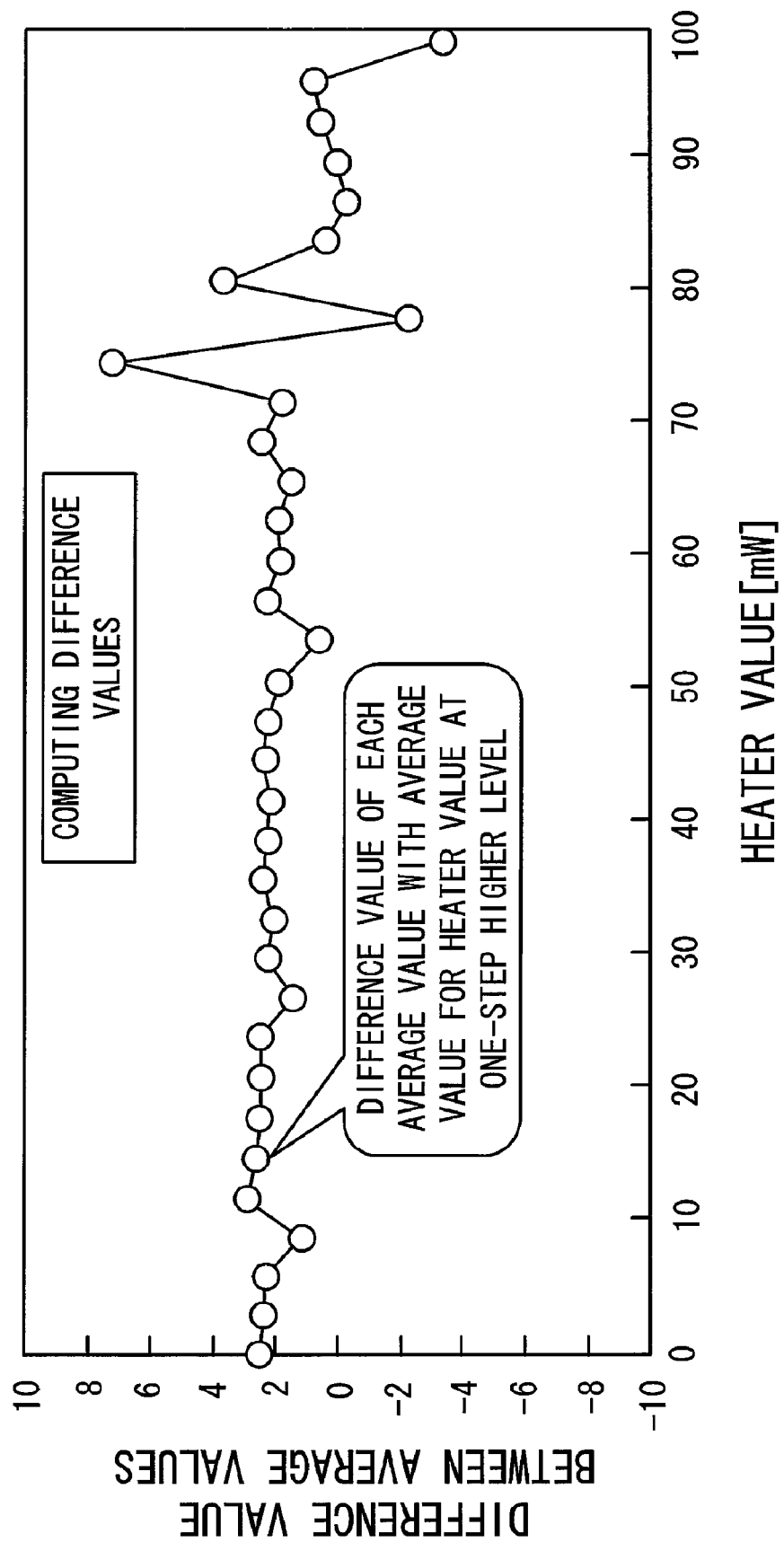

FIG. 18B illustrates the changing in the difference value between the average values of the AGC gain values to the increase in the heater value. As FIG. 18B illustrates, the difference value changes only moderately when the heater value is small, and, specifically, each of the difference values is around two in this example.

Subsequently, the average value is determined for the difference values with respect to the heater values within a heater-value range that has been designated in advance by the user.

Figure 18C:
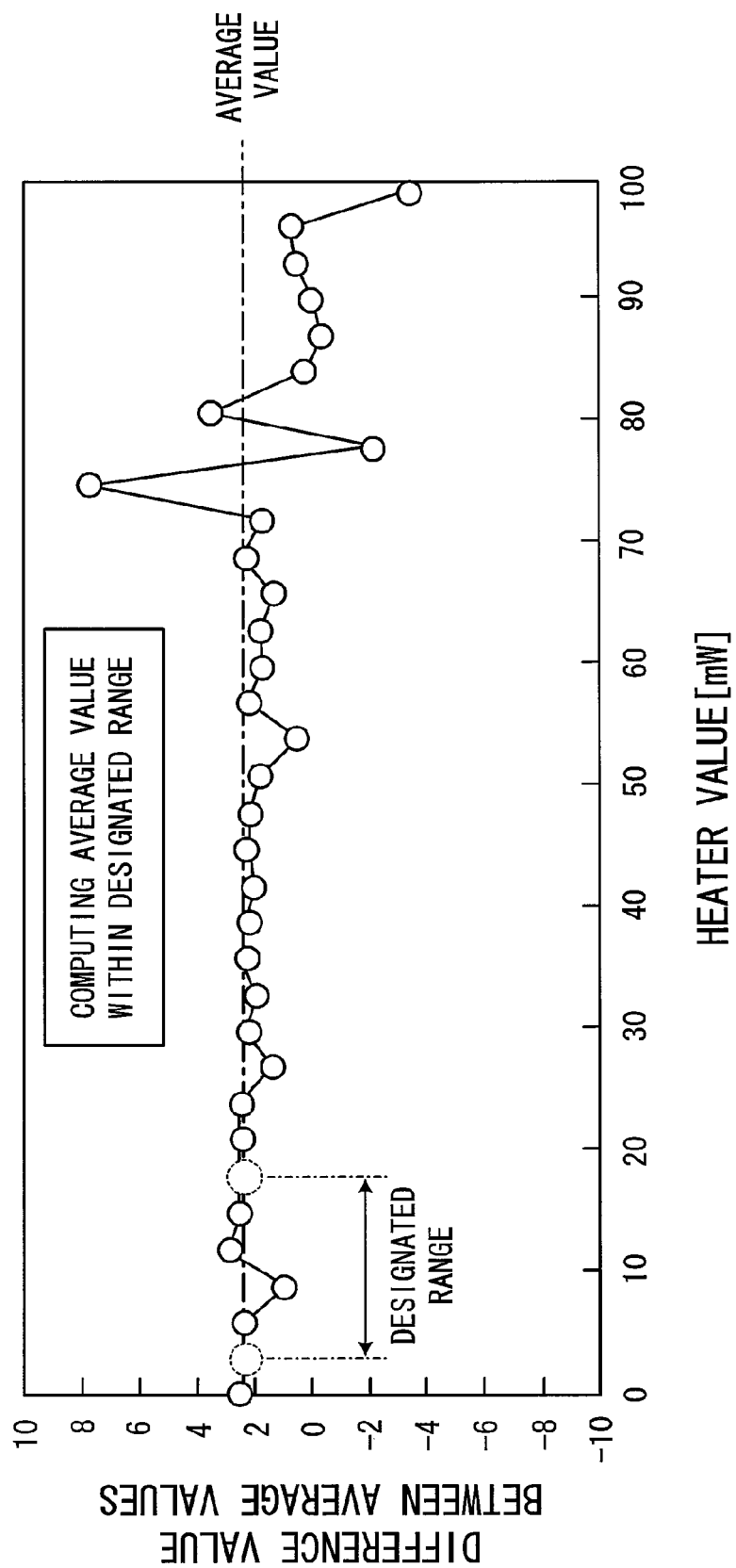

FIG. 18C illustrates a designated range that is a range of heater values that has been designated in advance by the user. FIG. 18C also illustrates the average value of the difference values at their respective heater values within the designated heater-value range. In FIG. 18C, the designated range is indicated as a range between two heater values each of the two dotted-line circles. As FIG. 18C illustrates, the designated range is a range that is designated within an area with relatively-small heater values. For this reason, while the heater value is within this designated range, the head 1 is sufficiently away from the magnetic disk 5.

A threshold is used for determining whether or not the head 1 contacts the magnetic disk 5 according to this third determination method. The threshold is obtained by multiplying the average value of the difference values by a predetermined reference value that has been determined in advance in accordance with the third determination method.

Figure 18D:
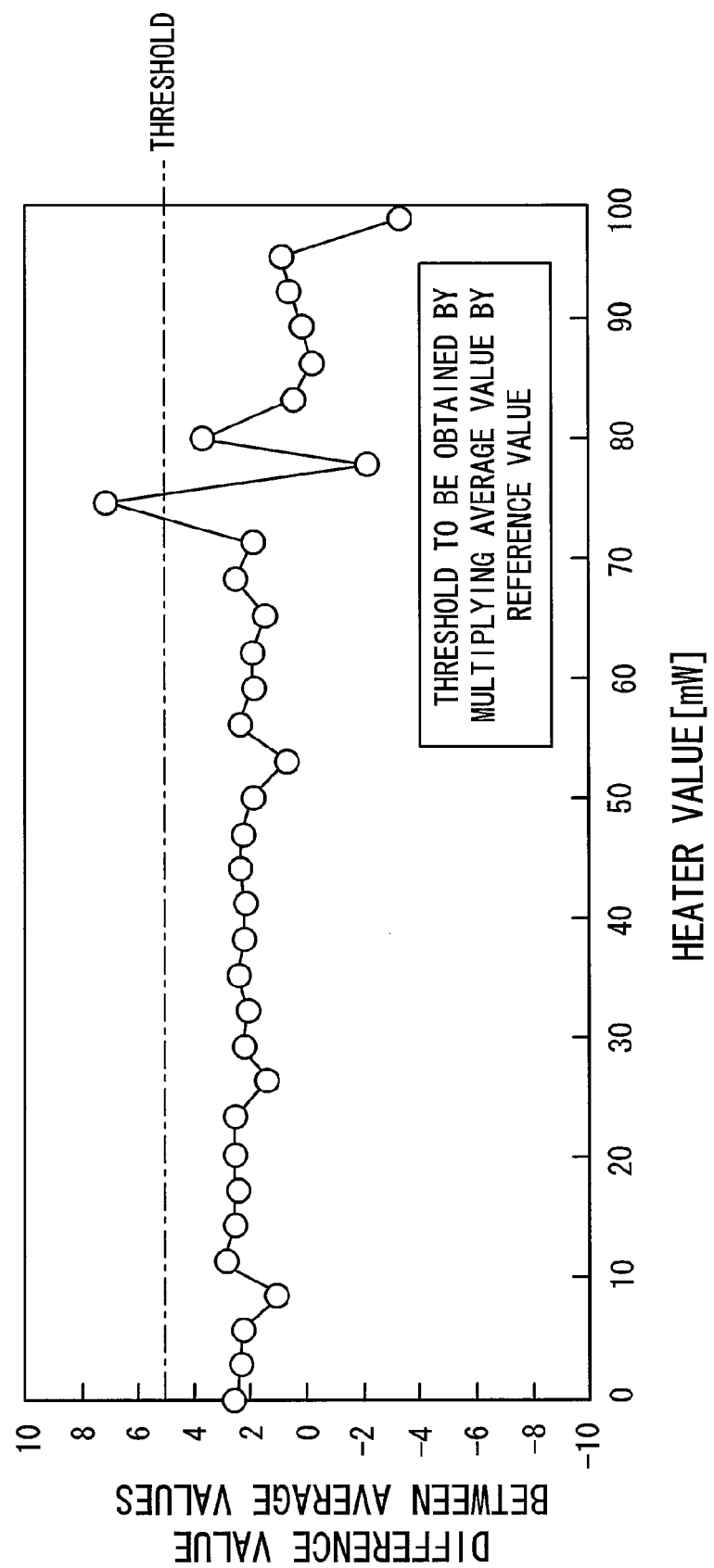

FIG. 18D illustrates the threshold that is used for determining whether or not the head 1 contacts the magnetic disk 5. In this third determination method, the ratio of the threshold is defined as a value that is larger than 1. At most of the heater values, the threshold is above their respective difference values.

According to this third determination method, every time the average value of the AGC gain values is obtained, a determination is made as to whether or not there is a difference value that is above the threshold. If there is one difference value that is above the threshold, it is determined that the head 1 contacts the magnetic disk 5. Then, further increasing of the heater value is stopped.

FIG. 18E illustrates the state where there appears a difference value that is above the threshold and thus increasing of the heater value is stopped. In FIG. 18D, the difference value indicated by the dotted-line circle is above the threshold. At this stage, it is determined that the head 1 contacts the magnetic disk 5, and further increasing of the heater value is stopped. In Part (e) of FIG. 18, those heater values larger than the heater value indicated by the dotted-line circle are not illustrated to indicate that further increasing of the heater value is stopped.

Then, according to this third determination method, the heater value for the last one of the difference values not above the threshold is determined as the TD heater value.

Figure 18F:
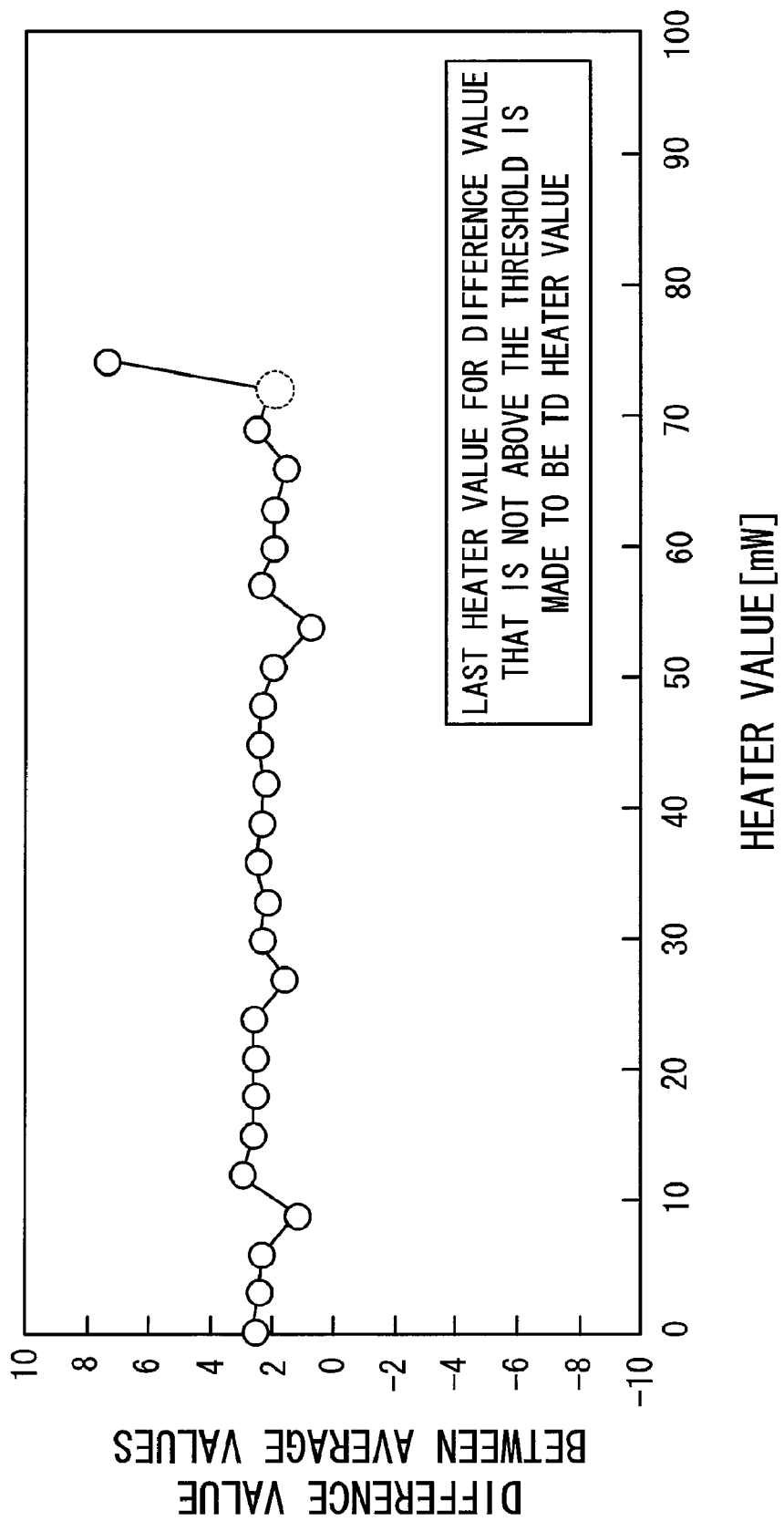

FIG. 18F illustrates the last one of the difference values not above the threshold. In FIG. 18F, the difference value positioned at the immediately left-hand side of the difference value that is above the threshold is indicated by the dotted-line circle. The difference value indicated by the dotted-line circle is the last difference value that is not above the threshold, and the heater value for this last difference value is determined as the TD heater value.

The table corresponding to the above-described third determination method includes the following pieces of information: the information about the fact that the determination-target value used for determining whether or not the head 1 contacts the magnetic disk 5 is the ACG gain value of the reproduction signal for data, and the determination is made using the average value of the AGC gain values; the information about the fact that, as a counterpart to acquire the difference value, the difference value between the average value of the AGC gain values for each heater value and that for the subsequent heater value, that is, for the heater value at the one-step higher level is used; the information on the predetermined reference value; and the information about the fact that, if a single difference value is above the threshold, it is determined that the head 1 contacts the magnetic disk 5.

Next, a fourth one of the four determination methods based on the changing in the average value will be described below.

FIGS. 19A to 19F include charts for explaining the fourth determination method based on the changing in the average value of the AGC gain value of the reproduction signals for data.

Figure 19A:
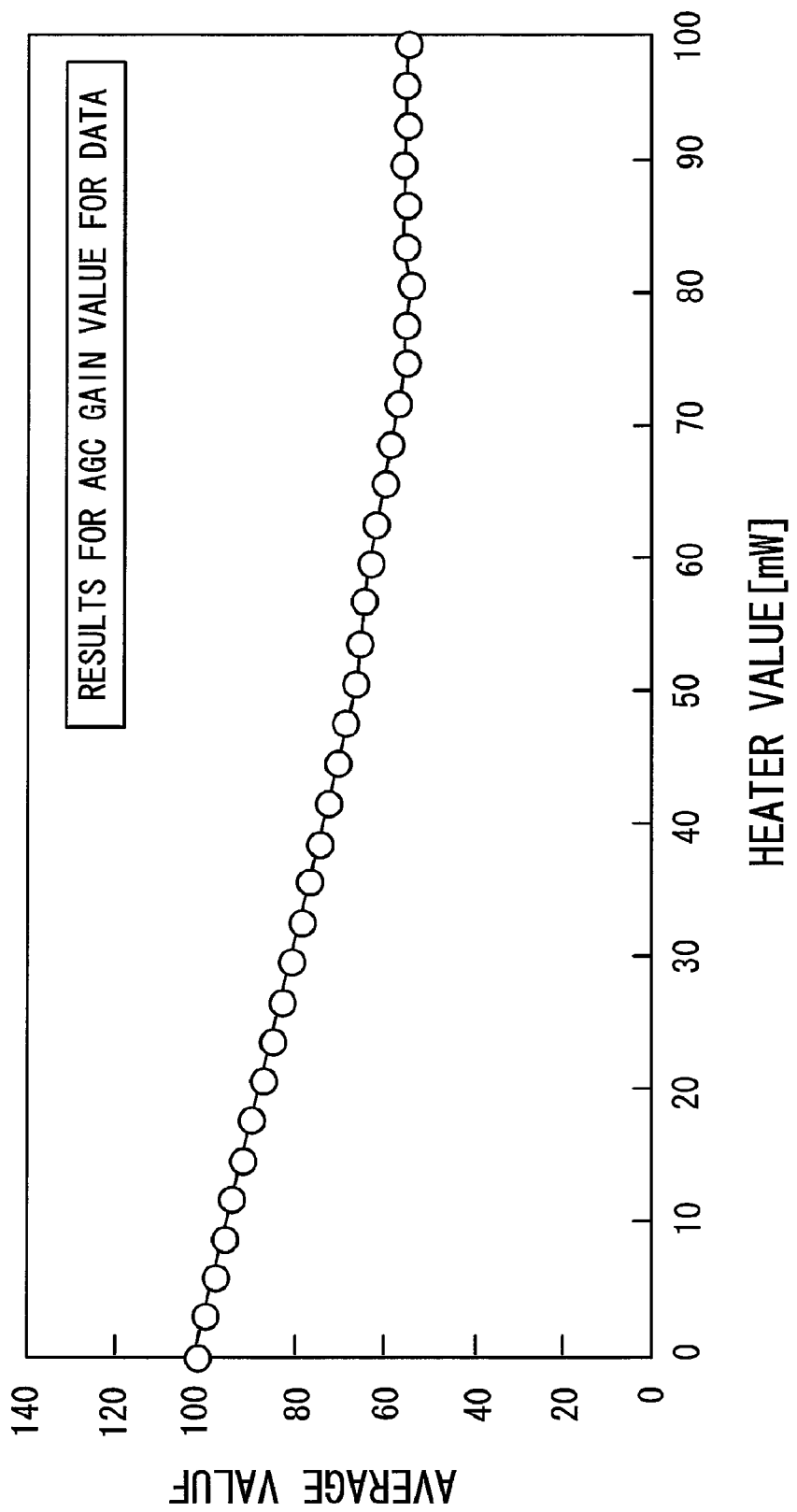

FIG. 19A illustrates exemplary changing in the average value of the AGC gain values of the reproduction signals for data to the increase in the heater value. Note that the average values of the AGC gain values in FIG. 19A correspond to the range of heater values from 0 mW to 100 mW, but this is only for explanatory purpose. As will be described later, increasing of the heater value actually is stopped once it is determined that the head 1 contacts the magnetic disk 5. Accordingly, the AGC values for the heater values larger than the heater value at the time of the determination for the occurrence of the contact will not be obtained.

The fourth determination method starts with determination of the value of difference (also referred to as difference value) between the average value of the AGC gain values at each heater value and the average value of the AGC gain values at the second subsequent heater value, that is, the heater value at two-step higher level. To put it differently, the difference is obtained every two average values with the difference between their respective heater values being twice as large as the predetermined increment of the heater value.

Figure 19B:
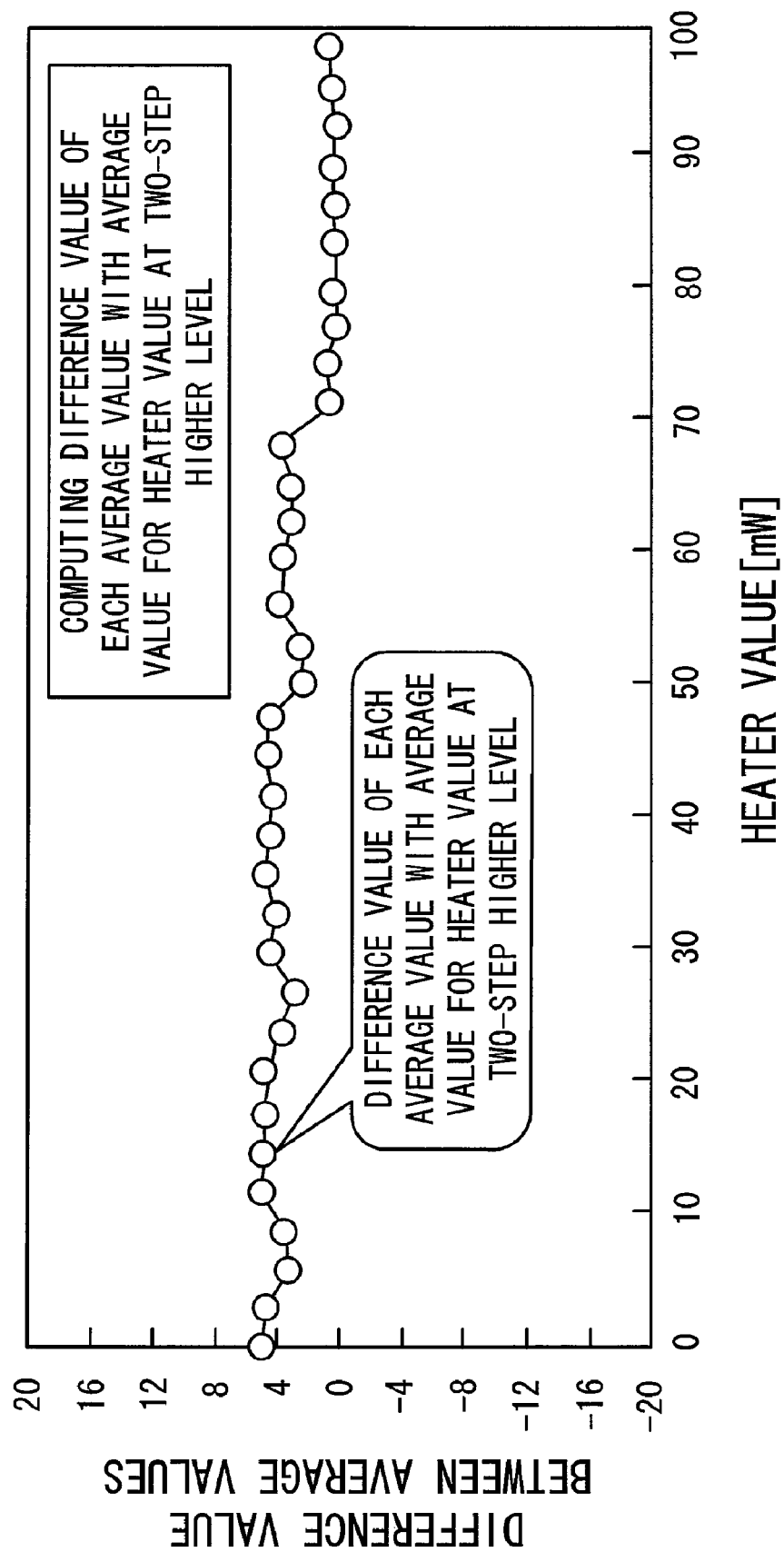

FIG. 19B illustrates changing in the difference value between the average values of the AGC gain values to the increase in the heater value. As FIG. 19B illustrates, the difference value changes only moderately when the heater value is small, and, specifically, each of the difference values is around four in this example.

Subsequently, the average value is obtained for the difference values at the heater values within a heater-value range that has been designated in advance by the user.

Figure 19C:
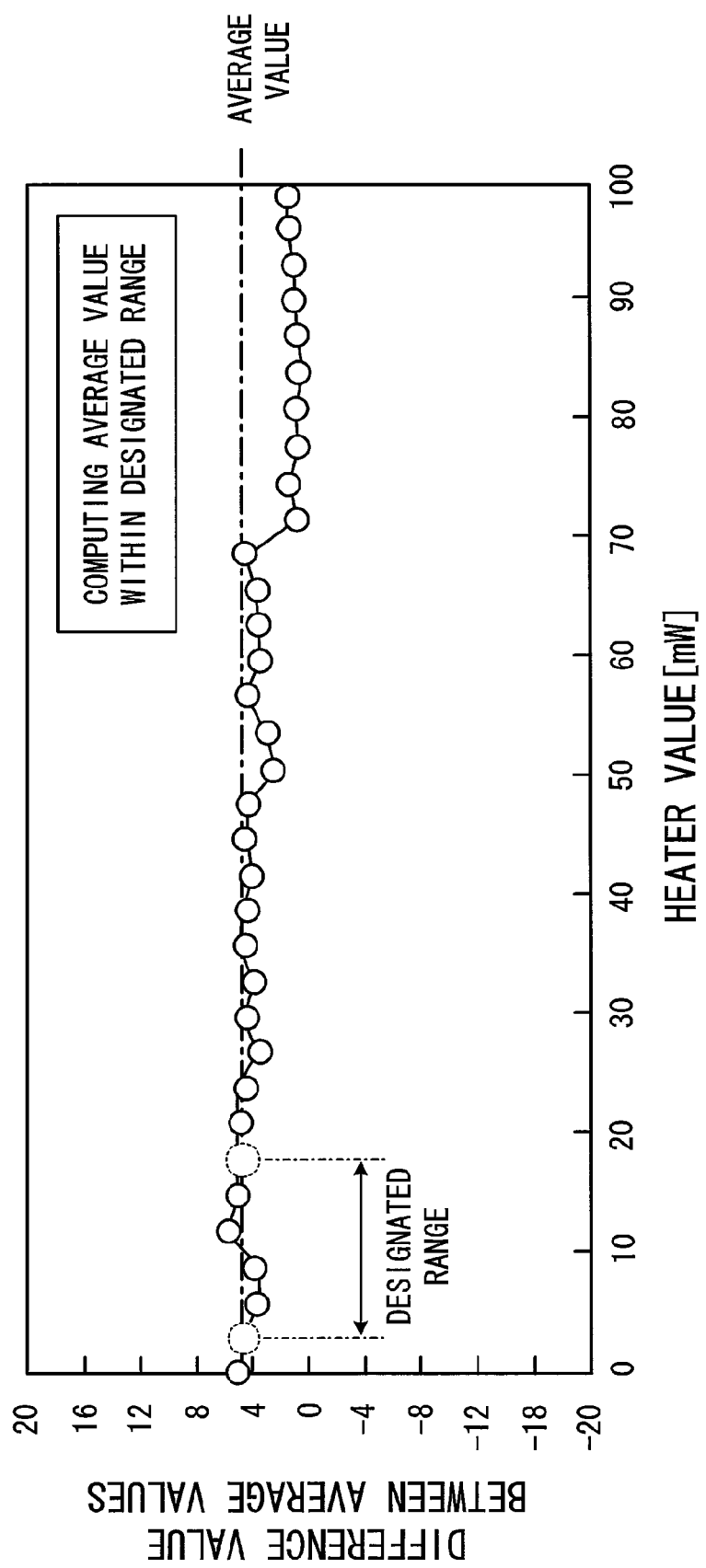

FIG. 19C illustrates a designated range that is a range of heater values that has been designated in advance by the user. FIG. 19C also illustrates the average value of the difference values at their respective heater values within the designated heater-value range. In FIG. 19C, the designated range is indicated as a range between two heater values of the two dotted-line circles. As FIG. 19C illustrates, the designated range is a range that is designated within an area with relatively-small heater values. For this reason, while the heater value is within this designated range, the head 1 is considered to be sufficiently away from the magnetic disk 5.

A threshold is used for determining whether or not the head 1 contacts the magnetic disk 5 according to this fourth determination method. The threshold is obtained by multiplying the average value of the difference values by a predetermined reference value that has been determined in advance in accordance with the fourth determination method.

Figure 19D:
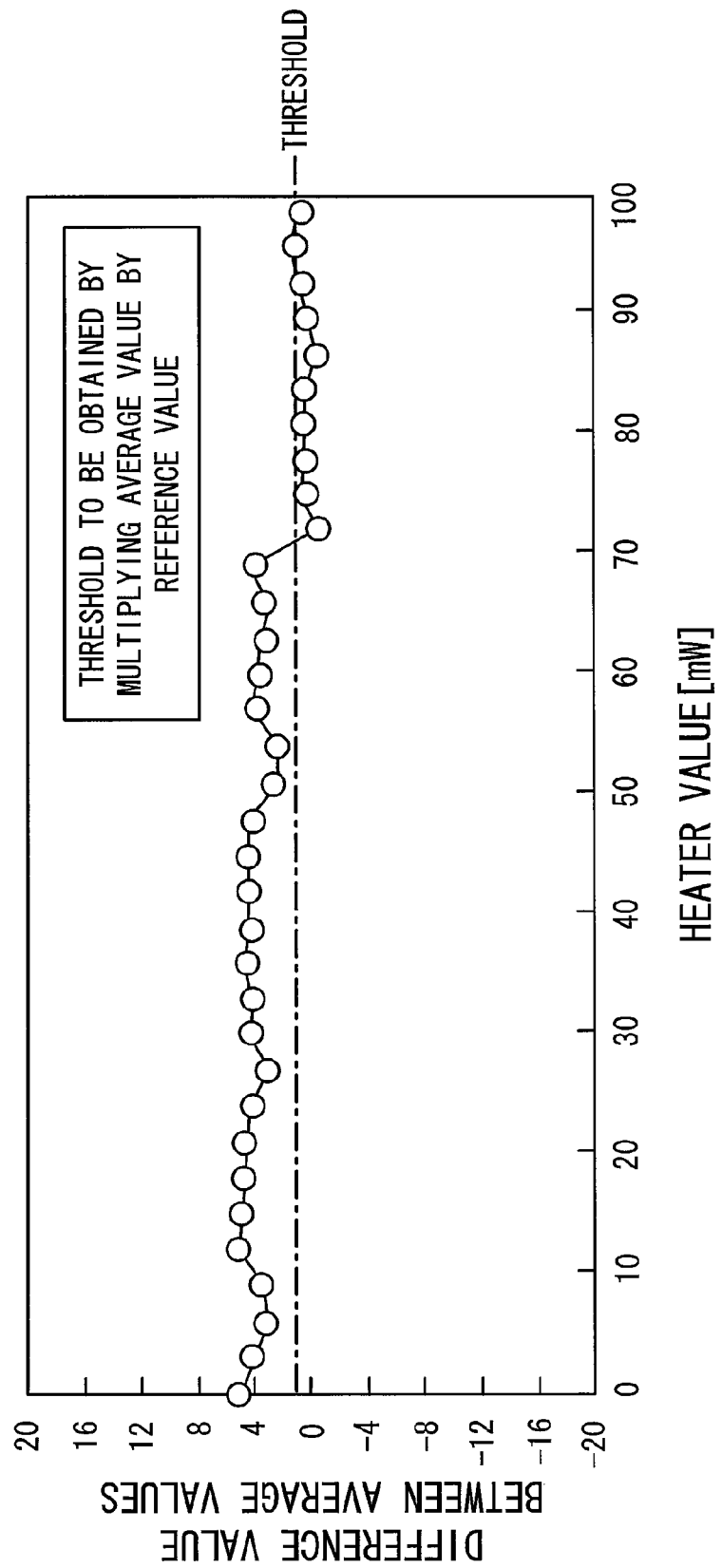

FIG. 19D illustrates the threshold that is used for determining whether or not the head 1 contacts the magnetic disk 5. In this fourth determination method, the above-mentioned ratio of the threshold is defined as a value that is smaller than 1. At most of the heater values, the threshold is below their respective difference values.

According to this fourth determination method, every time the average value of the AGC gain values is obtained, a determination is made as to whether or not there are two consecutive difference values below the threshold. If there are two consecutive difference values below the threshold, it is determined that the head 1 contacts the magnetic disk 5. Then, further increasing of the heater value is stopped.

FIG. 19E illustrates the state where there appear two consecutive difference values below the threshold and increasing of the heater value is stopped. FIG. 19D, the two consecutive difference values indicated by the dotted-line circles are below the threshold. At this stage, it is determined that the head 1 contacts the magnetic disk 5, and further increasing of the heater value is stopped. In FIG. 19E, those heater values larger than the heater value indicated by the right-hand one of the two dotted-line circles are not illustrated to indicate that further increasing of the heater value is stopped.

Then, according to this fourth determination method, the heater value for the last one of the difference values not below the threshold is determined as the TD heater value.

Figure 19F:
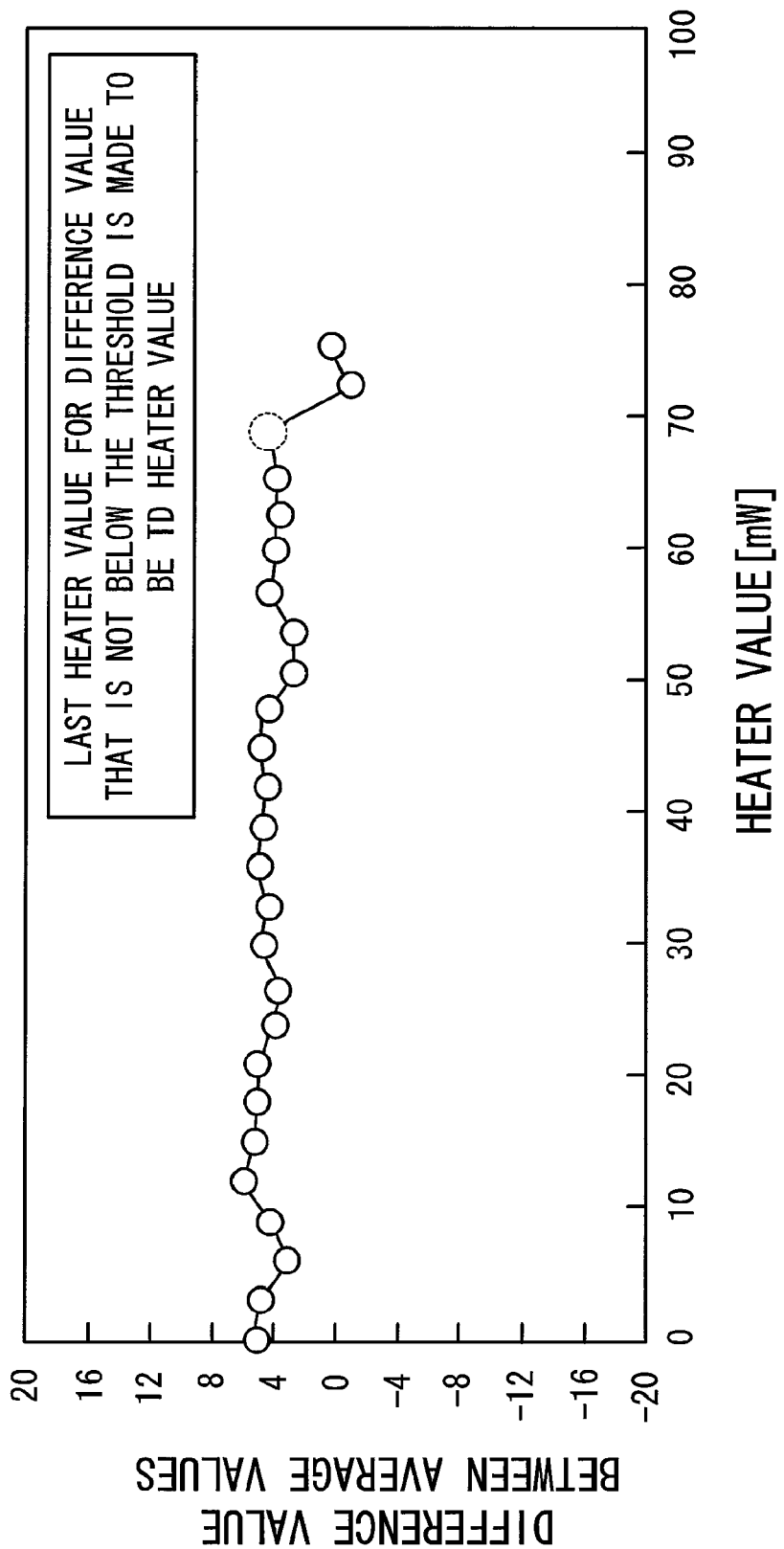

FIG. 19F illustrates the last one of the difference values not below the threshold. In this FIG. 19F, the difference value positioned at the immediately left-hand side of the two consecutive difference values below the threshold is indicated by the dotted-line circle. The difference value indicated by the dotted-line circle is the last difference value that is not below the threshold, and the heater value for this last difference value is determined as the TD heater value.

The table corresponding to the above-described fourth determination method includes the following pieces of information: the information about the fact that the determination-target value used for determining whether or not the head 1 contacts the magnetic disk 5 is the ACG gain value of the reproduction signal for data, and the determination is made using the average value of the AGC gain values; the information about the fact that, as a counterpart to acquire the difference value, the average value of the AGC gain values the second subsequent heater value, that is, for the heater value at the two-step higher level is used; the information on the predetermined reference value; and the information about the fact that, if two consecutive difference values are below the threshold, it is determined that the head 1 contacts the magnetic disk 5.

Next, the determination method based on the changing in the standard deviation will be described below.

FIGS. 20A to 20E include charts for explaining the determination method based on the changing in the standard deviation of the AGC gain values of the reproduction signal for data.

Figure 20C:
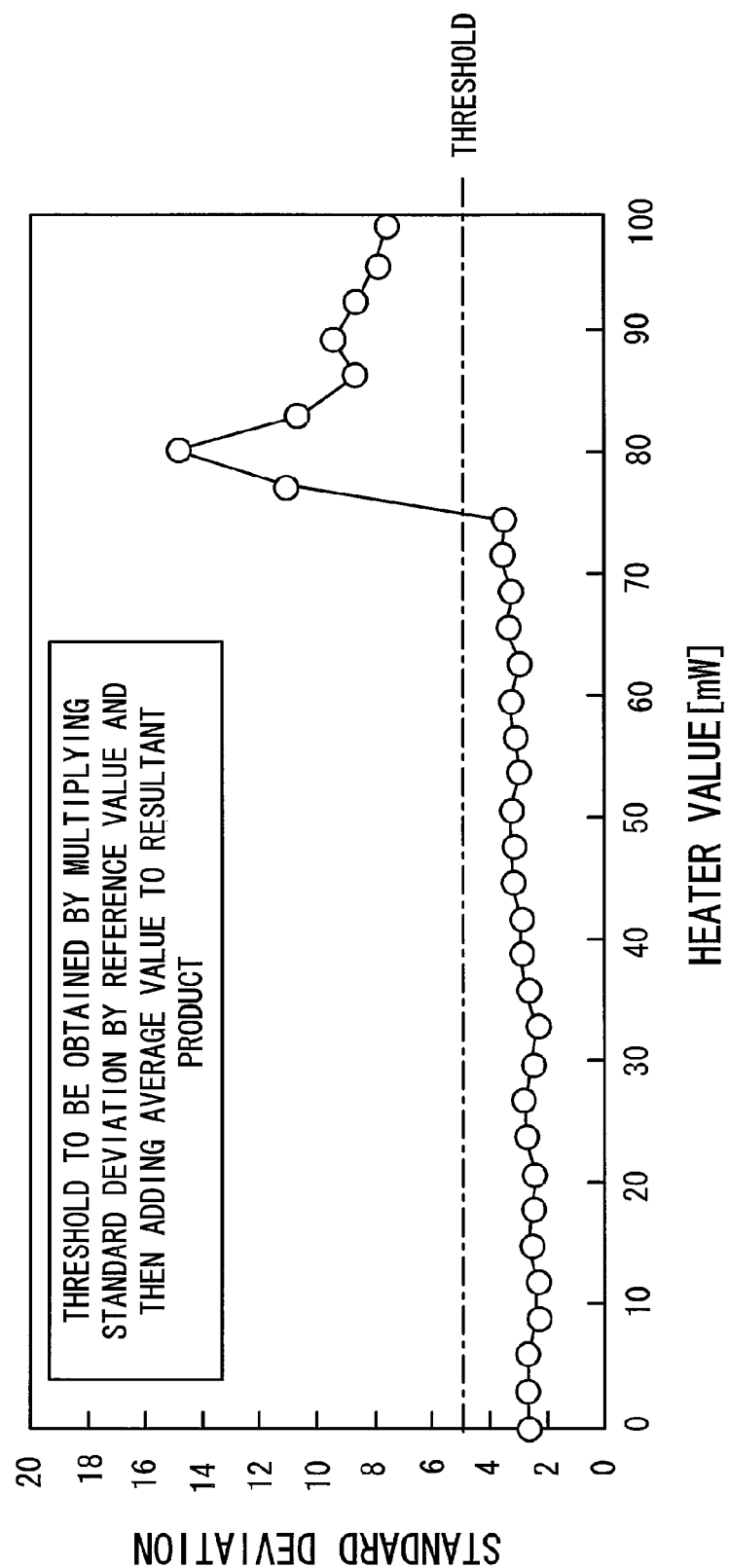

FIG. 20A illustrate exemplary changing in the standard deviation of the AGC gain values of the reproduction signals for data to the increase in the heater value. Note that the standard deviations of the AGC gain values given in FIGS. 20A to 20E also correspond to the range of heater values from 0 mW to 100 mW, but this is only for explanatory purpose. As will be described later, increasing of the heater value is actually stopped once it is determined that the head 1 contacts the magnetic disk 5. Accordingly, the AGC values for the heater values larger than the heater value at the time of the determination for the occurrence of the contact will not be obtained.

The determination method based on the changing in the standard deviation starts with the determination of the average value and the standard deviation for the standard deviations of the AGC gain values corresponding to the heater values within a heater-value range that has been designated in advance by the user.

FIG. 20B illustrates a designated range that is a range of heater values that has been designated in advance by the user. FIG. 20B also illustrates the average value of the standard deviations at their respective heater values within the designated heater-value range. In this FIGS. 20A to 20EB, the designated range is indicated as a range between two heater values each of which is represented by a dotted-line circle. As FIG. 20B illustrates, the designated range is a range that is designated within an area with relatively-small heater values. For this reason, while the heater value is within this designated range, the head 1 is sufficiently away from the magnetic disk 5.

A threshold is used for determining whether or not the head 1 contacts the magnetic disk 5 according to this determination method based on the changing in the standard deviation. The threshold is obtained by multiplying the standard deviation of the standard deviations of the AGC gain values for the heater values within this designated range of the difference values by a predetermined reference value that has been determined in advance in accordance with this determination method, and then the average value within the designated range and determined in advance is added to the multiplication result.

FIG. 20C illustrates the threshold that is used for determining whether or not the head 1 contacts the magnetic disk 5.

According to this determination method based on the changing in standard deviation, every time the standard deviation of the AGC gain values is obtained, a determination is made as to whether or not the standard deviation of the AGC gain values is above the threshold. If there is a standard deviation of the AGC gain values that is above the threshold, it is determined that the head 1 contacts the magnetic disk 5. Then, further increasing of the heater value is stopped.

FIG. 20D illustrates the state where there appears one standard deviation of the AGC gain values that is above the threshold and thus increasing of the heater value is stopped. In FIG. 20D, the standard deviation of the AGC gain values indicated by the dotted-line circle is above the threshold. At this stage, it is determined that the head 1 contacts the magnetic disk 5, and further increasing of the heater value is stopped. In FIG. 20D, the standard deviations of the AGC gain values for those heater values larger than the heater value indicated by the dotted-line circle are not illustrated to indicate that further increasing of the heater value is stopped.

Then, according to this determination method based on the changing in standard deviation, the heater value for the last one of the standard deviations of the AGC gain values not above the threshold is determined as the TD heater value.

Figure 20E:
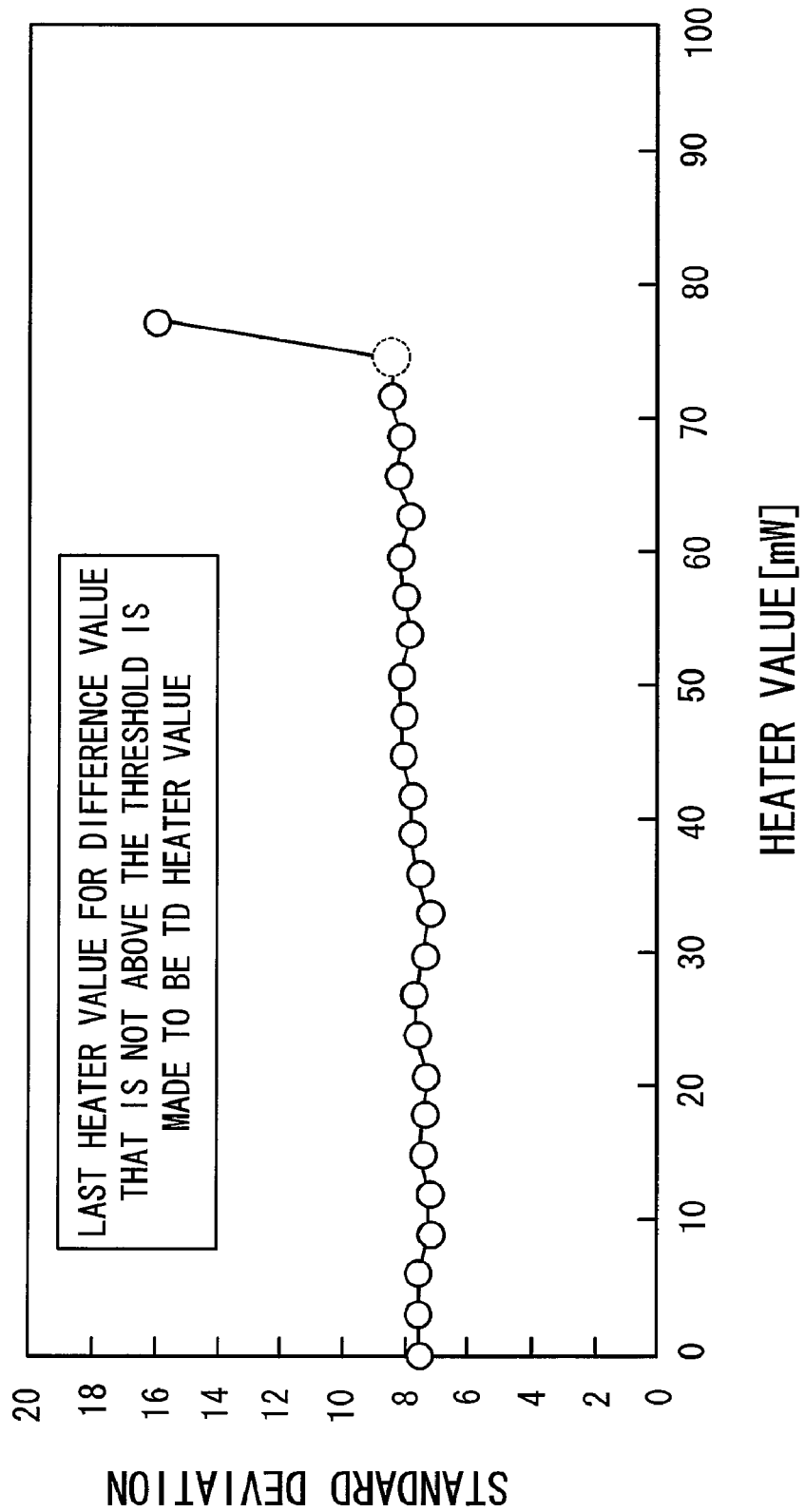

FIG. 20E illustrates the last one of the standard deviations of the AGC gain values not above the threshold. In this FIGS. 20A to 20E, the standard deviation of the AGC gain values positioned at the immediately left-hand side of the standard deviation of the AGC gain values that is above the threshold is indicated by the dotted-line circle. The standard deviation of the AGC gain values indicated by the dotted-line circle is the last standard deviation that is not above the threshold, and the heater value for this last difference value is determined as the TD heater value.

The table corresponding to the above-described determination method based on the changing in standard deviation includes the following pieces of information: the information about the fact that the determination-target value used for determining whether or not the head 1 contacts the magnetic disk 5 is the ACG gain value of the reproduction signal for data, and the determination is made using the standard deviation of the AGC gain values; the information about the fact that, no difference value is determined, and the unprocessed values (i.e., raw values) of the standard deviation of the AGC gain values are used in the determination; the information on the predetermined reference value; and the information about the fact that, if a single standard derivation of the AGC gain value is above the threshold, it is determined that the head 1 contacts the magnetic disk 5.

The descriptions that have been given thus far concern the five methods of determining whether the head 1 contacts the magnetic disk 5 on the basis of the five tables with their respective determination-target values being the AGC gain values of the reproduction signals for data.

In the descriptions of the first to the fourth determination methods, for the explanatory purpose, the data of the average values for the AGC gain values, which averages are different from one another and may allow the contact to be detected by all the determination methods are used as the data based on which the determination as to whether or not the head 1 contacts the magnetic disk 5 is made. Alternatively, if the HDD 10 includes all the four tables corresponding respectively to the first to fourth methods, all of the four determination methods are used in the determination for the same data as to whether or not the head 1 contacts the magnetic disk 5.

In the five determination methods, the number of data points (the difference value between two average values of the AGC gain values or the standard deviation of the AGC gain values) that are to be the reference for determining whether or not the head 1 contacts the magnetic disk 5 and that consecutively exceeds a threshold is either one or two. Among the determination methods, it is that a number of such values that are to be the reference and that consecutively exceeds the threshold is different. In addition, with respect to difference interval, there are cases: a case where the heater value of the counterpart for the difference is the one-step higher level value; a case where the heater value of the counterpart for the difference is the one at the two-step higher level; and a case where no such difference values are computed but the raw data values (either the average values or the standard deviations) are used without being processed. Thus, among the five determination methods, it is common that the difference interval is different. Due to the differences in the number of values that consecutively exceeds the threshold and due to the difference of the difference interval, even the heater values when it is determined that the head 1 contacts the magnetic disk 5 are same TD heater values may be different in general for each of the determination methods.

The descriptions given above are based on an example where the AGC gain value of the reproduction signal for data is used as the determination-target value. The determination as to whether or not the head 1 contacts the magnetic disk 5 is made in the similar manner when the determination-target value is the AGC gain value of the reproduction signal for position information, the VTM value, or the position accuracy value. To this end, each of the AGC gain value of the reproduction signal for position information, the VTM value, and the position accuracy value is used as the determination target value in any of the other tables provided in the HDD 10 of this embodiment. Each of these tables, as in the cases of the above-described tables for the determination methods, includes: the information on the difference interval; the information on the reference value for defining the threshold; the information on the number of data points that consecutively exceeds the threshold used as the reference for determining that there is a contact between the head and the magnetic disk; and the information on whether each data point is above or below the threshold. On the basis of these tables, the determination of whether or not the head 1 contacts the magnetic disk 5 and the determination of the TD heater value are made in a similar manner to any one of the determination methods described above.

For example, with respect to the average value of or the standard deviation of the AGC gain values of the reproduction signals for position information, except that the determination target is different, using the above described five tables in which the determination target is the AGC gain value of the reproduction signal, the determination that the head 1 contacts the magnetic disk 5 or the determination of the TD heater value is performed.

Figure 1:
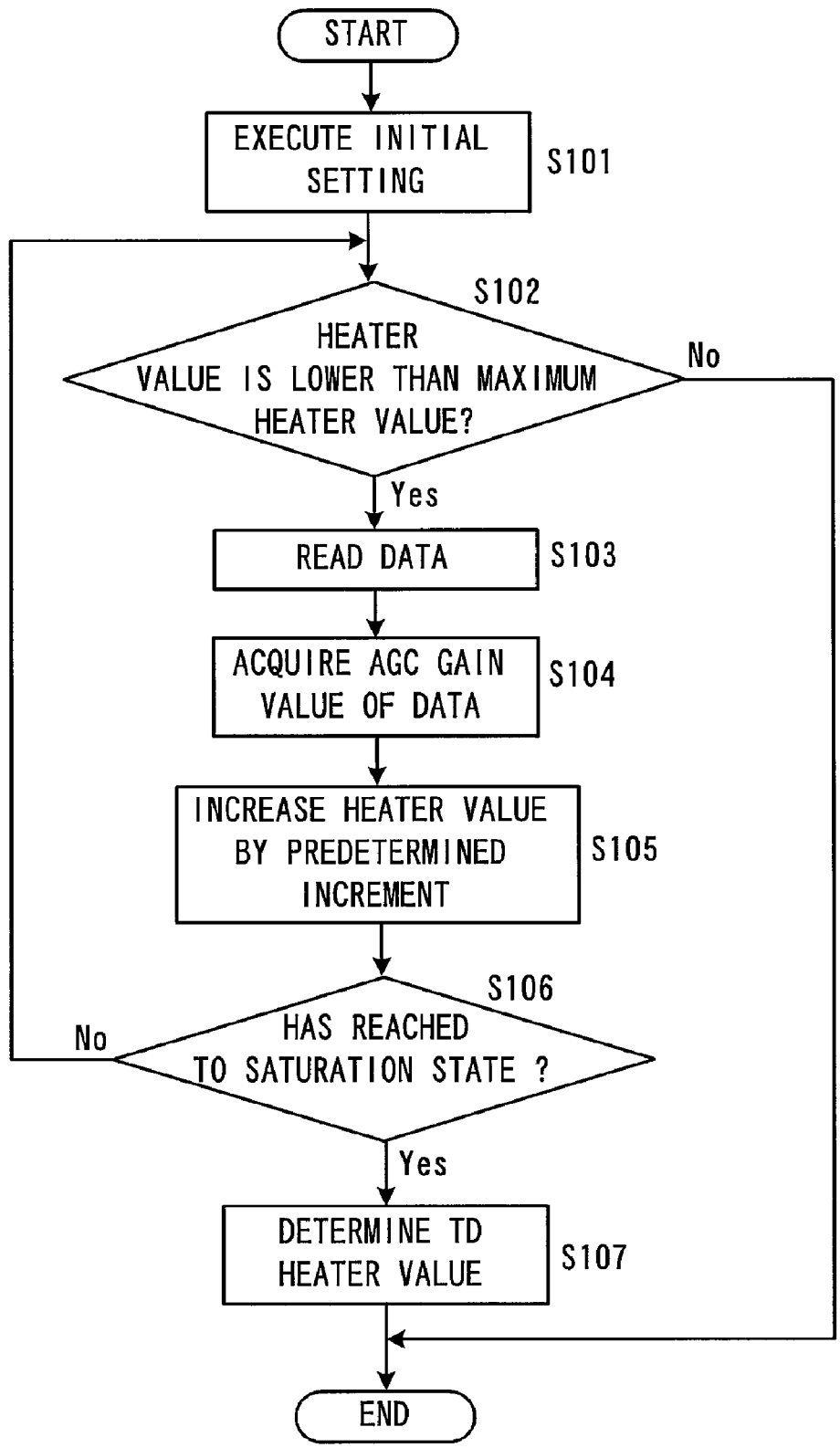
FIG. 1 is a flowchart illustrating an exemplary method of determining the TD heater value on the basis of changes in an automatic gain control (AGC) gain value.
Figure 2:
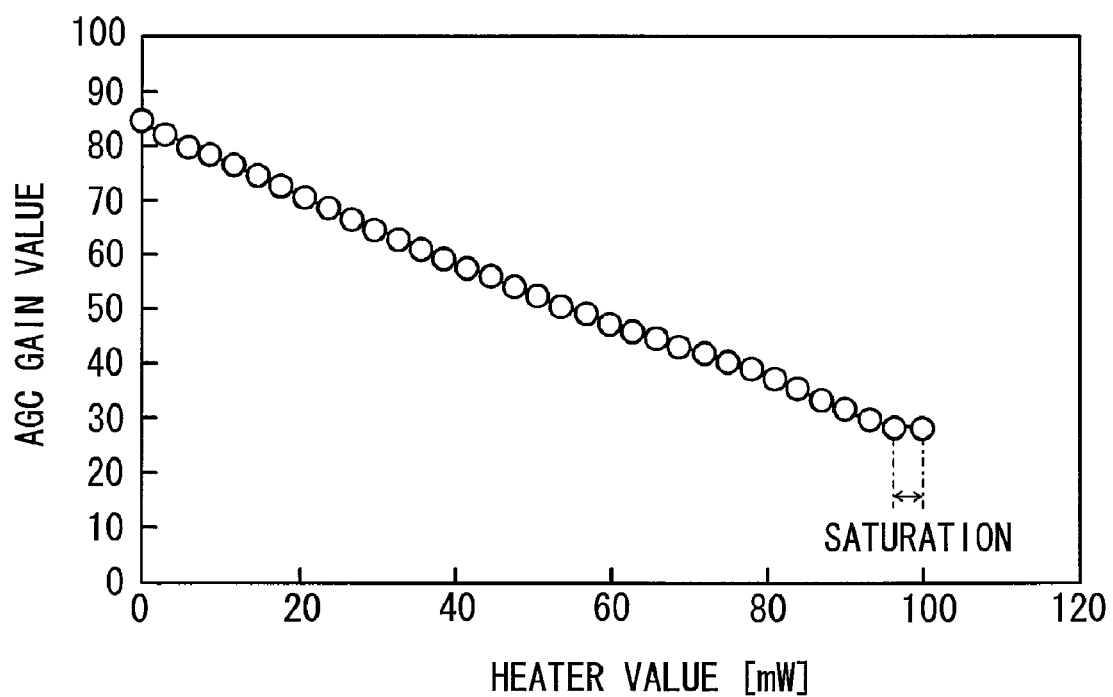
FIG. 2 illustrates the changes of the AGC gain value for the increase of the heater value in the method of determining the TD heater value of FIG. 1.
Figure 3:
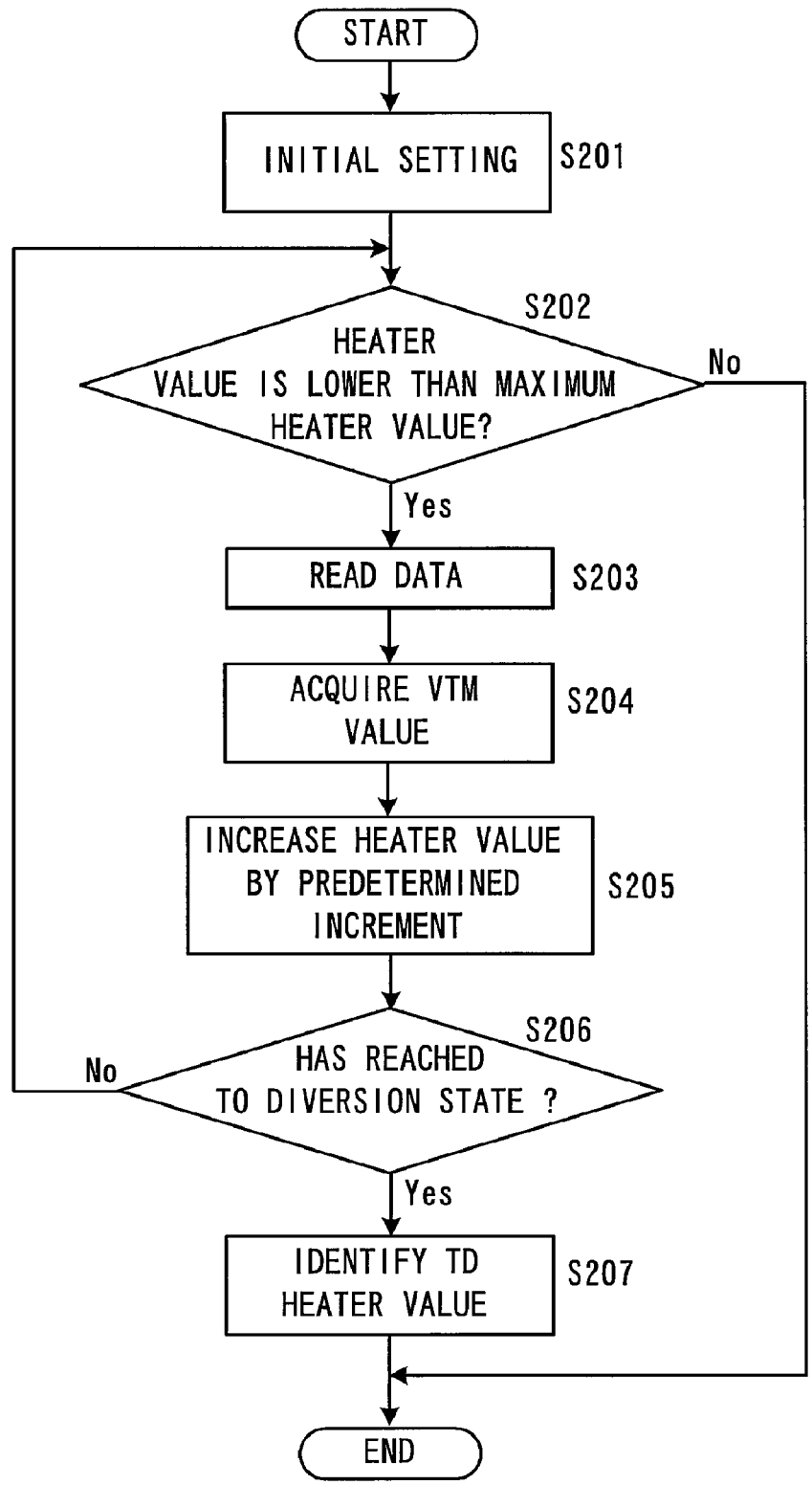
FIG. 3 is a flowchart illustrating an exemplary method of determining the TD heater value through a change in the Viterbi trellis margin (VTM) value.
Figure 4:
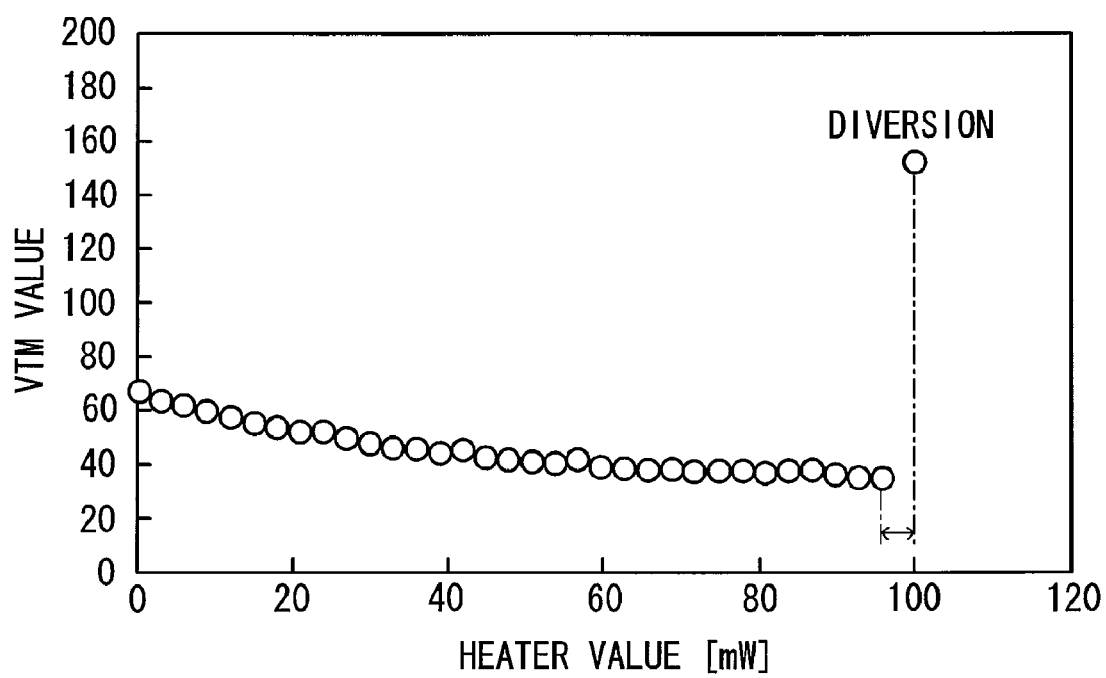
FIG. 4 illustrates the changes in the VTM value along with the increase in the heater value in the method of determining the TD heater value of FIG. 3.

In addition, with respect to the VTM value, using, for example, a similar determination method to the third determination method described above, the divergence state described above in the explanation of FIG. 4 is detected so that the determination as to whether or not the head 1 contacts the magnetic disk 5 and the determination of the TD heater value are performed.

Moreover, by detecting degrading of the position accuracy when the head 1 contacts the magnetic disk 5, using, for example, a similar determination method to the third determination method illustrated in FIG. 18 for the average value of the position accuracy, the determination as to whether the head 1 contacts the magnetic disk 5 and the determination of the heater value may be performed. Alternatively, by detecting a great amount of change of the position accuracy value when the head 1 contacts the magnetic disk 5, using, for example, a determination method similar to the determination method based on the changing in the standard deviation described in FIGS. 20A to 20E for the standard deviation of the position accuracy value, the determination that the head 1 contacts the magnetic disk 5 or the determination of the TD heater value may be performed FIG. 21 illustrates an exemplary determination of the TD heater value by a determination method based on the changing in the standard deviation of the position accuracy values.

Figure 21:
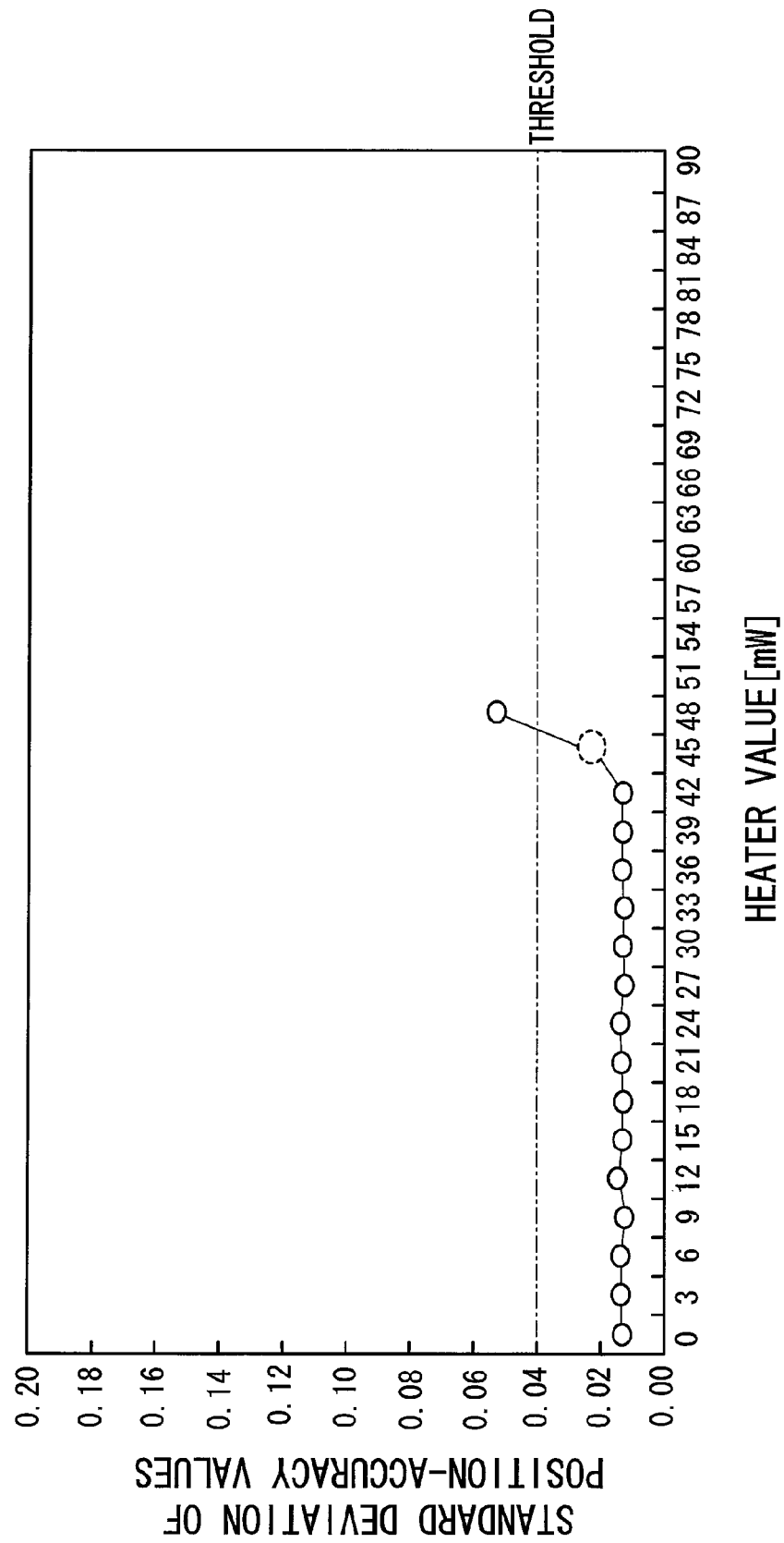
FIG. 21 illustrates an exemplary determination of the TD heater value by a determination method based on the changing in the standard deviation of the position accuracy values.

In the example of FIG. 21, the threshold is determined in a similar manner in the determination method based on the changing in the standard deviation illustrated in FIGS. 20A to 20E. FIGS. 20A to 20E and FIG. 21 include their respective thresholds. The threshold value in FIG. 21 is indicated by the line for the standard deviation of 0.04. In this example, the standard deviation of the position accuracy values for the heater value of 48 mW exceeds the threshold value, so that the heater value of 45 mW that immediately precedes the 48 mW heater value is determined as the TD heater value.

Next, detailed descriptions will be given as to the above-mentioned plural tables used for determining whether or not the head 1 contacts the magnetic disk 5.

FIGS. 22A and 22B illustrate exemplary plural tables.

FIGS. 22A and 22B include the information that is necessary for executing the determination of whether or not the head 1 contacts the magnetic disk 5. The information included there is classified by such items as 'Designated Range,' 'Reference Value 0' to 'Reference Value 11,' and 'Table 0' to 'Table 11.' There are twelve groups of rows of cells from 'table 0' to 'table 11' in FIG. 22B. This means that there are twelve tables as the above-mentioned 'plural tables.' Detailed descriptions will follow to these items.

Each of the 'Data' cells of the 'Designated Range' group includes a two-digit number expressed using the hexadecimal notation. The number represents the designated range described in the descriptions of the five determination methods. Each of the 'Address' cells of the 'Designated Range' group includes a two-digit number expressed using the hexadecimal notation. The number represents the storage address (storage place) in the memory 73 of FIG. 7 of the information (data) on the designated range. In this example, a start point of the designated range is represented by the value '01' listed in the 'Data' cell with respect to the 'Start' row of the 'Designated Range' group in FIG. 22A, while the end point of the designated range is represented by the value '0A' listed in the 'Data' cell with respect to the 'Stop' row in the 'Designated Range' group in FIG. 22A.

Each of the 'Data' cells of the groups of 'Reference Value 0' to 'Reference Value 11' includes a two-digit number expressed using the hexadecimal notation. The number represents the contents of the reference value described in the descriptions of the five determination methods. Each of the 'Address' cells of the groups of 'Reference Value 0' to 'Reference Value 11' includes a two-digit number expressed using the hexadecimal notation. The number represents the storage address (storage place) in the memory 73 of FIG. 7 of the information (data) on the reference value. In this example, the providing of the twelve groups of 'Reference Value 0' to 'Reference Value 11' mean that there are twelve kinds of reference values in total. As will be described later, each of the plural tables adopts any one of these twelve kinds of reference values. Note that each of the groups of 'Reference Value 0' to 'Reference Value 11' is divided into two rows entitled 'Low' and 'High' respectively. Each of the 'Data' cells of the 'Low' row and of the 'High' row of each of 'Reference Value 0' to 'Reference Value 11' includes a number. The number in the 'Data' cell of 'Low' row represents the fractional part of the reference value while the number in the 'Data' cell of the 'High' row represents the integer part of the reference value. For example, a number '80' is listed in the 'Data' cell of the 'Low' row for the 'Reference Value 0' group, and this number represents '0.5' in the decimal form. On the other hand, a number '00' is listed in the 'Data' cell of the 'High' row for the 'Reference Value 0' group, and this number means that the integer part of the reference value is '0' in the decimal form. If these numbers are put together, the 'Reference Value 0' represents '0.5' in the decimal form. In addition, a number '00' is listed in the 'Data' cell of the 'Low' row for the 'Reference Value 1' group, and this number means that the reference value has no fractional part in the decimal form and thus is an integer. On the other hand, a number 'FE' is listed in the 'Data' cell of the 'High' row for the 'Reference Value 1' group, and this number means that the integer part of the reference value is '−2' in the decimal form. Note that to express a negative number using the hexadecimal notation, the negative number is represented by a number obtained by adding '100' in the hexadecimal form to the negative number. If these numbers are put together, the 'Reference Value 1' represents '−2' in the decimal form.

In each of the 'Data' cells in each of the groups of 'Table 0' to 'Table 11' of the contents of the information (data) of the twelve tables are illustrated using a two-digit number expressed in the hexadecimal notation. In each of the 'Address' cells of each of the groups of 'Table 0' to 'Table 11' of the storage address (storage place) in the memory 73 of FIG. 7 of the information (data) are illustrated using a two-digit number expressed in the hexadecimal notation. Each of the groups 'Table 0' to 'Table 11' is divided into four rows of 'Prm 0' to 'Prm 3.' A two-digit number expressed using the hexadecimal notation is listed in each 'Data' cell included in each of the rows of 'Prm 0' to 'Prm 3.'

FIG. 23 illustrates what are included in each table.

Each table is characterized by an eight-digit number expressed using the binary notation and representing the two-digit number in the hexadecimal form listed in each of the 'Data' cells respectively in the rows of 'Prm 0' to 'Prm 3.' In FIG. 23, each 'Data' cell is subdivided into eight bit-cells of 'Bit 0' to 'Bit 7' corresponding respectively to the eight digits of the number in the binary form. FIG. 23 includes the contents represented by the number in the binary form. Detailed descriptions will be given belois to the contents represented by the number in the binary form.

Firstly, the 'Data' cell in the 'Prm 0' row will be described.

Of the binary eight digits listed in the 'Data' cell in the 'Prm 0' row, the number expressed by the superior four digits, that is, in the bit-cells 'Bit 7' to 'Bit 4' represents: which one of the four different kinds of values—AGC gain value for data, the AGC gain value for position information, the VTM value, and the position accuracy value—the determination-target value is; and whether the determination is based on the average value or on the standard deviation. Specifically, the numbers expressed by the binary four digits correspond as follows:

'0000' Average value of the AGC gain values for data;
'0001' Standard deviation of the AGC gain values for data;
'0010' Average value of the AGC gain values for position information;
'0011' Standard deviation of the AGC gain values for position information;
'0100' Average value of the VTM values;
'0101' Standard deviation of the VTM values;
'0110' Average value of the position accuracy values; and
'0111' Standard deviation of the position accuracy values.

Of the binary eight digits listed in the 'Data' cell in the 'Prm 0' row, the number expressed by the two digits of 'Bit 3' and 'Bit 2' represents the difference interval for computing the difference value used in the determination as to whether or not the head 1 contacts the magnetic disk 5. Specifically, a number '01' means that, when the difference value between each heater value and its counterpart heater value is obtained, the counterpart heater value is the one at the one-step higher level as in the cases of the above-described first determination method, the second determination method, and the third determination method. To put it differently, the number '01' represents the setting of the difference interval at 1. Accordingly, the difference between the two heater values is equal to the above-mentioned predetermined amount, or to the increment by which the heater value is increased every time. A number '10' means that the counterpart heater value in the acquisition of the difference value is the one at the two-step higher level as in the case of the fourth determination method. To put it differently, the number '10' represents the setting of the difference interval at 2. Accordingly, the difference between the two heater values is twice as large as the above-mentioned predetermined amount, or is twice as large as the increment by which the heater value is increased every time. In addition, a number '00' means that as in the case of the determination method based on the changing in the standard deviation illustrated by FIGS. 20A to 20E, the values of raw data (average values or the standard deviations) are used unprocessed instead of obtaining the difference values.

Of the binary eight digits in the binary form listed in the 'Data' cell in the 'Prm 0' row, the number expressed by the inferior two digits—'Bit 1' and 'Bit 0'—represent the number of data points (consecutive data points, if plural) that go beyond the threshold for the determination of the occurrence of the contact between the head 1 and the magnetic disk 5. Each of the data points represents, for example, the difference value of the average values of the determination-target values or the difference value of the standard deviation of the determination-target values. The number of data points (consecutive data points, if plural) that consecutively exceeds the threshold is used as the reference when whether or not the head 1 contacts the magnetic disk 5. Specifically, a number '01' means that the number of data points (consecutive data points, if plural) that consecutively exceeds the threshold is one as in the cases of the second determination method, the third determination method, and the determination method based on the changing in the standard variation illustrated in FIGS. 20A to 20E. A value '10' means that the number of data points (consecutive data points, if plural) that go beyond the threshold is two as in the cases of the first determination method, and the fourth determination method.

Using a specific example based on the 'Table 0' to 'Table 4' of FIG. 22B, detailed descriptions will be given as to the above-described numbers to be listed in the 'Prm 0' cell. These tables—'Table 0' to 'Table 4'—correspond respectively to the above-described first to the fourth determination method and correspond respectively to the determination method based on the changing in the standard deviation illustrated in FIGS. 20A to 20E. The following descriptions are provided to check if such a correspondence really exists between the tables and their respective methods. Specifically, the numbers listed in the 'Prm 0' cells of these tables are used to this end.

The numbers in the hexadecimal form listed in 'Prm 0' cells of 'Table 0' to 'Table 4' are '06,' '05,' '05,' '0A,' and '11,' respectively. These hexadecimal numbers '06,' '05,' '05,' '0A,' and '11' are '00000110,' '00000101,' '00000101,' '00001010,' and '00010001,' respectively.

Of the binary eight digits in each 'Prm 0' cell, the number expressed by the superior four digits of 'Bit 7' to 'Bit 4' of each of 'Table 0' to 'Table 3' is '0000.' This means that the determination-target value is the AGC gain value for data and that the determination is based on the average value of the AGC gain values for data. In 'Table 4,' on the other hand, the number expressed by the superior four digits of 'Bit 7' to 'Bit 4' is '0001.' This means that the determination-target value is the AGC gain value for data and that the determination is based on the standard deviation of the AGC gain values for data.

Of the binary eight digits in each 'Prm 0' cell, the number expressed by the two digits of 'Bit 3' and 'Bit 2' of each of 'Table 0' to 'Table 2' is '01.' This means that the difference interval is one. The number expressed by the two digits of 'Bit 3' and 'Bit 2' of 'Table 3' is '10.' This means the difference interval is two. The number expressed by the two digits of 'Bit 3' and 'Bit 2' of 'Table 4' is '00.' This means that the determination is based on raw data without obtaining the difference values.

Of the binary eight digits in each 'Prm 0' cell, the number expressed by the two digits of 'Bit 1' and 'Bit 0' of each of 'Table 0' and 'Table 3' is '10.' This means that a number of consecutive data points that go beyond the threshold. On the other hand, the number expressed by the two digits of 'Bit 1' and 'Bit 0' of each of 'Table 1,' 'Table 2,' and 'Table 4' is '01.' This means that a number of the data point that goes beyond the threshold is one.

Through the descriptions given above, it is confirmed that the numbers listed in the 'Prm 0' cells of 'Table 0' to 'Table 3' correspond respectively to the first to the fourth determination methods, and that the number listed in the 'Prm 0' cell of 'Table 4' correspond to the determination method based on the changing in the standard deviation illustrated in FIGS. 20A to 20E.

Of the binary eight digits in each 'Prm 0' cell, the number expressed by the superior four digits of 'Bit 7' to 'Bit 4' of each of 'Table 5' to 'Table 8' is '0010' whereas the corresponding number for 'Table 9' is '0011.' Accordingly, 'Table 5' to 'Table 8' of FIG. 22B are tables for the determination based on the average value of the AGC gain values for position information whereas 'Table 9' is a table for the determination based on the standard deviation of the AGC gain values for position information.

Of the binary eight digits in each 'Prm 0' cell, the number expressed by the superior four digits of 'Bit 7' to 'Bit 4' of 'Table 10' is '0100.' This means that 'Table 10' is a table for the determination based on the average value of the VTM values.

Of the binary eight digits in each 'Prm 0' cell, the number expressed by the superior four digits of 'Bit 7' to 'Bit 4' of 'Table 11' is '0110.' This means that 'Table 10' is a table for the determination based on the average value of the position accuracy values.

As seen from the descriptions given above, the example of FIGS. 22A and 22B cover the determination based on all of the four kinds of values—the AGC gain value for data, the AGC gain value for position information, the VTM value, and the position accuracy value.

Next, descriptions will be given as to the 'Prm 1' cell by referring back to FIG. 23.

Of the binary eight digits listed in the 'Data' cell in the 'Prm 1' row, the number expressed by the superior four digits, that is, in the bit-cells 'Bit 7' to 'Bit 4' represents the reference value for the average value in the determination based on the average value (see the first and the fourth determination methods). On the other hand, the number expressed by the inferior four digits, that is, in the bit-cells 'Bit 3' to 'Bit 0' represents the reference value for the standard deviation used in the determination based on the standard deviation (see the determination method based on the standard deviation illustrated in FIGS. 20A to 20E). Specifically, these numbers expressed by the binary four digits correspond as follows.

The twelve binary numbers from '0000' to '0111' (corresponding respectively to the numbers '0' to '11' in the decimal form) are used to designate respectively the index numbers from '0' to '11' of the twelve reference values from 'Reference Value 0' to 'Reference Value 11' illustrated in FIG. 22. Through the designation of the index number, one of the numbers listed in the 'Data' cells in the rows of 'Reference Value 0' to 'Reference Value 11' is designated as the reference value to be actually used. Note that a binary number '1000' means that the reference value is '0' in the decimal form. Any of the binary numbers '1001' to '1111' means that the reference value is '1' in the decimal form.

According to the tables illustrated in FIGS. 22A and 22B and FIG. 23, the threshold used for determining whether or not the head 1 contacts the magnetic disk 5 (see, for example, FIG. 16 to FIGS. 20A to 20E) is defined, by the following Formula (1), using the reference value for the average value and the reference value for the standard deviation.

Threshold=(Average value within designated range)×(Reference value for average value)+(Standard deviation within designated range)×(Reference value for standard deviation) (Formula 1)

In Formula (1), the 'average value within the designated range' means the average value within the designated range of either the average value of or the standard deviation for the determination-target value. For example, the 'average value within designated range' in the examples of FIG. 16 to FIG. 19 is the average value of the difference values (the difference values of the average values of the AGC gain values) that belong to the designated range. In addition, the 'standard deviation within designated range' in Formula (1) means the standard deviation within the designated range of either the average value of or the standard deviation of the determination-target value. For example, the 'standard deviation within designated range' in the example of FIGS. 20A to 20E is the standard deviation of the standard deviations (the standard deviations of the AGC gain values) that belong to the designated range.

Specific description will be given as to the above-described numbers listed in the 'Prm 1' cells by referring to the tables illustrated in FIG. 22B.

The 'Prm 1' cell of 'Table 0' has a hexadecimal number '0C.' When the hexadecimal number '0C' is converted to a number in the binary form, the number expressed by the superior four digits is '0000' whereas the number expressed by the inferior four digits is '1000.' Accordingly, in 'Table 0,' the reference value for average value is '0.5 (a number expressed by the decimal notation),' which is the value for 'Reference Value 0,' and the reference value for standard deviation is '0 (a number expressed in the decimal notation).' Accordingly, in 'Table 0,' the second term on the right-hand side in Formula (1) is zero, so that the threshold is defined by (multiplying the 'average value within designated range' in the first term by '−0.5').

In addition, the 'Prm 1' cell of 'Table 1' has a hexadecimal number '1C.' When the hexadecimal number '1C' is converted to a number in the binary form, the number expressed by the superior four digits is '0001' whereas the number expressed by the inferior four digits is '1000.' Accordingly, in 'Table 1,' the reference value for average value is '−2 (a number expressed by the decimal notation),' which is the value for 'Reference Value 1,' and the reference value for standard deviation is '0 (a number expressed in the decimal notation).' Accordingly, in 'Table 1,' the second term on the right-hand side in Formula (1) is zero, so that the threshold is defined by (multiplying the 'average value within designated range' in the first term by '−2').

Moreover, the 'Prm 1' cell of 'Table 4' has a hexadecimal number 'D4.' When the hexadecimal number 'D4' is converted to a number in the binary form, the number expressed by the superior four digits is '1101' whereas the number expressed by the inferior four digits is '0100.' Accordingly, in 'Table 4,' the reference value of average value is '1 (a number expressed by the decimal notation),' and the reference value for standard deviation is '6 (a number expressed in the decimal notation),' which is the value for 'Reference Value 4.' Accordingly, in 'Table 4,' following the Formula (1), the threshold is defined by multiplying the 'standard deviation within designated range' by a value '6' and then adding the 'average value within designated range' to the resultant product.

As seen from the three examples given above, those reference values in the tables for the determination based on the average value illustrated in FIG. 22B are set such that the reference value for average value is anyone of the values '0' to '11' in the decimal form and the reference value of standard deviation is a value '0' in the decimal form. Those reference values in the tables for the determination based on the standard deviation are set such that the reference value for average value is a value '1' in the decimal form and the reference value for standard deviation is any one of the values '0' to '11' in the decimal form.

Accordingly, in each of the tables for the determination based on the average value illustrated in FIG. 22B, the threshold value is defined by multiplying the 'average value within designated range' by the 'reference value of average value.' Actually, in each of the first to the fourth determination methods described above, the threshold is defined in this way. In addition, in each of the tables for the determination based on the standard deviation, the threshold value is defined by multiplying the 'standard deviation within designated range' by the 'reference value of standard deviation' and then adding the 'average value within designated range' to the resultant product. Actually, in the determination method based on the changing in the standard deviation illustrated in FIGS. 20A to 20E, the threshold is defined in this way.

Next, descriptions will be given as to the 'Prm 2' cell by referring back to FIG. 23.

Of the binary eight digits listed in the 'Data' cell in the 'Prm 2' row, the number expressed by the superior digit, that is, in the bit-cell 'Bit 7' represents a value that designates whether the data point is above or below the threshold when it is determined that the head 1 contacts the magnetic disk 5. Specifically, A binary value '0' means that the data point (for example, the difference value for each heater value in FIG. 16A through FIG. 16F, or the standard deviation at each heater value in FIGS. 20A to 20E) is above the threshold when it is determined that the contact occurs. A binary value '1' means that the data point is below the threshold when it is determined that the contact occurs.

The 'Prm 2' cell of each of 'Table 0,' 'Table 1,' and 'Table 3' in FIG. 22B has a hexadecimal number '80.' When the hexadecimal number '80' is converted to a number in the binary form, the superior digit of 'Bit 7' has a binary number of '1.' This means that, in the determination based on 'Table 0,' 'Table 1,' and 'Table 3,' the data point is below the threshold when it is determined that the contact occurs. This way of determination is in conformity with the way of determination according to the first, the second, and the fourth determination methods.

In addition, the 'Prm 2' cell of each of 'Table 2' and 'Table 4' in FIG. 22B has a hexadecimal number '00.' When the hexadecimal number '00' is converted to a number in the binary form, the superior digit of 'Bit 7' has a binary number of '0.' This means that, in the determination based on 'Table 2' and 'Table 4,' the data point is above the threshold when it is determined that the contact occurs. This way of determination is in conformity with the way of determination according to the third determination method and the determination method based on the changing in the standard deviation illustrated in FIGS. 20A to 20E.

The bit-cells of 'Bit 6' to 'Bit 0' in the row of 'Prm 2' and all the bit-cells in the row of 'Prm 3' in FIG. 23 are reserved for the case where there is any other information that characterized the determination than the kinds of information that have been described thus far. For this reason, the word 'Reserve' in FIG. 23 is provided to indicate that the bit-cells of 'Bit 6' to 'Bit 0' in the row of 'Prm 2' and all the bit-cells in the row of 'Prm 3' are reserved bit-cells. Accordingly, in the example of Part (a) of FIG. 22 and FIG. 22B, the numbers listed in these bit-cells are not used for determining whether or not the head 1 contacts the magnetic disk 5.

The descriptions that have been given thus far concerns specific examples of the plural tables used for determining whether or not the head 1 contacts the magnetic disk 5.

Next, using results of two experiments, Experiment 1 and Experiment 2, descriptions will be given as to the effects of determining the definite TD heater value (the final TD heater value described above) on the basis of the changing in plural kinds of values such as the AGC gain value, the position accuracy value, and the VTM value.

Firstly, Experiment 1 will be described.

In this Experiment 1, a HDD with the following characteristic features is used as a HDD of Example. The HDD determined the final TD heater value through similar series of processes to the ones illustrated in FIG. 8. Accordingly, the determination of the final TD heater value by the HDD is based on the average value of and the standard variation of the AGC gain values of the reproduction signals for data, the average value of the VTM values, and the average value of the position accuracy values. To this end, the HDD is provided with four tables which correspond to determining whether or not the head contacts the magnetic disk and which corresponds respectively to the average value of the AGC gain values of the reproduction signals for data, the standard deviation of the AGC gain values of the reproduction signals for data, the average value of the VTM values, and the standard deviation of the position accuracy values. This HDD includes two magnetic disks. Data sectors and servo sectors (refer to FIG. 5 and its descriptions) are formed on the two surfaces— the first and the second surfaces—of each magnetic disk. The HDD includes four heads—from a HD 1 to a HD 4—used for accessing respectively all the four surfaces of the two magnetic disks. Four final TD heater values are determined respectively for the four heads. These four heads are made of the same materials and had identical structures.

The final TD heater values are determined with respect to each of these four heads by similar series of processes to the ones illustrated in FIG. 8. As each head changes the positions of the tracks from which data or position information is read, the TD heater values are determined. Thus, the final TD heater values are determined respectively for all the tracks on each surface of the magnetic disks.

For comparative purposes, in this Experiment 1, a HDD with the following characteristic features is used as a HDD of Comparative Example 1. The HDD of Comparative Example 1 includes only one table, which corresponds to the average value of the AGC gain values of the reproduction signals for data. All the other features are the same as those of the HDD of Example. As each of the four heads changes the positions of the tracks from which data or position information is read, the TD heater values are determined. Thus, the final TD heater values are determined respectively for all the tracks on each surface of the magnetic disks.

In addition, in this Experiment 1, a HDD with the following characteristic features is used as a HDD of Comparative Example 1. The HDD of Comparative Example 2 includes only one table, which corresponds to the standard deviation of the AGC gain values of the reproduction signals for data. All the other features are the same as those of the HDD of Example. As each of the four heads changes the positions of the tracks from which data or position information is read, the TD heater values are determined. Thus, the final TD heater values are determined respectively for all the tracks on each surface of the magnetic disks.

In addition, in this Experiment 1, a HDD with the following characteristic features is used as a HDD of Comparative Example 1. The HDD of Comparative Example 3 includes only one table, which corresponds to the standard deviation of the VTM values. All the other features are the same as those of the HDD of Example. As each of the four heads changes the positions of the tracks from which data or position information is read, the TD heater values are determined. Thus, the final TD heater values are determined respectively for all the tracks on each surface of the magnetic disks.

In addition, in this Experiment 1, a HDD with the following characteristic features is used as a HDD of Comparative Example 1. The HDD of Comparative Example 4 includes only one table, which corresponds to the average value of the position accuracy values. All the other features are the same as those of the HDD of Example. As each of the four heads changes the positions of the tracks from which data or position information is read, the TD heater values are determined. Thus, the final TD heater values are determined respectively for all the tracks on each surface of the magnetic disks.

Figure 24:
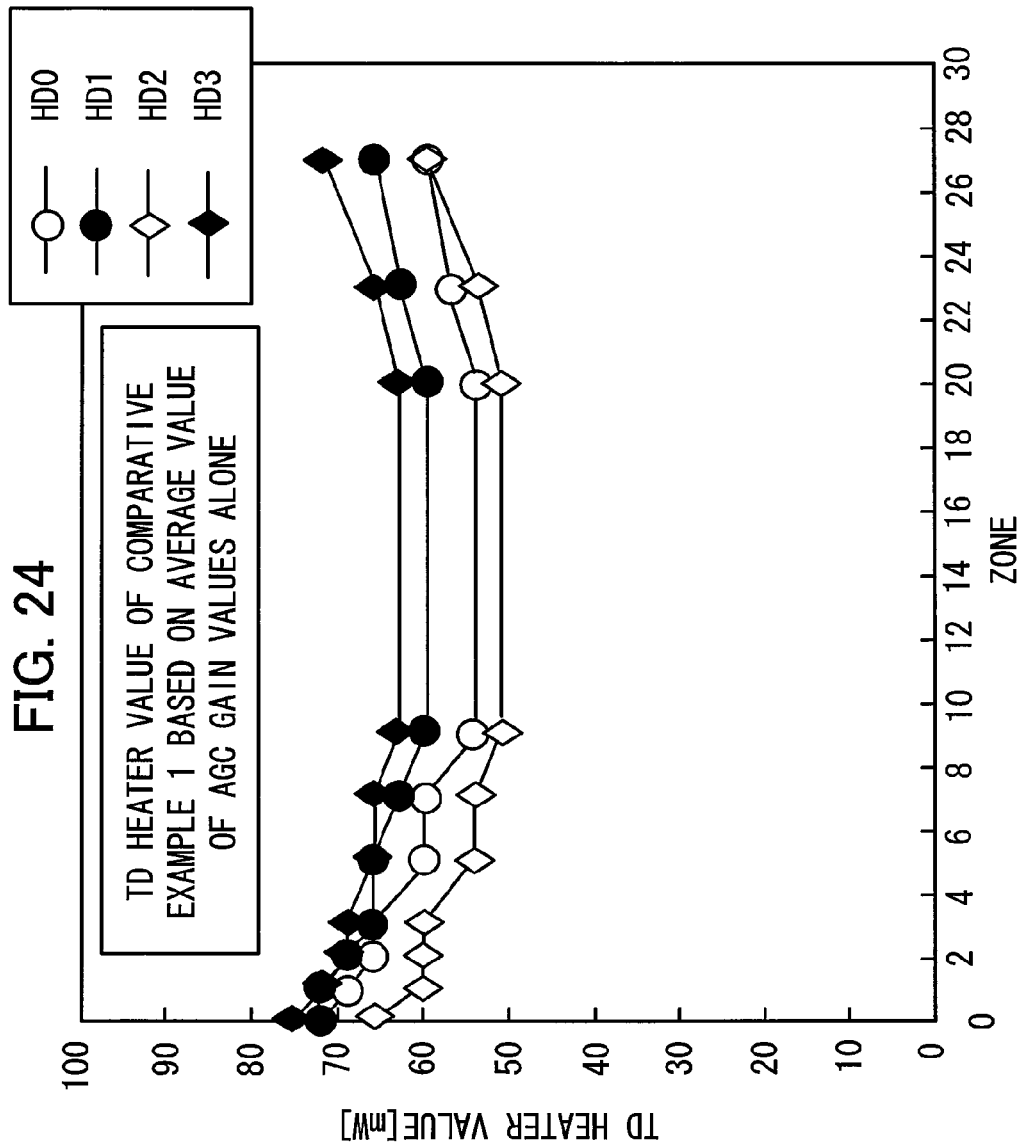
FIG. 24 illustrates the experiment results for the HDD of Comparative Example 1.
Figure 25:
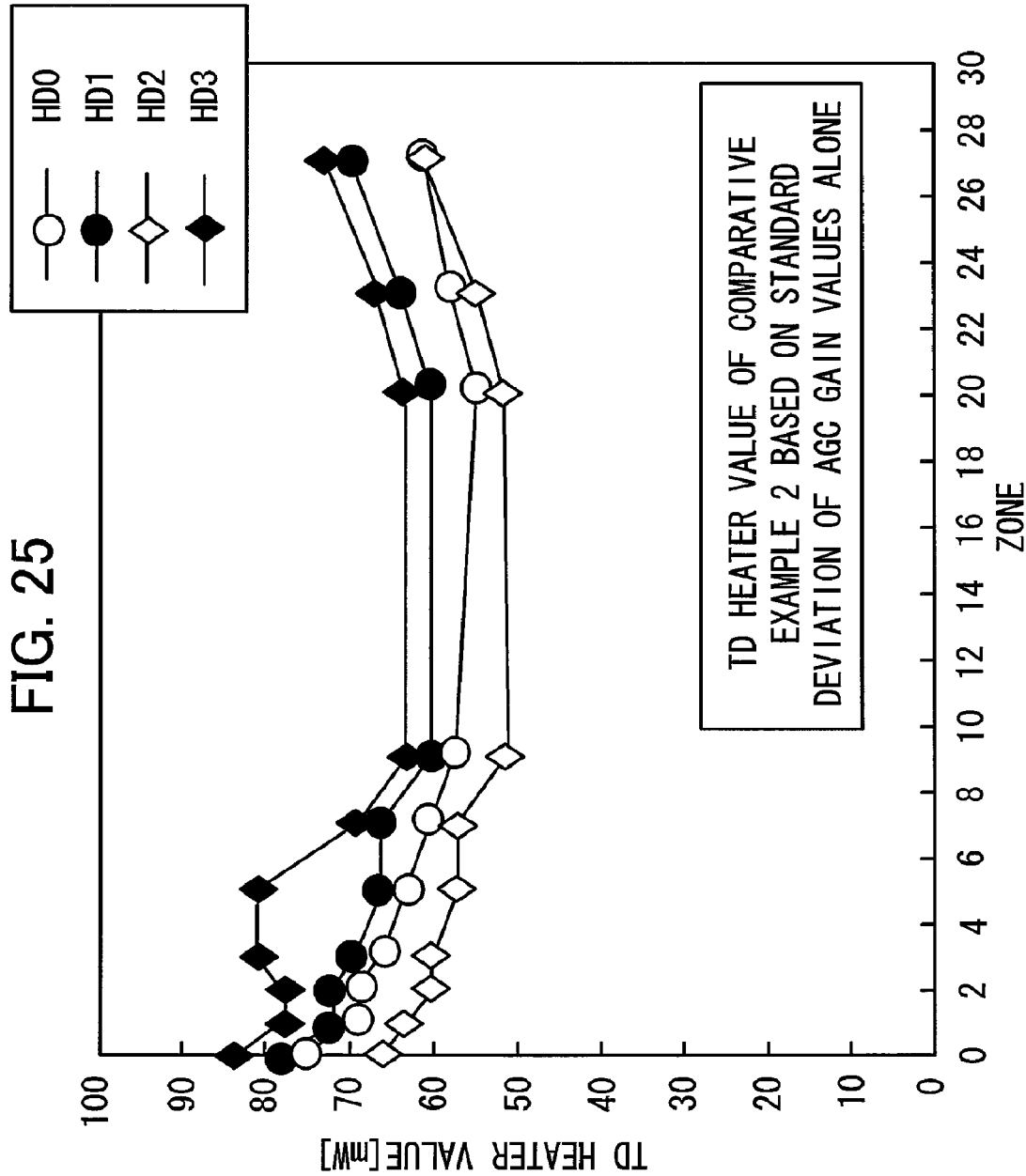
FIG. 25 illustrates the experiment results for the HDD of Comparative Example 2.
Figure 26:
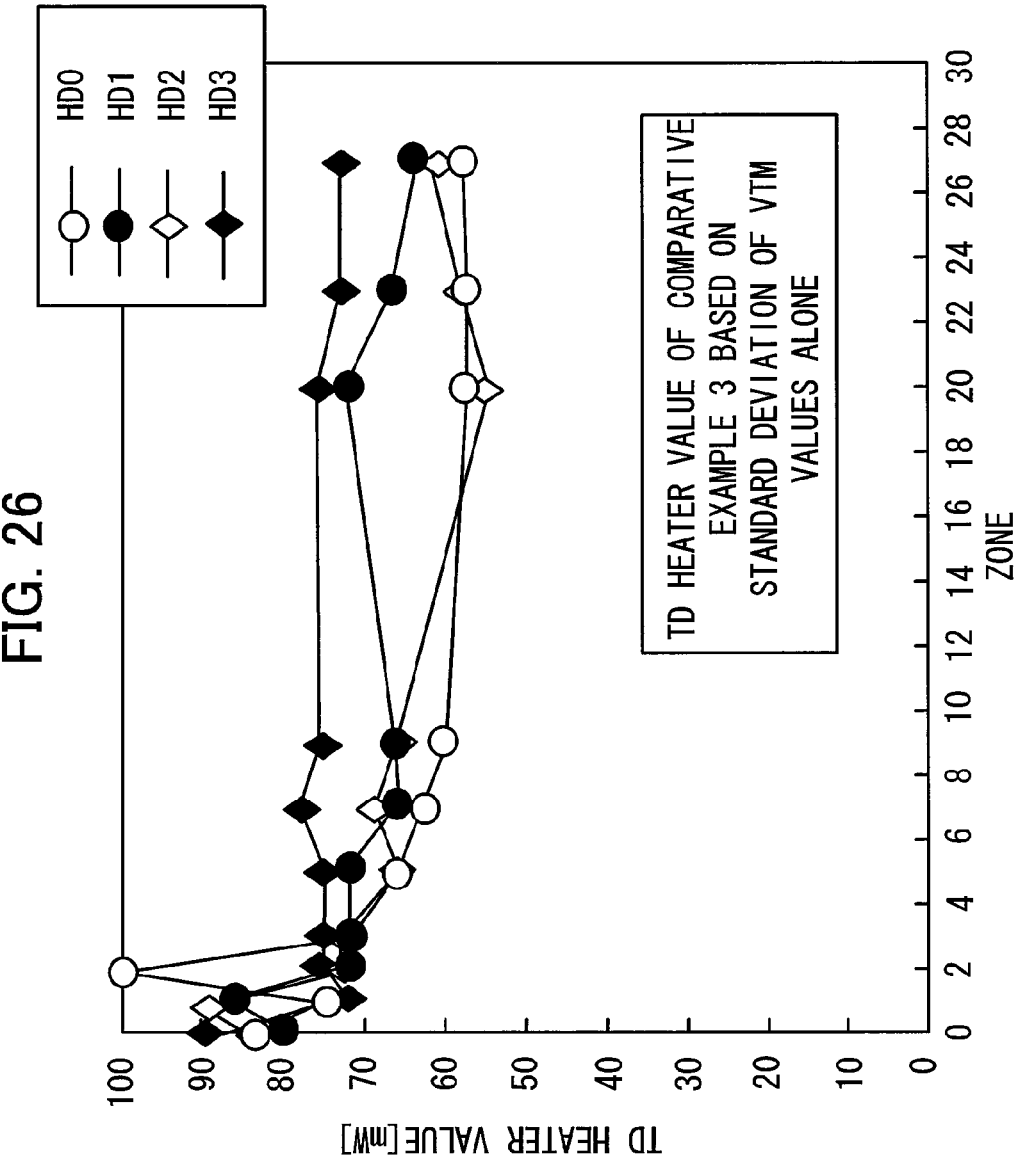
FIG. 26 illustrates the experiment results for the HDD of Comparative Example 3.
Figure 27:
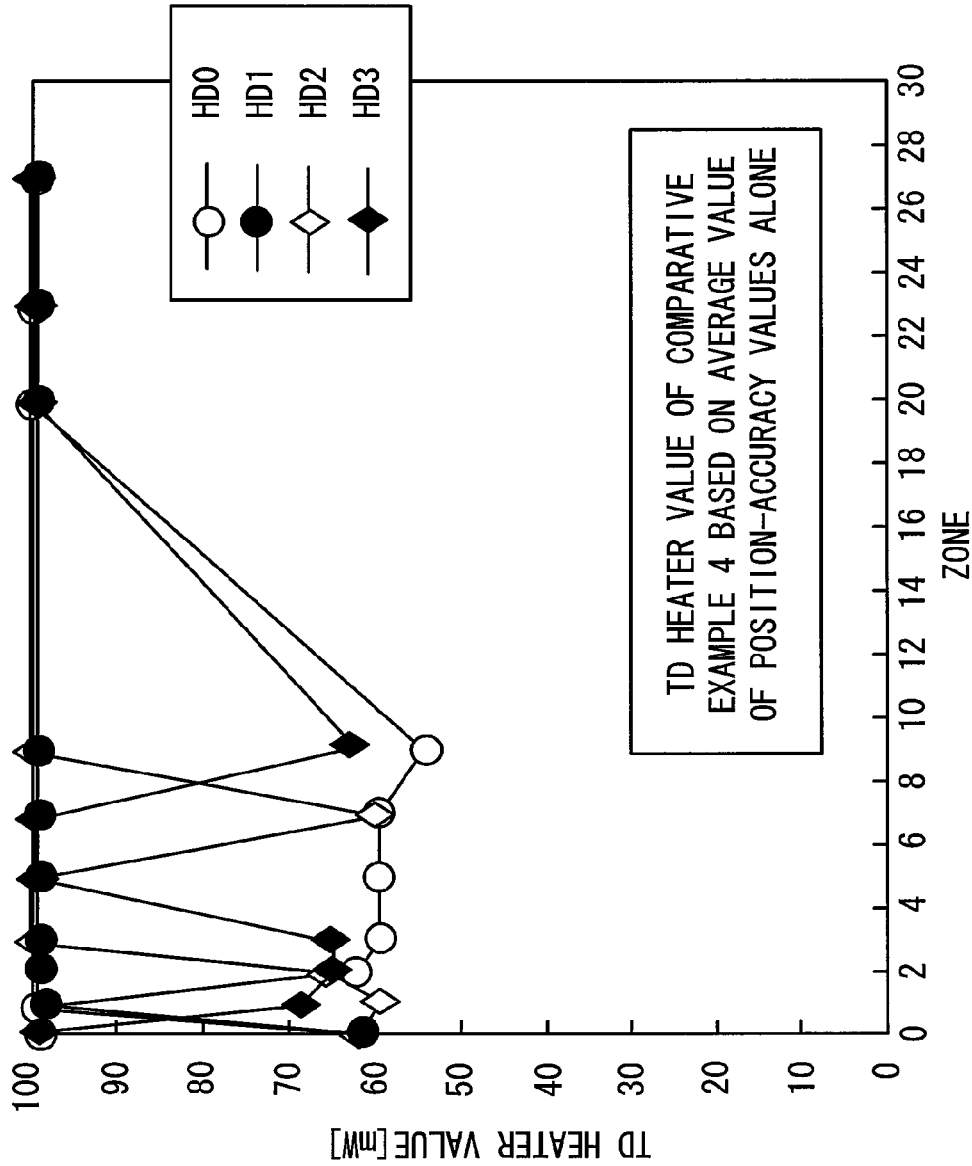
FIG. 27 illustrates the experiment results for the HDD of Comparative Example 4.
Figure 28:
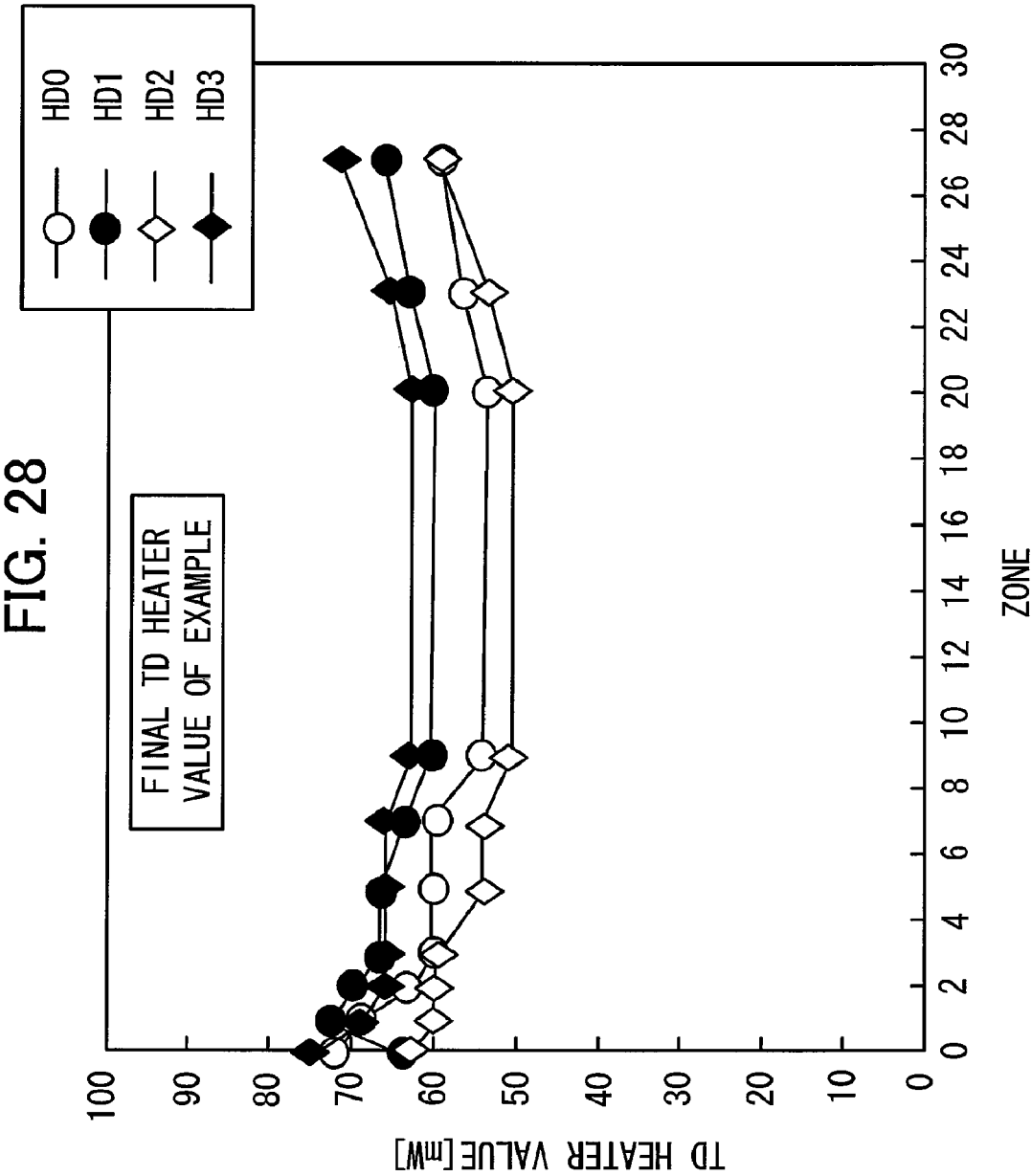
FIG. 28 illustrates the experiment results for the HDD of Example.

FIG. 24 illustrates the experiment results for the HDD of Comparative Example 1. FIG. 25 illustrates the experiment results for the HDD of Comparative Example 2. FIG. 26 illustrates the experiment results for the HDD of Comparative Example 3. FIG. 27 illustrates the experiment results for the HDD of Comparative Example 4. FIG. 28 illustrates the experiment results for the HDD of Example.

In FIG. 24 to FIG. 28, zone numbers that correspond respectively to the distances in the radial direction of the magnetic disks are used to express the positions of the tracks. With the zone numbers on the horizontal axis of the graph, the TD heater values for the four heads are illustrated (in FIG. 29 for the HDD of Example, the final TD heater values are illustrated).

The overall trend observed in FIG. 24 of the HDD of Comparative Example 1 and in FIG. 25 of the HDD of Comparative Example 2 is that larger TD heater values tend to be found in the portion of small zone numbers ranging from 0 to 8 approximately, and in the portion of large zone numbers of 20 or larger. It is particularly clear that, for the HD 0 of the HDD of Comparative Example 1 and for the HD 3 of the HDD of Comparative Example 2, large TD heater values tend to be found in the portion of small zone numbers.

In addition, for the HDD of Comparative Example 3 illustrated in FIG. 26, the TD heater value tends to increase significantly in the portion with small zone numbers ranging from 0 to 4 approximately. In particular, the HD 0 has a TD heater value as large as 100 mW at zone number of 2.

In addition, for the HDD of Comparative Example 4 illustrated in FIG. 27, higher TD heater values are found over the range of zone numbers. In particular, each of the HD 1 and the HD 2 has many points where the TD heater values become as large as 100 mW. In addition, the TD heater value tends to fluctuate drastically along with the zone number.

For the HDD of Example illustrated in FIG. 28, the TD heater value tends to increase in the portion with small zone numbers ranging from 0 to 8 approximately and in the portion with large zone numbers of 20 or larger. The final TD heater values in these portions for all of the heads—HD 0, HD 1, HD 2, and HD3—are either smaller than or approximately as large as the TD heater values of the HDDs of Comparative Examples 1 and 2. In addition, the HDD of Example illustrated in FIG. 28, has relatively small final TD heater values all over the range of zone numbers. Small fluctuations in the final TD heater value are observed along with the zone number. In contrast to the cases of the TD heater values of the HDDs of Comparative Examples 3 and 4, no final TD heater value rises up to 100 mW.

The above-described experiment results clearly indicate that, if the definite TD heater value (i.e., the final TD heater value) is determined, as in the case of the HDD of Example, on the basis of the changing in plural kinds of values such as the AGC gain value, the position accuracy value, and the VTM value, the definite TD heater value is loared down to a smaller value in spite of the differences among the individual heads or among the individual magnetic disks.

Next, Experiment 2 will be described.

This Experiment 2 used five different models of HDDs—from model 1 to model 5. The HDDs of these five different models have identical structures, but differ from one another in the materials that the HDDs of the five models are made of. Plural HDDs of each model are used in Experiment 2. The final TD heater values are determined for all of these HDDs. Each of the HDDs of the five models included the twelve tables illustrated in FIG. 22. The final TD heater values are determined using these tables through similar series of processes to those illustrated in FIG. 8.

In this Experiment 2, after the final TD heater values for these HDDs are determined, the contact between the head and the magnetic disk for each of the HDDs is detected by the acoustic emission (AE) method while the heater value is gradually increased by a predetermined increment. The heater value at the time when the contact is detected is obtained. The AE method is a method to detect the existence of strains and cracks in a solid material by detecting, using an AE sensor, the elastic wave of a ultrasonic range (from 20 kHz to 1000 kHz) in the solid material. In Experiment 2, the contact of the head and the magnetic disk is detected by detecting, by the AE method, the elastic wave generated by the impact given to the head by the contact of the head with the magnetic disk. In general, the contact detection by the AE method needs quite large-scale equipment. Accordingly, it is not practical to use the AE method as the method of adetermining the TD heater values of individual ones of the HDDs that are industrially-manufactured on a massive scale. However, it is well known that the AE method accomplishes accurate detection of contact. Accordingly, the heater value at the time when the contact is detected by the AE method is considered as the heater value at the time when the head is actually brought into contact with the magnetic disk. By comparing the heater value obtained at the time when the contact is detected by the AE method with the final TD heater value obtained in this Experiment 2, the accuracy of the final TD heater value may be assessed.

FIG. 28 illustrates the results of Experiment 2.

Figure 29:
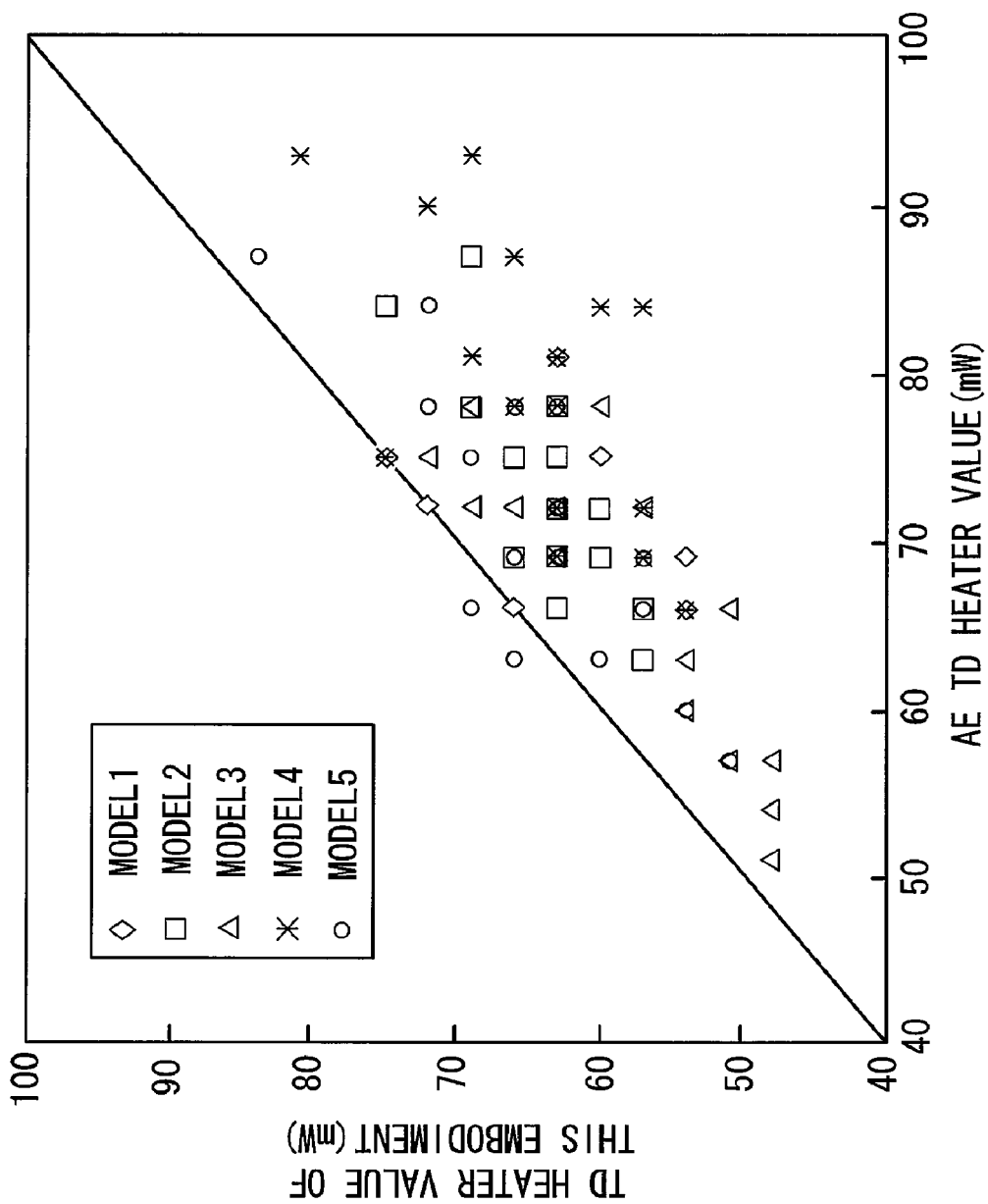
FIG. 29 the experiment results for the HDD of Example.

The horizontal axis of the graph illustrated in FIG. 29 represents the heater value at the time when the contact (TD) is detected by the AE method whereas the vertical axis represents the final TD heater value. FIG. 29 illustrates the results for the plural HDDs of each of the five models, model 1 to model 5. In general, even among HDDs of an identical model, the head and the magnetic disk of one HDD have characteristics that may be somewhat different from their respective counterparts of another HDD have. For this reason, in Experiment 2, even among the plural HDDs of an identical model, there are, commonly, differences in the final TD heater value and in the heater value at the time when the contact is detected by the AE method.

A straight line extending obliquely upwards with a gradient 1 is drawn in FIG. 29. When the heater value at the time when the contact (TD) is detected by the AE method coincides with the final TD heater value, a point representing these two heater values is positioned on the oblique straight line. Though most of the points in FIG. 29 have final TD heater values somewhat smaller than their respective heater values at the time when the contact (TD) is detected by the AE method, the points are distributed along the straight line with a gradient of 1. The results indicate that there is strong correlation between the final TD heater value and the heater value at the time when the contact (TD) is detected by the AE method.

What have been given thus far are the descriptions of this embodiment.

In the description give above, as described by referring to FIG. 8, every time the head 1 gives a round relative to the track 50 of the magnetic disk 5, the heater value is increased by a predetermined increment and then whether or not the head 1 contacts the magnetic disk 5 is determined. Alternatively, in the above-described basic forms of the control device, the control method, and the information storage apparatus, the increase of the heater value by a predetermined increment and the determination as to whether or not the head 1 contacts the magnetic disk 5 may be made every time the head 1 gives certain plural rounds relative to the track 50 of the magnetic disk 5.

According to the aspect of the control device, whether or not the head and the storage medium are in contact with each other is determined for each of the two or more kinds of characteristic values on the basis of a change of the characteristic values to the increase in the heat amount generated by the heater. If it is determined that the heater and the storage medium are in contact with each other, the heat amount generated at the time of the contact is obtained. Since, in the basic form of the control device, whether or not the head and the storage medium are in contact with each other is determined for each of the two or more kinds of characteristic values, the heat amount generated at the time of the contact used in determining the above-mentioned association is determined accurately. The accurate determination of the heat amount generated at the time of the contact allows the above-mentioned association to be determined accurately. The accurate determination of the association prevents the head from being unnecessarily brought into contact with the storage medium at the time of access. Consequently, the storage medium is protected from the damage that would otherwise be caused by such an unnecessary contact.

The above-mentioned two or more kinds of characteristic values computed by the at least one kind of algorithm are computed on the basis of the same reading signals generated under the conditions of a constant heat amount generated by the heater. Accordingly, obtaining the two or more kinds of characteristic values takes almost the same time as the time it takes to compute characteristic values of a single kind alone. For this reason, though the determination of whether or not the head and the storage medium are in contact with each other is made for each of the two or more kinds of characteristic values in the basic form, it takes only brief time to obtain the characteristic values.

Since the determination of whether or not the head and the storage medium are in contact with each other is made for each of the two or more kinds of characteristic values in this basic form of the control method as well, the heat amount generated at the time of the contact used in determining the above-mentioned association is determined accurately. The accurate determination of the heat amount generated at the time of the contact allows the above-mentioned association to be determined accurately. The accurate determination of the association prevents the head from being unnecessarily brought into contact with the storage medium at the time of access. Consequently, the storage medium is protected from the damage that would otherwise be caused by such an unnecessary contact.

The aspect of the information storage apparatus includes the control device of the basic form. Accordingly, the heat amount generated at the time of the contact used in determining the above-mentioned association is determined accurately, and the above-mentioned association is determined accurately as well. According to the basic form of the information storage apparatus, the accurate determination of the association prevents the head from being unnecessarily brought into contact with the storage medium at the time of access. Consequently, the storage medium is protected from the damage that would otherwise be caused by such an unnecessary contact.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A control device that controls a heater which thermally expands a head towards a surface of a storage medium configured to store information, the head approaching the surface of the storage medium and reading the information from the storage medium to generate a reading signal, the control device comprising:
    an acquisition module configured to acquire a reading signal from the head under a plurality of heat amounts generated by the heater;
    a computation module configured to compute, from the reading signal obtained by the acquisition module, two or more kinds of characteristic values representing characteristics of the reading signal for each of the plurality of generated heat amounts by using at least one kind of algorithm;
    a contact determination module configured to determine whether or not the head contacts the storage medium, with respect to each of the two or more kinds of characteristic values computed by the computation module, on the basis of a change of the characteristic values for the heat amount generated by the heater; and
    an association determination module configured to determine an association of the distance between the head and the storage medium with the heat amount generated by the heater, using the heat amount generated when the contact determination module determines that the head contacts the storage medium with respect to any of the characteristic values is used as the heat amount generated by the heater when the head contacts the storage medium so that the distance between the head and the storage medium is considered to be zero.

2. The control device according to claim 1, wherein the computation module is configured to compute, as the two or more kinds of characteristic values, at least two of four representative values including: a representative value of signal levels with respect to a plurality of user signals corresponding to a plurality of data sectors of a track formed on the storage medium; a representative value of signal levels of a plurality of position signals corresponding to a plurality of servo sectors of the track; a representative value of a plurality of offset amounts obtained for the plurality of user signals, each of the offset amounts being how much a demodulation value with respect to one of the user signals is offset from the most-likelihood offset amount estimated on the basis of the Viterbi Algorithm; and a representative value of a plurality of offset amounts of head position obtained for the plurality of position signals, each of the offset amounts of head position being represented by a single position signal and being how much the head position is offset from a predetermined position in a radial direction of the storage medium.

3. The control device according to claim 2, wherein the acquisition module is configured to increase the heat amount generated by the heater every time the head gives one complete round on the track relative to the storage medium.

4. The control device according to claim 2, wherein
    concerning at least one of the two or more representative values, the computation module is configured to compute, for each heat amount, at least one of an average value and a standard deviation of: the signal levels of the plurality of user signals; the signal levels of the plurality of position signals; the offset amounts of the demodulation values of the plurality of user signals; or the offset amounts of head position with respect to the plurality of position signals.

5. The control device according to claim 2, wherein concerning at least one of the two or more representative values, the computation module is configured to compute, for each heat amount, both of an average value and a standard deviation of: the signal levels of the plurality of user signals; the signal levels of the plurality of position signals; the offset amounts of the demodulation values of the plurality of user signals; or the offset amounts of head position with respect to the plurality of position signals, the contact determination module is configured to determine whether or not the head contacts the storage medium on the basis of changing in each of the average value and the standard deviation computed by the computation module as the heat amount generated by the heater is increased by the acquisition module, and the contact determination module is configured to determine the heat amount generated when the head contacts the storage medium on the basis of the changing in any of the average value and the standard deviation on the basis of which it is determined that there is a contact.

6. The control device according to claim 2, wherein concerning at least one of the two or more representative values, the computation module is configured to compute, for each heat amount, an average value of: the signal levels of the plurality of user signals; the signal levels of the plurality of position signals; the offset amounts of the demodulation values of the plurality of user signals; or the offset amounts of head position with respect to the plurality of position signals, and
the contact determination module is configured to determine, for each heat amount, a difference value between two of the average values at a first heat amount and at a second heat amount increased from the first heat amount by an amount obtained by multiplying a predetermined heat amount by a predetermined integer; when a series of the difference values are viewed in a direction of an ascending order of the heat amounts, if the series of difference values goes beyond a threshold from one side to the other side, the threshold obtained by multiplying an average difference value at the beginning of the heat generation of the heater by a predetermined coefficient, and if a predetermined number of consecutive difference values remain at the other side of the threshold, the contact determination module determines that there is a contact between the head and the storage medium; and the contact determination module is configured to determine, as the heat amount at a time of the contact, a heat amount generated by the heater for a difference value immediately before the series of difference values exceed the threshold.

7. The control device according to claim 6, wherein the contact determination module is configured to determine whether or not there is a contact between the head and the storage medium on the basis of a plurality of sets each of which includes the predetermined integer, the predetermined coefficient, the predetermined number of consecutive difference values, and the direction in which the predetermined number of consecutive difference values go beyond the threshold, the plurality of sets differing from one another in any one of the predetermined integer, the predetermined coefficient, the predetermined number of consecutive difference values, and the direction in which the predetermined number of consecutive difference values go beyond the threshold.

8. The control device according to claim 1, wherein concerning at least one of the two or more representative values, the computation module is configured to compute, for each heat amount, a standard deviation of: the signal levels of the plurality of user signals; the signal levels of the plurality of position signals; the offset amounts of the demodulation values of the plurality of user signals; or the offset amounts of head position with respect to the plurality of position signals, and
the contact determination module is configured to determine that there is a contact between the head and the storage medium, when a series of the standard deviations are viewed in a direction of an ascending order of the heat amounts, if the series of standard deviations goes beyond a threshold from one side to the other side, the threshold obtained through multiplying a standard deviation at the beginning of the heat generation of the heater by a predetermined coefficient and adding an average value of the standard deviations to a resultant obtained by the multiplying, and if a predetermined number of consecutive standard deviations remain at the other side of the threshold, and then the contact determination module is configured to determine, as the heat amount at a time of the contact, a heat amount generated by the heater for a standard deviation immediately before the series of difference values exceed the threshold.

9. The control device according to claim 1, wherein
the contact determination module is configured to determine whether or not there is a contact between the head and the storage medium as the acquisition section increases the heat amount generated by the heater, and
the acquisition module is configured to stop increasing the heat amount generated by the heater if it is determined that there is a contact in a determination by the contact determination module.

10. A method of controlling a heater that thermally expands a head towards a surface of a storage medium configured to store information, the head approaching the surface of the storage medium and reading the information from the storage medium to generate a reading signal, the method comprising:
acquiring a reading signal from the head under a plurality of heat amounts generated by the heater;
computing, from the reading signal obtained by an acquisition module during said acquiring, two or more kinds of characteristic values representing characteristics of the reading signal for each of the plurality of generated heat amounts by using at least one kind of algorithm;
contact-determining whether or not the head contacts the storage medium, with respect to each of the two or more kinds of characteristic values computed by a computation module during said computing, on the basis of a change of the characteristic values for the heat amount generated by the heater; and
association-determining an association of the distance between the head and the storage medium with the heat amount generated by the heater, using the heat amount generated when a contact determination module, used in said contact-determining, is configured to determine that the head contacts the storage medium with respect to any of the characteristic values is used as the heat amount generated by the heater when the head contacts the storage medium so that the distance between the head and the storage medium is considered to be zero.

11. The method according to claim 10, wherein the computing is computing, as the two or more kinds of characteristic values, at least two of four representative values including: a representative value of signal levels with respect to a plurality of user signals corresponding to a plurality of data sectors of a track formed on the storage medium; a representative value of signal levels of a plurality of position signals corresponding to a plurality of servo sectors of the track; a representative value of a plurality of offset amounts obtained for the plurality of user signals, each of the offset amounts being how much a demodulation value with respect to one of the user signals is offset from the most-likelihood offset amount estimated on the basis of the Viterbi Algorithm; and a representative value of a plurality of offset amounts of head position obtained for the plurality of position signals, each of the offset amounts of head position being represented by a single position signal and being how much the head position is offset from a predetermined position in a radial direction of the storage medium.

12. An information storage apparatus comprising:

a storage medium configured to store information;

a head comprising an approach face configured to approach a surface of the storage medium, and a built-in heater configured to thermally expand the approach face towards the surface of the storage medium, the head being configured to read information from the storage medium to generate a reading signal; and a control device configured to control the heater, wherein the control device comprises:

an acquisition module configured to acquire a reading signal from the head under a plurality of amounts of heat generated by the heater;

a computation module configured to compute, from the reading signal obtained by the acquisition module, two or more kinds of characteristic values that represent some characteristics of the reading signal, the characteristic values being computed for each of the plurality of different amounts of generated heat by at least one kind of algorithm;

a contact determination module configured to determine whether or not the head contacts the storage medium on the basis of how much each of the two or more kinds of characteristic values computed by the computation module changes with a change in the heat amount generated by the heater; and an association determination module configured to identify association of the distance between the head and the storage medium with the heat amount generated by the heater while the heat amount generated at the time when the contact determination module determines that the head contacts the storage medium on the basis of any of the characteristic values is considered as the heat amount generated by the heater at the time when the head contacts the storage medium and thus the distance between the head and the storage medium is considered to be zero.

13. The information storage apparatus according to claim 12, wherein the computation module is configured to compute, as the two or more kinds of characteristic values, at least two of four representative values including: a representative value of signal levels with respect to a plurality of user signals corresponding to a plurality of data sectors of a track formed on the storage medium; a representative value of signal levels of a plurality of position signals corresponding to a plurality of servo sectors of the track; a representative value of a plurality of offset amounts obtained for the plurality of user signals, each of the offset amounts being how much a demodulation value with respect to one of the user signals is offset from the most-likelihood offset amount estimated on the basis of the Viterbi Algorithm; and a representative value of a plurality of offset amounts of head position obtained for the plurality of position signals, each of the offset amounts of head position being represented by a single position signal and being how much the head position is offset from a predetermined position in a radial direction of the storage medium.

* * * * *